US009832427B2

(12) United States Patent
Yamashita

(10) Patent No.: US 9,832,427 B2
(45) Date of Patent: Nov. 28, 2017

(54) CAMERA, CAMERA SYSTEM, AND SELF-DIAGNOSIS METHOD

(71) Applicant: Panasonic Intellectual Property Corporation of America, Torrance, CA (US)

(72) Inventor: Kazuhiko Yamashita, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 642 days.

(21) Appl. No.: 14/370,793

(22) PCT Filed: Oct. 31, 2013

(86) PCT No.: PCT/JP2013/006465
§ 371 (c)(1),
(2) Date: Jul. 7, 2014

(87) PCT Pub. No.: WO2014/076899
PCT Pub. Date: May 22, 2014

(65) Prior Publication Data
US 2014/0368630 A1    Dec. 18, 2014

(30) Foreign Application Priority Data

Nov. 16, 2012    (JP) ................................. 2012-251754

(51) Int. Cl.
*G08G 1/017*    (2006.01)
*H04N 7/18*    (2006.01)
(Continued)

(52) U.S. Cl.
CPC ........... *H04N 7/18* (2013.01); *G06K 9/00624* (2013.01); *G08G 1/017* (2013.01); *G08G 1/04* (2013.01); *H04N 7/181* (2013.01); *H04N 17/002* (2013.01)

(58) Field of Classification Search
CPC ............................. H04N 7/18; G06K 9/00624
See application file for complete search history.

(56) References Cited

U.S. PATENT DOCUMENTS 8,218,814 B2 *   7/2012   Ito ...................... G06K 9/00771
                                                    348/143
8,447,114 B2 *   5/2013   Watanabe ............ G06K 9/6202
                                                    382/159

(Continued)

FOREIGN PATENT DOCUMENTS

JP     11-261993      9/1999
JP     2002-163792    6/2002
(Continued)

OTHER PUBLICATIONS

International Search Report dated Dec. 24, 2013 in International (PCT) Application No. PCT/JP2013/006465.
(Continued)

*Primary Examiner* — Jay Patel
*Assistant Examiner* — Irfan Habib
(74) *Attorney, Agent, or Firm* — Wenderoth, Lind & Ponack, L.L.P.

(57) ABSTRACT

A camera that includes a capture unit, a calculation unit, an object information acquisition unit, and an evaluation unit. The capture unit generates an image by capturing an area in which an evaluation-use object is present. The calculation unit analyzes the image, and thereby detects the evaluation-use object in the image and calculates meaningful information from the evaluation-use object in the image. The object information acquisition unit acquires and stores object information that is meaningful to a user and derived from the evaluation-use object. The evaluation unit performs an evaluation that includes comparing the meaningful information and the object information, and thereby calculating a degree of matching between the meaningful information and
(Continued)

the object information, the evaluation determining whether or not a desired result is obtained from the image.

8 Claims, 32 Drawing Sheets

(51) Int. Cl.
*G08G 1/04* (2006.01)
*G06K 9/00* (2006.01)
*H04N 17/00* (2006.01)

(56) References Cited

U.S. PATENT DOCUMENTS

| | | | | |
|---|---|---|---|---|
| 9,310,977 | B2* | 4/2016 | Ahmed | H04N 5/23206 |
| 9,361,316 | B2* | 6/2016 | Rekimoto | G06F 17/30247 |
| 9,384,383 | B2* | 7/2016 | Hudgins | G06K 9/0061 |
| 9,760,808 | B2* | 9/2017 | Fujii | H04N 7/18 |
| 2008/0247601 | A1* | 10/2008 | Ito | G06K 9/00771 |
| | | | | 382/103 |
| 2008/0267514 | A1* | 10/2008 | Alasia | G07D 7/128 |
| | | | | 382/232 |
| 2009/0207281 | A1* | 8/2009 | Ono | H04N 5/23245 |
| | | | | 348/234 |
| 2009/0316950 | A1* | 12/2009 | Alasia | G06K 9/00577 |
| | | | | 382/100 |
| 2010/0080418 | A1* | 4/2010 | Ito | G06K 9/00228 |
| | | | | 382/103 |
| 2010/0091135 | A1* | 4/2010 | Iwamoto | G06K 9/00221 |
| | | | | 348/229.1 |
| 2010/0142775 | A1* | 6/2010 | Ganeshan | G06K 9/4609 |
| | | | | 382/128 |
| 2011/0280444 | A1* | 11/2011 | Joecker | H04N 5/144 |
| | | | | 382/103 |
| 2012/0002081 | A1* | 1/2012 | Chou | H04N 5/23219 |
| | | | | 348/234 |
| 2012/0134556 | A1* | 5/2012 | Kono | G06T 7/0012 |
| | | | | 382/128 |
| 2012/0183182 | A1* | 7/2012 | Kumar | G06K 9/00442 |
| | | | | 382/119 |
| 2012/0262451 | A1* | 10/2012 | Kotani | H04N 13/0438 |
| | | | | 345/419 |
| 2012/0293693 | A1* | 11/2012 | Sumitomo | H04N 13/0221 |
| | | | | 348/246 |
| 2013/0010095 | A1* | 1/2013 | Aoki | G06K 9/00268 |
| | | | | 348/77 |
| 2013/0120616 | A1* | 5/2013 | Yahata | H04N 5/23229 |
| | | | | 348/239 |

FOREIGN PATENT DOCUMENTS

| | | |
|---|---|---|
| JP | 2003-022494 | 1/2003 |
| JP | 2006-235921 | 9/2006 |
| JP | 2007-334426 | 12/2007 |
| JP | 2009-212701 | 9/2009 |

OTHER PUBLICATIONS

Written Opinion of the International Searching Authority dated Dec. 24, 2013 in International (PCT) Application No. PCT/JP2013/006465.

* cited by examiner

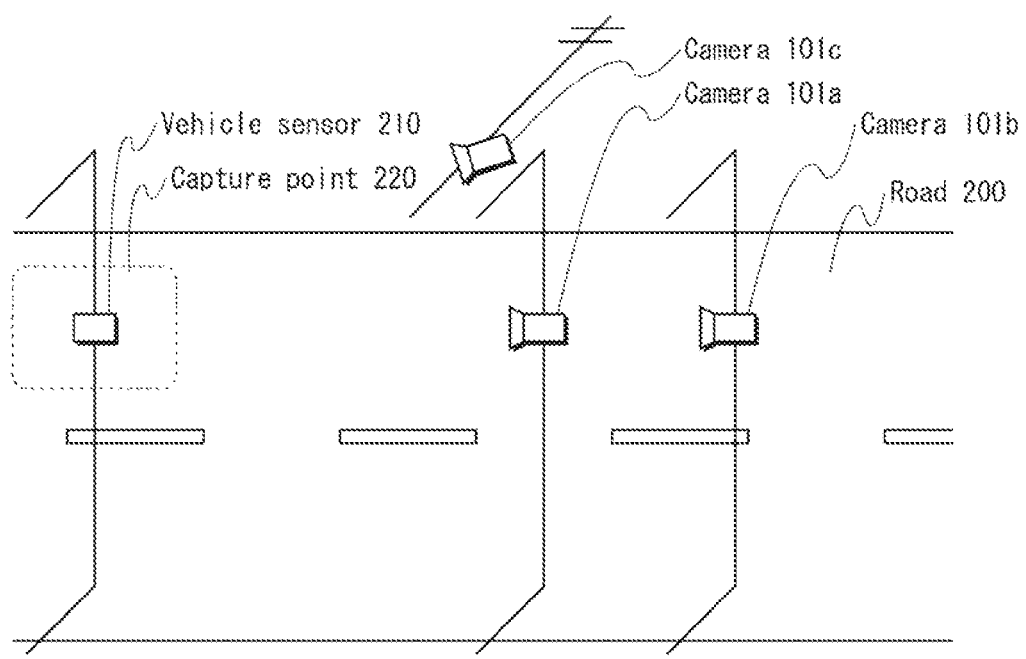

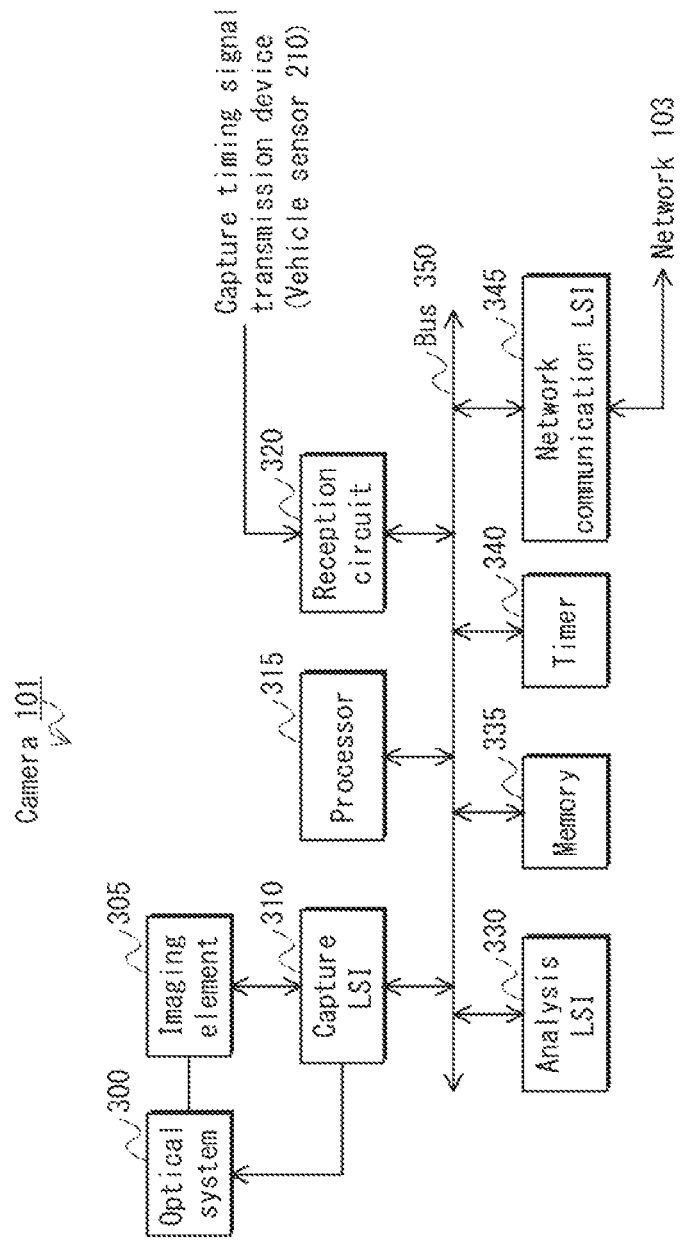

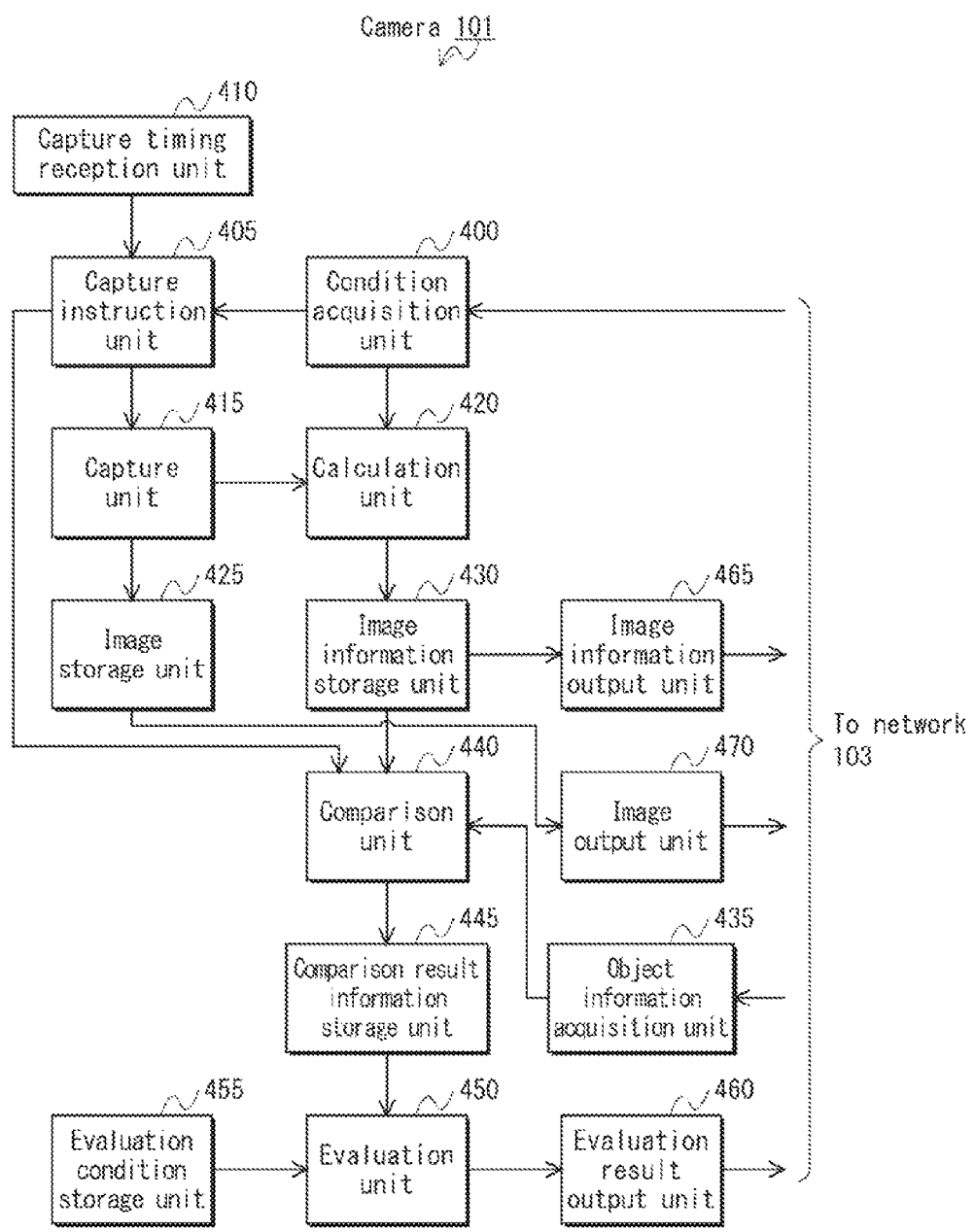

FIG. 5A

Image information 500a

| Times | Analysis results |
|---|---|
| 8:00 | 12-34 |
| 9:00 | 72-34 |
| 10:00 | 12-34 |
| 11:00 | 12-34 |
| 12:00 | 12-34 |
| 13:00 | 12-34 |
| 14:00 | 12-34 |
| 15:00 | 12-34 |
| 16:00 | 12-34 |
| 17:00 | 12-34 |
| 18:00 | 12-34 |
| 19:00 | 12-34 |
| 20:00 | 12-34 |
| 21:00 | 72-34 |
| 22:00 | 12-34 |

FIG. 5B

Image information 500b

| Times | Analysis results |
|---|---|
| 8:00 | 12-34 |
| 9:00 | 12-34 |
| 10:00 | 12-34 |
| 11:00 | 12-34 |
| 12:00 | 12-34 |
| 13:00 | 12-34 |
| 14:00 | 12-34 |
| 15:00 | 12-34 |
| 16:00 | 12-34 |
| 17:00 | 12-34 |
| 18:00 | 12-34 |
| 19:00 | 72-34 |
| 20:00 | 12-34 |
| 21:00 | 72-34 |
| 22:00 | 72-34 |

FIG. 5C

Image information 500c

| Times | Analysis results |
|---|---|
| 8:00 | 72-34 |
| 9:00 | 72-34 |
| 10:00 | 12-34 |
| 11:00 | 12-34 |
| 12:00 | 72-34 |
| 13:00 | 12-34 |
| 14:00 | 12-34 |
| 15:00 | 72-34 |
| 16:00 | 12-34 |
| 17:00 | 12-34 |
| 18:00 | 12-34 |
| 19:00 | 12-34 |
| 20:00 | 12-34 |
| 21:00 | 12-34 |
| 22:00 | 12-34 |

FIG. 6

Object information 600

| Times (601) | Expected values (602) |
|---|---|
| 8:00 | 12-34 |
| 9:00 | 12-34 |
| 10:00 | 12-34 |
| 11:00 | 12-34 |
| 12:00 | 12-34 |
| 13:00 | 12-34 |
| 14:00 | 12-34 |
| 15:00 | 12-34 |
| 16:00 | 12-34 |
| 17:00 | 12-34 |
| 18:00 | 12-34 |
| 19:00 | 12-34 |
| 20:00 | 12-34 |
| 21:00 | 12-34 |
| 22:00 | 12-34 |

FIG. 7A

Comparison result information 700a

| Times (701) | Comparison results (702) |
|---|---|
| 8:00 | Match |
| 9:00 | Different |
| 10:00 | Match |
| 11:00 | Match |
| 12:00 | Match |
| 13:00 | Match |
| 14:00 | Match |
| 15:00 | Match |
| 16:00 | Match |
| 17:00 | Match |
| 18:00 | Match |
| 19:00 | Match |
| 20:00 | Match |
| 21:00 | Different |
| 22:00 | Match |

FIG. 7B

Comparison result information 700b

| Times (711) | Comparison results (712) |
|---|---|
| 8:00 | Match |
| 9:00 | Match |
| 10:00 | Match |
| 11:00 | Match |
| 12:00 | Match |
| 13:00 | Match |
| 14:00 | Match |
| 15:00 | Match |
| 16:00 | Match |
| 17:00 | Match |
| 18:00 | Match |
| 19:00 | Different |
| 20:00 | Match |
| 21:00 | Different |
| 22:00 | Different |

FIG. 7C

Comparison result information 700c

| Times (721) | Comparison results (722) |
|---|---|
| 8:00 | Different |
| 9:00 | Different |
| 10:00 | Match |
| 11:00 | Match |
| 12:00 | Different |
| 13:00 | Match |
| 14:00 | Match |
| 15:00 | Different |
| 16:00 | Match |
| 17:00 | Match |
| 18:00 | Match |
| 19:00 | Match |
| 20:00 | Match |
| 21:00 | Match |
| 22:00 | Match |

Evaluation result 800a

13/15

Evaluation result 800b

12/15

Evaluation result 800c

Image information 1800d

| Times | Analysis results |
|---|---|
| 6:00 | 5 |
| 6:30 | 8 |
| 7:00 | 18 |
| 7:15 | 15 |
| 7:30 | 21 |
| 7:45 | 23 |
| 8:00 | 20 |
| 8:30 | 16 |
| 9:00 | 13 |
| ⋮ | ⋮ |
| 22:00 | 7 |
| 22:30 | 4 |
| 23:00 | 3 |
| 23:30 | 1 |

FIG. 18B

Image information 1800e

| Times | Analysis results |
|---|---|
| 6:00 | 5 |
| 6:30 | 7 |
| 7:00 | 16 |
| 7:15 | 14 |
| 7:30 | 21 |
| 7:45 | 21 |
| 8:00 | 18 |
| 8:30 | 14 |
| 9:00 | 12 |
| ⋮ | ⋮ |
| 22:00 | 6 |
| 22:30 | 4 |
| 23:00 | 3 |
| 23:30 | 1 |

FIG. 18C

Image information 1800f

| Times | Analysis results |
|---|---|
| 6:00 | 6 |
| 6:30 | 8 |
| 7:00 | 19 |
| 7:15 | 15 |
| 7:30 | 22 |
| 7:45 | 23 |
| 8:00 | 22 |
| 8:30 | 16 |
| 9:00 | 14 |
| ⋮ | ⋮ |
| 22:00 | 7 |
| 22:30 | 5 |
| 23:00 | 3 |
| 23:30 | 1 |

FIG. 19

Object information 1900

| Times | Expected values |
|---|---|
| 6:00 | 5 |
| 6:30 | 8 |
| 7:00 | 18 |
| 7:15 | 16 |
| 7:30 | 21 |
| 7:45 | 23 |
| 8:00 | 21 |
| 8:30 | 16 |
| 9:00 | 13 |
| ⋮ | ⋮ |
| 22:00 | 6 |
| 22:30 | 4 |
| 23:00 | 3 |
| 23:30 | 1 |

Comparison result
information 2000d

| Times | Comparison results | Evaluation value |
|---|---|---|
| 6:00 | 100% | |
| 6:30 | 100% | |
| 7:00 | 100% | |
| 7:15 | 94% | |
| 7:30 | 100% | |
| 7:45 | 100% | |
| 8:00 | 95% | 98% |
| 8:30 | 100% | |
| 9:00 | 100% | |
| ⋮ | ⋮ | |
| 22:00 | 117% | |
| 22:30 | 100% | |
| 23:00 | 100% | |
| 23:30 | 100% | |

FIG. 20B

Comparison result
information 2000e

| Times | Comparison results | Evaluation value |
|---|---|---|
| 6:00 | 100% | |
| 6:30 | 88% | |
| 7:00 | 89% | |
| 7:15 | 88% | |
| 7:30 | 100% | |
| 7:45 | 91% | |
| 8:00 | 86% | 88% |
| 8:30 | 88% | |
| 9:00 | 92% | |
| ⋮ | ⋮ | |
| 22:00 | 100% | |
| 22:30 | 100% | |
| 23:00 | 100% | |
| 23:30 | 100% | |

FIG. 20C

Comparison result
information 2000f

| Times | Comparison results | Evaluation value |
|---|---|---|
| 6:00 | 120% | |
| 6:30 | 100% | |
| 7:00 | 105% | |
| 7:15 | 100% | |
| 7:30 | 105% | |
| 7:45 | 100% | |
| 8:00 | 105% | 105% |
| 8:30 | 100% | |
| 9:00 | 108% | |
| ⋮ | ⋮ | |
| 22:00 | 117% | |
| 22:30 | 125% | |
| 23:00 | 100% | |
| 23:30 | 100% | |

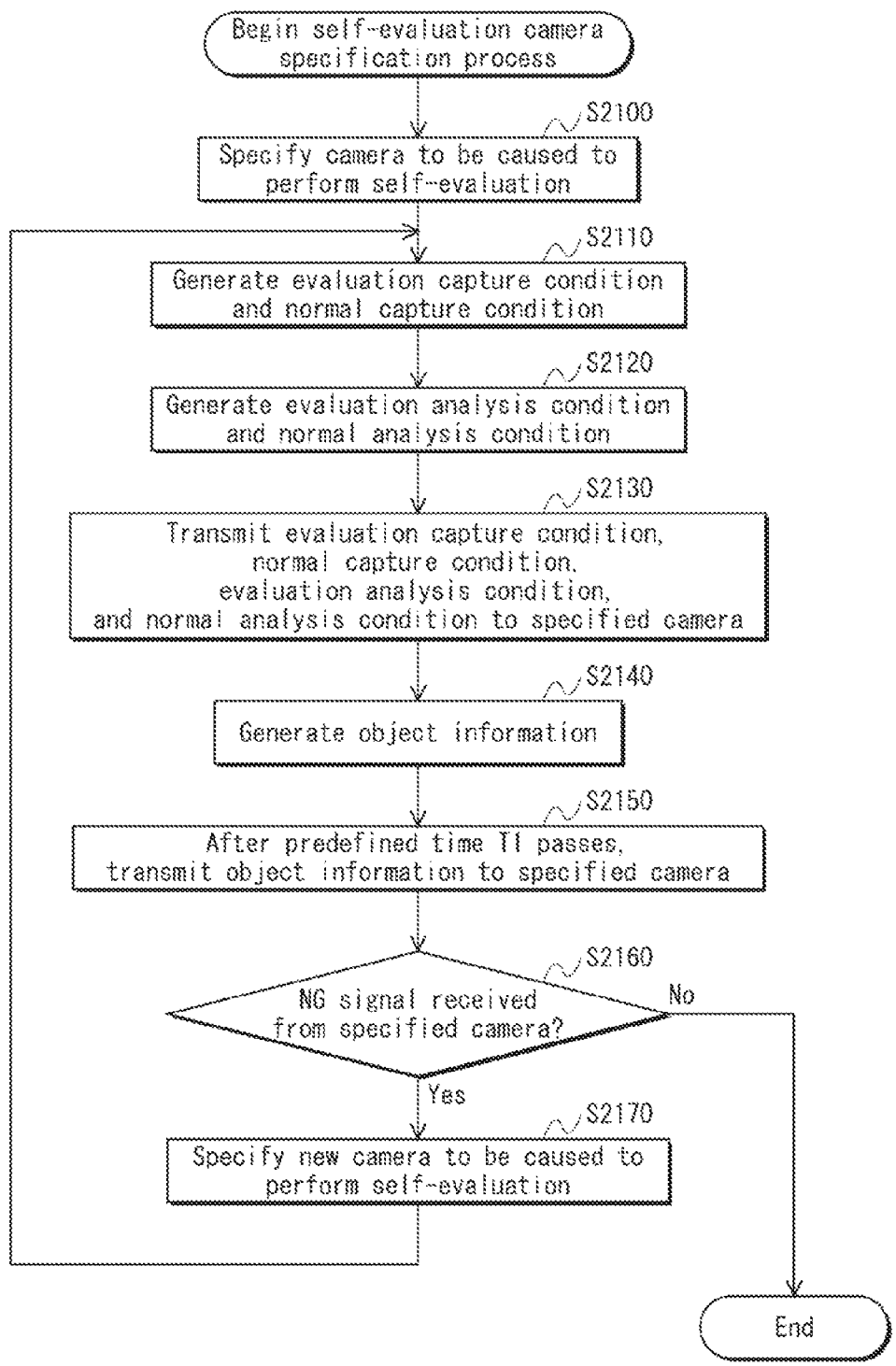

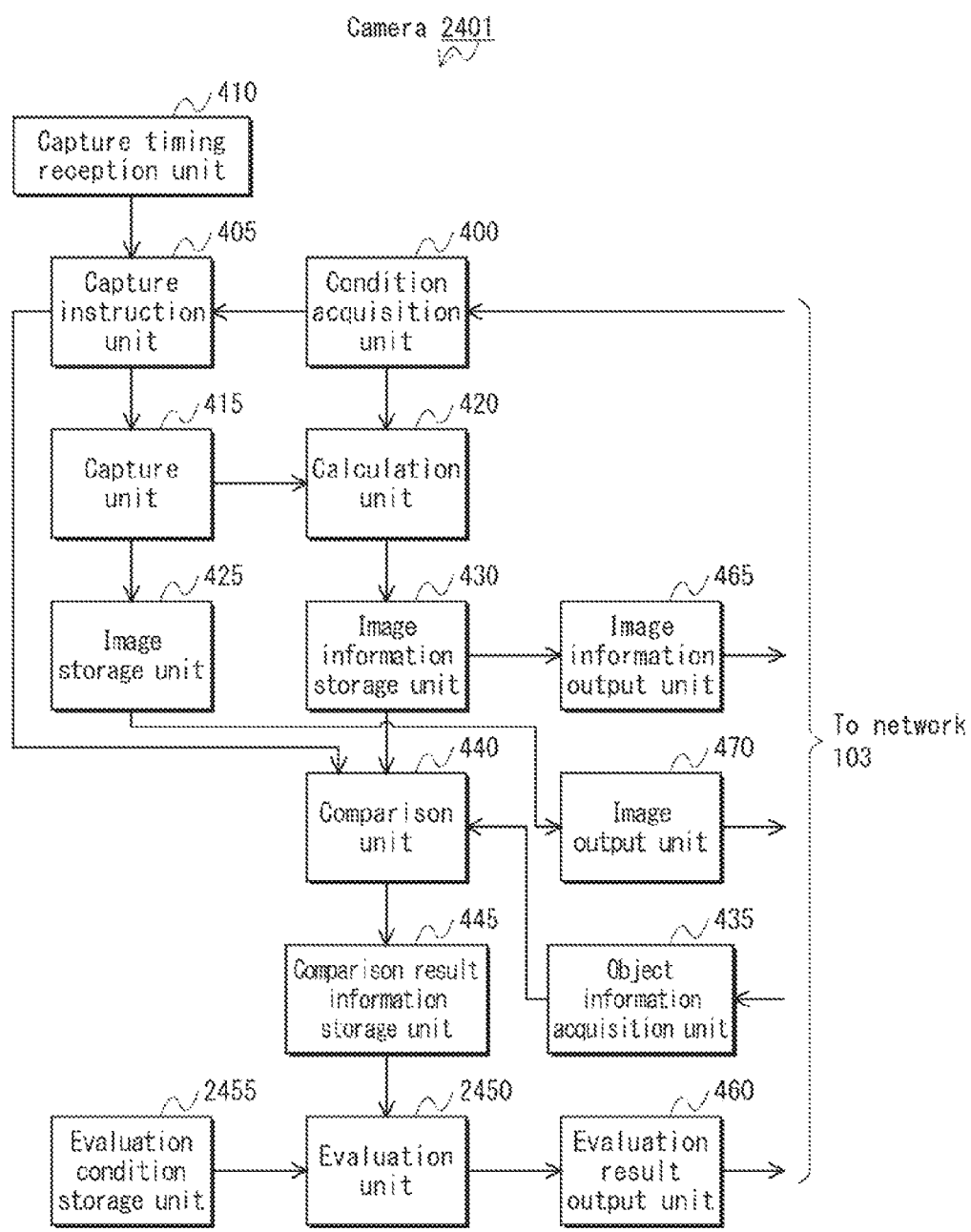

FIG. 25A

Evaluation result
2500a

| Time periods | Degrees of matching |
|---|---|
| 8:00-16:00 | 8/9 |
| 17:00-22:00 | 5/6 |

FIG. 25B

Evaluation result
2500b

| Time periods | Degrees of matching |
|---|---|
| 8:00-16:00 | 9/9 |
| 17:00-22:00 | 3/6 |

FIG. 25C

Evaluation result
2500c

| Time periods | Degrees of matching |
|---|---|
| 8:00-16:00 | 5/9 |
| 17:00-22:00 | 6/6 |

FIG. 27A

Image information 2700a

| Times | Analysis results |
|---|---|
| 8:00 | Male |
| 9:00 | Female |
| 10:00 | None |
| 11:00 | Female |
| 12:00 | Male |
| 13:00 | None |
| 14:00 | None |
| 15:00 | Female |
| 16:00 | Female |
| 17:00 | Male |
| 18:00 | Male |
| 19:00 | Female |
| 20:00 | None |
| 21:00 | Male |
| 22:00 | None |

FIG. 27B

Image information 2700b

| Times | Analysis results |
|---|---|
| 8:00 | Male |
| 9:00 | Male |
| 10:00 | None |
| 11:00 | Female |
| 12:00 | Male |
| 13:00 | None |
| 14:00 | None |
| 15:00 | Female |
| 16:00 | Female |
| 17:00 | Male |
| 18:00 | Male |
| 19:00 | Male |
| 20:00 | None |
| 21:00 | None |
| 22:00 | Female |

FIG. 27C

Image information 2700c

| Times | Analysis results |
|---|---|
| 8:00 | Female |
| 9:00 | None |
| 10:00 | None |
| 11:00 | Female |
| 12:00 | Female |
| 13:00 | None |
| 14:00 | None |
| 15:00 | Female |
| 16:00 | Female |
| 17:00 | Male |
| 18:00 | Male |
| 19:00 | Female |
| 20:00 | None |
| 21:00 | Female |
| 22:00 | None |

FIG. 28

Object information 2800

| Times | Expected values |
|---|---|
| 8:00 | Male |
| 9:00 | Male |
| 10:00 | None |
| 11:00 | Female |
| 12:00 | Male |
| 13:00 | None |
| 14:00 | None |
| 15:00 | Female |
| 16:00 | Female |
| 17:00 | Male |
| 18:00 | Male |
| 19:00 | Female |
| 20:00 | None |
| 21:00 | Female |
| 22:00 | None |

2801 / 2802

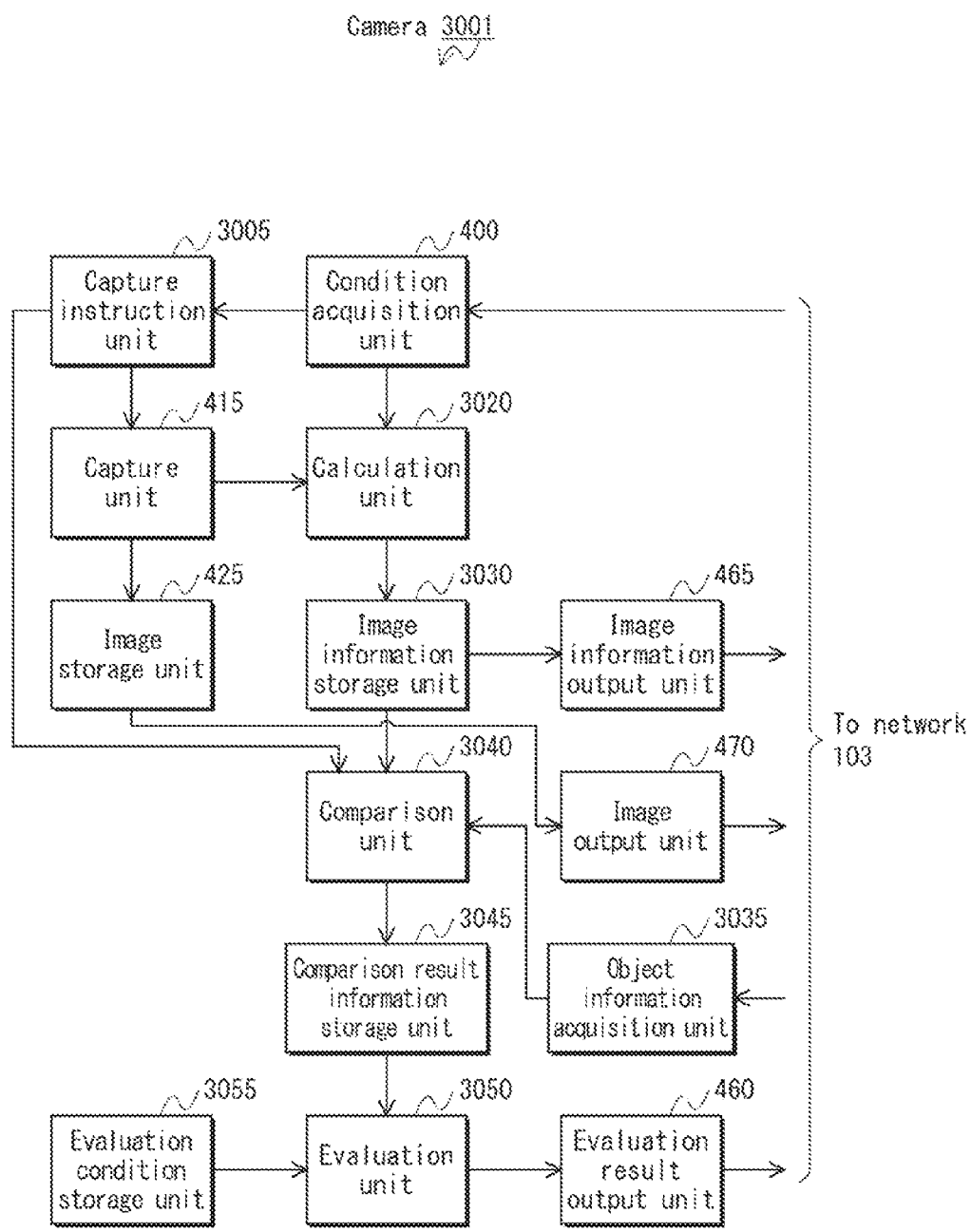

FIG. 31A

Image information 3100a

| Times | Analysis results | | | | | | | |
|---|---|---|---|---|---|---|---|---|
| | Age ≤ 19 males | Age ≤ 19 females | Age 20-39 males | Age 20-39 females | Age 40-59 males | Age 40-59 females | Age ≥ 60 males | Age ≥ 60 females |
| 10:00 | 5 | 8 | 5 | 18 | 7 | 14 | 6 | 18 |
| 12:00 | 6 | 7 | 5 | 21 | 8 | 23 | 5 | 18 |
| ⋮ | ⋮ | ⋮ | ⋮ | ⋮ | ⋮ | ⋮ | ⋮ | ⋮ |
| 18:00 | 3 | 3 | 4 | 15 | 10 | 20 | 4 | 21 |

Image information 3100b

| Times | Analysis results | | | | | | | |
|---|---|---|---|---|---|---|---|---|
| | Age ≤ 19 males | Age ≤ 19 females | Age 20-39 males | Age 20-39 females | Age 40-59 males | Age 40-59 females | Age ≥ 60 males | Age ≥ 60 females |
| 10:00 | 4 | 8 | 6 | 18 | 5 | 15 | 7 | 18 |
| 12:00 | 6 | 8 | 5 | 20 | 8 | 23 | 6 | 18 |
| ⋮ | ⋮ | ⋮ | ⋮ | ⋮ | ⋮ | ⋮ | ⋮ | ⋮ |
| 18:00 | 3 | 2 | 4 | 15 | 8 | 21 | 4 | 20 |

Image information 3100c

| Times | Analysis results | | | | | | | |
|---|---|---|---|---|---|---|---|---|
| | Age ≤ 19 males | Age ≤ 19 females | Age 20-39 males | Age 20-39 females | Age 40-59 males | Age 40-59 females | Age ≥ 60 males | Age ≥ 60 females |
| 10:00 | 5 | 8 | 5 | 18 | 6 | 15 | 6 | 19 |
| 12:00 | 5 | 7 | 6 | 20 | 8 | 24 | 6 | 18 |
| ⋮ | ⋮ | ⋮ | ⋮ | ⋮ | ⋮ | ⋮ | ⋮ | ⋮ |
| 18:00 | 3 | 5 | 4 | 15 | 9 | 20 | 3 | 21 |

Object information 3200

| Times | Age ≤ 19 males | Age ≤ 19 females | Age 20-39 males | Age 20-39 females | Age 40-59 males | Age 40-59 females | Age ≥ 60 males | Age ≥ 60 females |
|---|---|---|---|---|---|---|---|---|
| | Expected values | | | | | | | |
| 10:00 | 5 | 8 | 5 | 18 | 6 | 15 | 6 | 18 |
| 12:00 | 6 | 7 | 5 | 21 | 8 | 23 | 6 | 18 |
| ⋮ | ⋮ | ⋮ | ⋮ | ⋮ | ⋮ | ⋮ | ⋮ | ⋮ |
| 18:00 | 3 | 3 | 4 | 15 | 9 | 20 | 4 | 21 |

Comparison result information 3300a

| Times | Comparison results | | | | | | | |
|---|---|---|---|---|---|---|---|---|
| | Age ≤ 19 males | Age ≤ 19 females | Age 20-39 males | Age 20-39 females | Age 40-59 males | Age 40-59 females | Age ≥ 60 males | Age ≥ 60 females |
| 10:00 | Match | Match | Match | Match | Different | Different | Match | Match |
| 12:00 | Match | Match | Match | Match | Match | Match | Different | Match |
| ⋮ | ⋮ | ⋮ | ⋮ | ⋮ | ⋮ | ⋮ | ⋮ | ⋮ |
| 18:00 | Match | Match | Match | Match | Different | Match | Match | Match |

FIG. 33B

Comparison result information 3300b

| Times | Comparison results | | | | | | | |
|---|---|---|---|---|---|---|---|---|
| | Age ≤ 19 males | Age ≤ 19 females | Age 20-39 males | Age 20-39 females | Age 40-59 males | Age 40-59 females | Age ≥ 60 males | Age ≥ 60 females |
| 10:00 | Different | Match | Different | Match | Different | Match | Different | Match |
| 12:00 | Match | Different | Match | Different | Match | Match | Match | Match |
| ⋮ | ⋮ | ⋮ | ⋮ | ⋮ | ⋮ | ⋮ | ⋮ | ⋮ |
| 18:00 | Match | Different | Match | Match | Different | Different | Match | Different |

FIG. 33C

Comparison result information 3300c

| Times | Comparison results | | | | | | | |
|---|---|---|---|---|---|---|---|---|
| | Age ≤ 19 males | Age ≤ 19 females | Age 20-39 males | Age 20-39 females | Age 40-59 males | Age 40-59 females | Age ≥ 60 males | Age ≥ 60 females |
| 10:00 | Match | Match | Match | Match | Match | Match | Match | Different |
| 12:00 | Different | Match | Different | Different | Match | Different | Match | Match |
| ⋮ | ⋮ | ⋮ | ⋮ | ⋮ | ⋮ | ⋮ | ⋮ | ⋮ |
| 18:00 | Match | Different | Match | Match | Match | Match | Different | Match |

Evaluation result 3400a  
35/40

Evaluation result 3400b  
24/40

Evaluation result 3400c  
29/40

CAMERA, CAMERA SYSTEM, AND SELF-DIAGNOSIS METHOD

TECHNICAL FIELD

The present invention relates to technology for signal processing performed using images.

BACKGROUND ART

In recent years, in residential areas, commercial areas, etc., many cameras such as surveillance cameras, car-mounted cameras, etc., are capturing images. A user of such cameras, when intending to capture images in order to acquire desired information, selects and uses a camera that is thought to perform image capture beneficial to the user from among such cameras.

For example, in Patent Literature 1, technology is disclosed by which a camera is selected that is thought to perform image capture beneficial to a user from among multiple cameras set up at an intersection, etc. The selection is made using image capture metadata (capture position information, capture direction information, capture resolution information, etc.) linked to images captured by the cameras. The image capture metadata denotes circumstances in which the images are captured.

CITATION LIST

Patent Literature

[Patent Literature 1]
Japanese Patent Application Publication 2007-334426

SUMMARY OF INVENTION

However, while the technology disclosed in Patent Literature 1 uses image capture metadata to infer characteristics pertaining to images that are captured by cameras, the accuracy of inferring whether or not a camera that is selected performs image capturing beneficial to the user has certain limitations.

Thus, the present invention has the aim of providing a camera that allows inferring with higher accuracy than conventional technology whether or not the camera performs image capturing beneficial to the user.

To achieve the above aim, a camera pertaining to one aspect of the present invention comprises: a capture unit that generates an image by capturing an area in which an evaluation-use object is present; a calculation unit that analyzes the image, and thereby detects the evaluation-use object in the image and calculates meaningful information from the evaluation-use object in the image; an object information acquisition unit that acquires and stores object information that is meaningful to a user and derived from the evaluation-use object; and an evaluation unit that performs an evaluation that includes comparing the meaningful information and the object information, and thereby calculating a degree of matching between the meaningful information and the object information, the evaluation determining whether or not a desired result is obtained from the image.

According to the camera pertaining to one aspect of the present invention, which is provided with the above-mentioned configuration, a user of the camera can use a result of the self-evaluation that is performed by using actual images captured by the camera. Thus, the user can infer, with greater accuracy than conventional technology allows, whether or not the capturing of images by the camera is beneficial to the user.

BRIEF DESCRIPTION OF DRAWINGS

FIG. 2 is a schematic diagram showing a situation in which cameras 101a to 101c are set up on a street.

FIG. 3 is a circuit diagram of a camera 101.

FIG. 4 is a block diagram showing a function configuration of the camera 101.

FIG. 5A is a data configuration diagram of image information 500a, FIG. 5B is a data configuration diagram of image information 500b, and FIG. 5C is a data configuration diagram of image information 500c.

FIG. 6 is a data configuration diagram of object information 600.

FIG. 7A is a data configuration diagram of comparison result information 700a, FIG. 7B is a data configuration diagram of comparison result information 700b, and FIG. 7C is a data configuration diagram of comparison result information 700c.

FIG. 18A is a data configuration diagram of image information 1800d, FIG. 18B is a data configuration diagram of image information 1800e, and FIG. 18C is a data configuration diagram of image information 1800f.

FIG. 19 is a data configuration diagram of object information 1900.

FIG. 20A is a data configuration diagram of comparison result information 2000d, FIG. 20B is a data configuration diagram of comparison result information 2000e, and FIG. 20C is a data configuration diagram of comparison result information 2000f.

FIG. 21 is a flowchart of a self-evaluation camera specification process.

FIG. 24 is a block diagram showing a function configuration of a camera 2401.

FIG. 25A is a data configuration diagram of an evaluation result 2500a, FIG. 25B is a data configuration diagram of an evaluation result 2500b, and FIG. 25C is a data configuration diagram of an evaluation result 2500c.

FIG. 27A is a data configuration diagram of image information 2700a, FIG. 27B is a data configuration diagram of image information 2700b, and FIG. 27C is a data configuration diagram of image information 2700c.

FIG. 28 is a data configuration diagram of object information 2800.

FIG. 30 is a block diagram showing a function configuration of a camera 3001.

FIG. 31A is a data configuration diagram of image information 3100a, FIG. 31B is a data configuration diagram of image information 3100b, and FIG. 31C is a data configuration diagram of image information 3100c.

FIG. 32 is a data configuration diagram of object information 3200.

FIG. 33A is a data configuration diagram of comparison result information 3300a, FIG. 33B is a data configuration diagram of comparison result information 3300b, and FIG. 33C is a data configuration diagram of comparison result information 3300c.

DESCRIPTION OF EMBODIMENTS

Embodiment 1

<Summary>

The following describes a camera system that includes a plurality of cameras set up on a street and a management server that communicates with the cameras, as an embodiment of a camera, a camera system, and a self-evaluation method performed by a camera, pertaining to aspects of the present invention.

Each camera in the camera system performs, based on a signal transmitted from the management server, a self-evaluation to gain information used to infer whether or not the camera performs image capturing beneficial to the user of this camera system. Further, the camera transmits information gained as a result of the self-evaluation to the management server. Thereupon, the management server notifies the user of the information.

Here, the self-evaluation performed by the camera is a three-part process. First, the camera captures, based on an evaluation capture condition transmitted from the management server, images that include a number plate of a vehicle that travels across a predefined capture point. The camera then analyzes the images so captured, based on an evaluation analysis condition transmitted from the management server, and thereby specifies a character string displayed on the number plate. The camera then compares, by using a predefined method, the character string so specified and an expected value transmitted from the management server, and thereby calculates a comparison result.

Further, in addition to the capturing of images for the self-evaluation, the camera performs capturing of images other than the images used for the self-evaluation, based on a signal transmitted from the management server.

The following describes details of the camera system with reference to the drawings.

<Configuration>

Figure 1:
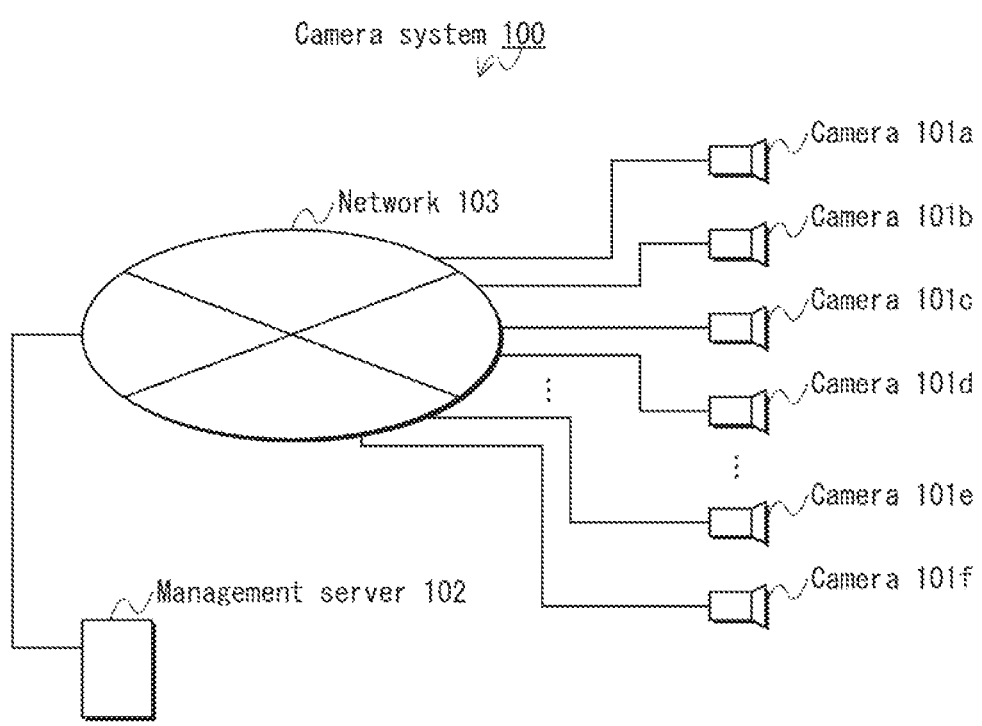
FIG. 1 is a system configuration diagram showing a configuration of a camera system 100.

FIG. 1 is a system configuration diagram showing a configuration of a camera system 100.

As shown in FIG. 1, the camera system 100 is composed of a plurality of cameras 101a to 101f, a management server 102, and a network 103.

Each of the cameras 101a to 101f communicates with the management server 102 via the network 103.

FIG. 2 is a schematic diagram showing a situation in which cameras 101a to 101c are set up on a street.

As shown in FIG. 2, each of the cameras 101a to 101c is set up in the vicinity of a road 200 so as to be able to capture vehicles travelling through a capture point 220 that is set up on the road 200.

A vehicle sensor 210 that detects vehicles is set up above the capture point 220.

Further, the vehicle sensor 210 and the cameras 101a to 101c are connected by wiring that is not illustrated.

The vehicle sensor 210 has a function of detecting, by using infrared, vehicles that travel through the capture point 220. The vehicle sensor 210 also has a function of transmitting, via the wiring, a capture timing signal to each of the cameras 101a to 101c. The capture timing signal indicates that a vehicle is travelling through the capture point 220, and is transmitted when a vehicle is detected.

The following does not describe each of the cameras 101a to 101c separately, and instead the cameras 101a to 101c are described using a camera 101 representing the cameras 101a to 101c.

However, as long as each of the cameras 101a to 101c are able to execute the same functions that the camera 101 executes, the cameras 101a to 101c are not necessarily limited to having the configuration of the camera 101 described below. Further, as long as each of the cameras 101a to 101c is able to execute the functions that the camera 101 executes, the cameras 101a to 101c are not necessarily limited to having the same configuration as each other. In a case in which the cameras 101a to 101c do not have the same configuration, the functions executed by the cameras 101a to 101c may exhibit a performance difference.

FIG. 3 is a circuit diagram of the camera 101.

As shown in FIG. 3, the camera 101 is composed of an optical system 300, an imaging element 305, a capture large scale integration (LSI) 310, a processor 315, a reception circuit 320, an analysis LSI 330, a memory 335, a timer 340, a network communication LSI 345, and a bus 350.

The following describes these components of the camera 101 in turn.

The optical system 300 is connected to the capture LSI 310 and controlled by the capture LSI 310. The optical system 300 includes, for example, a lens, a servomotor, etc., and is a device group for collecting light from an object and forming an image of the object on a main surface of the imaging element 305.

The imaging element 305 is connected to the capture LSI 310 and controlled by the capture LSI 310. The imaging element 305 has a function of converting the image of the object formed by light being collected on the main surface thereof into an electric signal and a function of outputting the electric signal to the capture LSI 310. As an example, the imaging element may be implemented by a complementary metal oxide semiconductor (CMOS) image sensor.

The bus 350 is connected to the capture LSI 310, the processor 315, the reception circuit 320, the analysis LSI 330, the memory 335, the timer 340, and the network communication LSI 345. The bus 350 has a function of transmitting signals between circuits connected thereby.

The capture LSI 310 is connected to the optical system 300, the imaging element 305, and the bus 350, and is controlled by the processor 315. The capture LSI 310 has a function of controlling the optical system 300 and the imaging element 305 to capture the image of the object. The capture LSI 310 also has a function of causing the image to be stored at a predefined storage area of the memory 335.

The reception circuit 320 is connected to the bus 350 and further connected via wiring to a capture timing signal transmission device (in embodiment 1, the vehicle sensor 210) external to the camera 101. The reception circuit 320 is controlled by the processor 315. The reception circuit 320 has a function of receiving a capture timing signal transmitted from the capture timing signal transmission device.

The analysis LSI 330 is connected to the bus 350 and controlled by the processor 315. The analysis LSI 330 has a function of analyzing the image stored in the memory 335 by using an algorithm specified by the processor 315, and a function of outputting information gained as a result of the analysis to the processor 315. In embodiment 1, the analysis of the image performed by the analysis LSI 330 is a process to specify a character string displayed on a number plate of a vehicle included in the image. The information gained as the result of the analysis denotes the specified character string.

The memory 335 is connected to the bus 350. The memory 335 is composed of random access memory (RAM), read only memory (ROM), and removable flash memory. The memory 335 stores programs that regulate operation of the processor 315, data used by the processor 315, and the image that the capture LSI 310 causes to be captured, each in a respective predefined storage area of the memory 335.

The timer 340 is connected to the bus 350 and controlled by the processor 315. The timer 340 has a function of measuring time.

The network communication LSI 345 is connected to the bus 350, and is also connected to the network 103, which is external to the camera 101. The network communication LSI 345 is controlled by the processor 315. The network communication LSI 345 has a function of communicating with the management server 102 via the network 103, by using a predefined protocol.

The processor 315 is connected to the bus 350. By executing programs stored in the memory 335, the processor 315 controls the reception circuit 320, the analysis LSI 330, the memory 335, the timer 340, and the network communication LSI 345, thereby implementing the following three functions.

Self-evaluation function: A function of controlling the camera 101 to cause the camera 101 to execute the self-evaluation process, which is a characteristic operation of the camera 101, and perform a self-evaluation.

Note that the self-evaluation process performed by the camera 101 and the self-evaluation implemented by execution of the self-evaluation process are described in detail using a flowchart, under the later heading <Self-evaluation process>.

Normal capture function: A function of controlling the camera 101 to cause the camera 101 to execute the normal capture process, which is a characteristic operation of the camera 101, and capture images other than the images for the self-evaluation (hereafter, "normal images").

Note that the normal capture process performed by the camera 101 is described in detail using a flowchart, under the later heading <Normal capture process>.

Camera-side normal capture configuration function: A function of controlling the camera 101 to cause the camera 101 to execute a camera-side normal capture configuration process, which is a characteristic operation of the camera 101, and switch a capture condition, etc., that is configured for capturing images for self-evaluation to a configuration for capturing normal images.

Note that the camera-side normal capture configuration process performed by the camera 101 is described in detail using a flowchart, under the later heading <Normal Capture Configuration Process>.

A configuration of the camera 101 that has the above-described circuit configuration is described below from a function perspective.

FIG. 4 is a block diagram showing a function configuration of the camera 101.

As shown in FIG. 4, the camera 101 includes a condition acquisition unit 400, a capture instruction unit 405, a capture timing reception unit 410, a capture unit 415, a calculation unit 420, an image storage unit 425, an image information storage unit 430, an object information acquisition unit 435, a comparison unit 440, a comparison result information storage unit 445, an evaluation unit 450, an evaluation condition storage unit 455, an evaluation result output unit 460, an image information output unit 465, and an image output unit 470.

The following describes these functional blocks of the camera 101 in turn.

The condition acquisition unit 400 is implemented by the network communication LSI 345 and the processor 315 executing a program. The condition acquisition unit 400 has a function of acquiring, via the network 103, an evaluation capture condition, a normal capture condition, an evaluation analysis condition, and a normal analysis condition, all output from the management server 102. The condition acquisition unit 400 also has a function of transmitting the evaluation capture condition and the normal capture condition so acquired to the capture instruction unit 405, and of transmitting the evaluation analysis condition and the normal analysis condition so acquired to the calculation unit 420.

The evaluation capture condition is information generated by the management server 102 and includes configuration conditions of the camera 101 and a condition of capture time that apply when the camera 101 performs the self-evaluation process.

Here, the configuration conditions of the camera 101 are conditions for specifying configurations of the camera 101 required for capturing an image, such as capture direction, view angle, aperture value, etc. Further, the condition of capture time is a condition for specifying times to capture images.

The normal capture condition is information generated by the management server 102 and includes configuration conditions of the camera 101 and the condition of capture time that apply when the camera 101 performs the normal capture process.

The evaluation analysis condition is information generated by the management server 102. The evaluation analysis condition is a condition for analyzing images that, for example, specifies an algorithm used for analysis of images and a format of analysis results, which apply when the camera 101 performs the self-evaluation process.

The normal analysis condition is information generated by the management server 102. The normal analysis condition is a condition for analyzing images that specifies an algorithm used for analysis of images, specifies a format of analysis results, etc., which apply when the camera 101 performs the normal capture process.

The capture timing reception unit 410 is implemented by the reception circuit 320 and the processor 315 executing a program. The capture timing reception unit 410 has a function of receiving the capture timing signal outputted from the vehicle sensor 210 and a function of transmitting the capture timing signal so received to the capture instruction unit 405.

The capture unit 415 is implemented by the optical system 300, the imaging element 305, the capture LSI 310, and the timer 340. The capture unit 415 has the following two functions.

Capture function: A function of capturing an image of an object when a capture signal is transmitted from the capture instruction unit 405. The capture signal specifies capture timing.

Image transmission function: A function of linking an image captured and capture time information that denotes capture time to each other, and transmitting, linked together, the image and the capture time information to the calculation unit 420 and the image storage unit 425.

Here, the image capture by the capture unit 415 is performed based on a condition of image capture (the evaluation capture condition or the normal capture condition) configured by the capture instruction unit 405.

The capture instruction unit 405 is implemented by the timer 340 and the processor 315 executing a program. The capture instruction unit 405 implements the following three functions.

Capture instruction unit configuration function: A function of configuring a condition of image capture performed by the capture unit 415. This configuration is based on a configuration condition included in the evaluation capture condition or the normal capture condition transmitted from the condition acquisition unit 400.

Capture trigger function: A function of transmitting the capture signal to the capture unit 415 when the capture timing signal is transmitted from the capture timing reception unit 410 in a time period that falls within a "capture time condition". The "capture time condition" is included in the evaluation capture condition or the normal capture condition transmitted from the condition acquisition unit 400.

In the following, the "capture time condition" included in the evaluation capture condition is described as time periods of: between 8:00:00 a.m. and 8:00:59 a.m. (hereafter, also referred to as "8:00"), between 9:00:00 a.m. and 9:00:59 a.m. (hereafter, also referred to as "9:00"), between 10:00:00 a.m. and 10:00:59 a.m. (hereafter, also referred to as "10:00"), between 11:00:00 a.m. and 11:00:59 a.m. (hereafter, also referred to as "11:00"), between 12:00:00 noon and 12:00:59 p.m. (hereafter, also referred to as "12:00"), between 1:00:00 p.m. and 1:00:59 p.m. (hereafter, also referred to as "13:00"), between 2:00:00 p.m. and 2:00:59 p.m. (hereafter, also referred to as "14:00"), between 3:00:00 p.m. and 3:00:59 p.m. (hereafter, also referred to as "15:00"), between 4:00:00 p.m. and 4:00:59 p.m. (hereafter, also referred to as "16:00"), between 5:00:00 p.m. and 5:00:59 p.m. (hereafter, also referred to as "17:00"), between 6:00:00 p.m. and 6:00:59 p.m. (hereafter, also referred to as "18:00"), between 7:00:00 p.m. and 7:00:59 p.m. (hereafter, also referred to as "19:00"), between 8:00:00 p.m. and 8:00:59 p.m. (hereafter, also referred to as "20:00"), between 9:00:00 p.m. and 9:00:59 p.m. (hereafter, also referred to as "21:00"), and between 10:00:00 p.m. and 10:00:59 p.m. (hereafter, also referred to as "22:00").

Comparison trigger function: A function of transmitting a comparison signal to the comparison unit 440 when a predefined time T1 (for example, 24 hours) passes from transmission of the evaluation capture condition from the condition acquisition unit 400. The comparison signal indicates that comparison of image information (described later) stored in the image information storage unit 430 and object information (described later) acquired by the object information acquisition unit 435 is to begin.

The calculation unit 420 is implemented by the analysis LSI 330 and the processor 315 executing a program. The calculation unit 420 has the following three functions.

Calculation unit configuration function: A function of configuring the calculation unit 420 based on the evaluation analysis condition or the normal analysis condition transmitted from the condition acquisition unit 400.

Hereafter, the configuration of the calculation unit 420 based on the evaluation analysis condition or the normal analysis condition is described as a configuration of the calculation unit 420 to perform a process of specifying a character string displayed on a number plate of a vehicle included in images transmitted from the capture unit 415. Here, the configuration is considered to be performed by specifying a number plate recognition algorithm from among a plurality of algorithms previously stored in a predefined memory area of the memory 335.

Analysis function: A function of, when an image is transmitted from the capture unit 415, analyzing the image by using the algorithm specified by the calculation unit configuration function in order to specify a character string displayed on a number plate of a vehicle included in the image.

Hereafter, the term "character string" refers to as a number identifying a vehicle that is composed of at least one number and a hyphen. However, a character string may include, for example, an alphabet character, a Japanese character (kanji, hiragana), a symbol, a figure, etc.

Image information update function: A function of, when an image is analyzed and a character string displayed on a number plate in the image is specified, linking the character string and a time at which the image transmitted from the capture unit 415 was captured, and (i) when image information is not being stored in the image information storage unit 430, creating image information and thereby causing the image information storage unit 430 to store the character string and the time, and (ii) when image information is being stored by the image information storage unit 430, updating the image information stored by the image information storage unit 430 with the character string and the time.

FIG. 5A, FIG. 5B, and FIG. 5C are each an example of image information stored by the image information storage unit 430, and are data configuration diagrams of image information 500a, image information 500b, and image information 500c, respectively.

Here, the image information 500a is described as an example of image information stored by the image information storage unit 430 in the camera 101a, the image information 500b is described as an example of image information stored by the image information storage unit 430 in the camera 101b, and the image information 500c is described as an example of image information stored by the image information storage unit 430 in the camera 101c.

Further, the following describes a case in which the camera 101a, the camera 101b, and the camera 101c capture a vehicle to which a number plate displaying "12-34" is attached, which travels past the capture point 220 at 8:00, 9:00, 10:00, 11:00, 12:00, 13:00, 14:00, 15:00, 16:00, 17:00, 18:00, 19:00, 20:00, 21:00, and 22:00. In other words, the following describes a case in which an administrator of the camera system 100 deliberately causes the vehicle to which the number plate displaying "12-34" is attached to travel past the capture point 220 at the above-described times.

As shown in FIG. 5A, the image information 500a is composed of times 501 and analysis results 502, and each time 501 is linked with an analysis result 502. As shown in FIG. 5B, the image information 500b is composed of times 511 and analysis results 512, and each time 511 is linked with an analysis result 512. As shown in FIG. 5C, the image information 500c is composed of times 521 and analysis results 522, and each time 521 is linked with an analysis result 522.

Each time 501, time 511, and time 521 denotes a time at which an image that is subject to analysis is captured.

Each analysis result 502, analysis result 512, and analysis result 522 denotes a character string specified as a result of an analysis of an images that is subject to analysis.

As shown in FIG. 5A, in the image information 500a, analysis results 502 that are linked with times 501 denoting "8:00", "10:00", "11:00", "12:00", "13:00", "14:00", "15:00", "16:00", "17:00", "18:00", "19:00", "20:00", and "22:00" denote "12-34", and analysis results 502 that are linked with times 501 denoting "9:00" and "21:00" denote "72-34". In other words, the image information 500a reflects specification of an incorrect character string at 9:00 and 21:00 by the calculation unit 420 of the camera 101a.

As shown in FIG. 5B, in the image information 500b, analysis results 512 that are linked with times 511 denoting "8:00", "9:00", "10:00", "11:00", "12:00", "13:00", "14:00", "15:00", "16:00", "17:00", "18:00", and "20:00" denote "12-34", and analysis results 512 that are linked with times 511 denoting "19:00", "21:00", and "22:00" denote "72-34". In other words, the image information 500b reflects specification of an incorrect character string at 19:00, 21:00 and 22:00 by the calculation unit 420 of the camera 101b.

As shown in FIG. 5C, in the image information 500c, analysis results 522 that are linked with times 521 denoting "10:00", "11:00", "13:00", "14:00", "16:00", "17:00", "18:00", "19:00", "20:00", "21:00", and "22:00" denote "12-34", and analysis results 522 that are linked with times 521 "8:00", "9:00", "12:00", and "15:00" denote "72-34". In other words, the image information 500c reflects specification of an incorrect character string at 8:00, 9:00, 12:00 and 15:00 by the calculation unit 420 of the camera 101a.

Returning to FIG. 4, description of the function configuration of the camera 101 continues below.

The image storage unit 425 is implemented by a portion of a storage area of the memory 335. The image storage unit 425 has a function of storing images transmitted from the capture unit 415 and capture time information linked with each other.

The image information storage unit 430 is implemented by a portion of a storage area of the memory 335. The image information storage unit 430 has a function of storing image information generated and updated by the calculation unit 420.

The object information acquisition unit 435 is implemented by the network communication LSI 345 and the processor 315 executing a program. The object information acquisition unit 435 has a function of acquiring object information outputted from the management server 102, and of transmitting acquired object information to the comparison unit 440.

FIG. 6 is a data configuration diagram of object information 600, which is an example of object information acquired by the object information acquisition unit 435.

The object information 600 includes information denoting a correct character string displayed by a number plate that is subject to analysis, i.e. an expected value of an analysis result expected in a case in which analysis is correctly performed for (i) each analysis result 502 of the image information 500a, (ii) each analysis result 512 of the image information 500b, and (iii) each analysis result 522 of the image information 500c, as stored by the image information storage unit 430.

As shown in FIG. 6, the object information 600 is composed of times 601 and expected values 602, and each time 601 is linked with an expected value 602.

Each time 601 denotes a time.

Each expected value 602 denotes an actual character string displayed by a number plate included in an image captured by the camera 101 at a time 601. In other words, each expected value 602 denotes a result of analysis in a case in which the character string displayed by the number plate is correctly captured and correctly analyzed.

Here, at all times 601, expected values 602 denote "12-34".

Returning to FIG. 4, description of the function configuration of the camera 101 continues below.

The comparison unit 440 is implemented by the processor 315 executing a program. The comparison unit 440 has a function of generating comparison result information by comparing, when a comparison signal is transmitted from the capture instruction unit 405, image information stored by the image information storage unit 430 and object information acquired by the object information acquisition unit 435. The comparison unit 440 also has a function of causing the comparison result information storage unit 445 to store the comparison result information so generated.

Here, comparing the image information and the object information refers to (i) performing a check with respect to each of the analysis results 502 in the image information 500a of whether or not the analysis result 502, linked with a corresponding time 501, matches an expected value 602 in the object information 600 that is linked with a time 601 matching the corresponding time 501; (ii) performing a check with respect to each of the analysis result 512 in the image information 500b of whether or not the analysis result 512, linked with a corresponding time 511, matches an expected value 602 in the object information 600 that is linked with a time 601 matching the corresponding time 511; and (iii) performing a check with respect to each of the analysis results 522 in the image information 500c of whether or not the analysis result 522, linked with a corresponding time 521, matches an expected value 602 in the object information 600 that is linked with a time 601 matching the corresponding time 521.

FIG. 7A, FIG. 7B, and FIG. 7C are each an example of comparison result information stored by the comparison result information storage unit 445. FIG. 7A, FIG. 7B, and FIG. 7C are data configuration diagrams of comparison result information 700a, comparison result information 700b, and comparison result information 700c, respectively.

Here, the comparison result information 700a is an example of comparison result information stored by the comparison result information storage unit 445 in the camera 101a. The comparison result information 700a is generated by a comparison of the image information 500a and the object information 600. The comparison result information 700b is an example of comparison result information stored by the comparison result information storage unit 445 in the camera 101*b*. The comparison result information 700*b* is generated by a comparison of the image information 500*b* and the object information 600. The comparison result information 700*c* is an example of comparison result information stored by the comparison result information storage unit 445 in the camera 101*c*. The comparison result information 700*c* is generated by a comparison of the image information 500*c* and the object information 600.

As shown in FIG. 7A, the comparison result information 700*a* is composed of times 701 and comparison results 702, and each time 701 is linked with a comparison result 701. As shown in FIG. 7B, the comparison result information 700*b* is composed of times 711 and comparison results 712, and each time 711 is linked with a comparison result 712. As shown in FIG. 7C, the comparison result information 700*c* is composed of times 721 and comparison results 722, and each time 721 is linked with a comparison result 722.

Each time 701, time 711, and time 721 denotes a time.

Each comparison result 702 denotes whether or not, at a time 701, an analysis result 502 matches an expected value 602. Each comparison result 712 denotes whether or not, at a time 711, an analysis result 512 matches an expected value 602. Each comparison result 721 denotes whether or not, at a time 721, an analysis result 522 matches an expected value 602.

As shown in FIG. 7A, in the comparison result information 700*a*, each comparison result 702 that is linked with a time 701 denoting "8:00", "10:00", "11:00", "12:00", "13:00", "14:00", "15:00", "16:00", "17:00", "18:00", "19:00", "20:00", and "22:00" denotes a "match", and each comparison result 702 that is linked with a time 701 denoting "9:00" and "21:00" denotes "different".

As shown in FIG. 7B, in the comparison result information 700*b*, each comparison result 712 that is linked with a time 711 denoting "8:00", "9:00", "10:00", "11:00", "12:00", "13:00", "14:00", "15:00", "16:00", "17:00", "18:00", and "20:00" denotes a "match", and each comparison result 712 that is linked with a time 711 denoting "19:00", "21:00", and "22:00" denotes "different".

As shown in FIG. 7C, in the comparison result information 700*c*, each comparison result 722 that is linked with a time 721 denoting "10:00", "11:00", "13:00", "14:00", "16:00", "17:00", "18:00", "19:00", "20:00", "21:00", and "22:00" denotes a "match", and each comparison result 722 that is linked with a time 721 denoting "8:00", "9:00", "12:00", and "15:00" denotes "different".

Returning to FIG. 4, description of the function configuration of the camera 101 continues below.

The comparison result information storage unit 445 is implemented by a portion of a storage area of the memory 335. The comparison result information storage unit 445 has a function of storing comparison result information that is transmitted from the comparison unit 440.

The evaluation condition storage unit 455 is implemented by a portion of a storage area of the memory 335. The evaluation condition storage unit 455 has a function of storing an evaluation condition used by the evaluation unit 450.

Hereafter, the evaluation condition stored by the evaluation condition storage unit 455 is described as a calculation method by which, with respect to the comparison result information stored by the comparison result information storage unit 445, a fraction that has the total number of comparison results as a denominator and the number of "match" comparison results as a numerator is calculated as an evaluation result.

The evaluation unit 450 is implemented by the processor 315 executing a program. The evaluation unit 450 has a function of calculating an evaluation result indicating a result of a self-evaluation performed by the camera 101 by applying the evaluation condition stored by the evaluation condition storage unit 455 to the comparison result information stored by the comparison result information storage unit 445. The evaluation unit 450 also has a function of transmitting the evaluation result so calculated to the evaluation result output unit 460.

Figures 8A, 8B, 8C, 9:
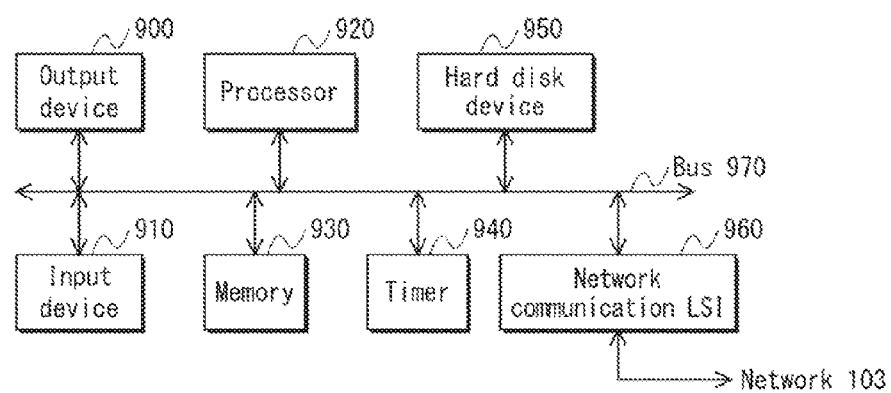
FIG. 8A is a data configuration diagram of an evaluation result 800a, FIG. 8B is a data configuration diagram of an evaluation result 800b.
FIG. 8C is a data configuration diagram of an evaluation result 800c.
FIG. 9 is a circuit diagram of a management server 102.

FIG. 8A, FIG. 8B, and FIG. 8C are each an example of an evaluation result calculated by the evaluation unit 450. FIG. 8A, FIG. 8B, and FIG. 8C are data configuration diagrams of an evaluation result 800*a*, an evaluation result 800*b*, and an evaluation result 800*c*, respectively.

Here, the evaluation result 800*a* is described as an example calculated by the evaluation unit 450 of the camera 101*a*, the evaluation result 800*b* is described as an example calculated by the evaluation unit 450 of the camera 101*b*, and the evaluation result 800*c* is described as an example calculated by the evaluation unit 450 of the camera 101*c*.

As shown in FIG. 8A, the evaluation result 800*a* denotes "13/15". As shown in FIG. 8B, the evaluation result 800*b* denotes "12/15". As shown in FIG. 8C, the evaluation result 800*c* denotes "11/15".

Returning to FIG. 4, description of the function configuration of the camera 101 continues below.

The evaluation result output unit 460 is implemented by the network communication LSI 345 and the processor 315 executing a program. The evaluation result output unit 460 has a function of outputting, to the management server 102, an evaluation result transmitted from the evaluation unit 450, via the network 103.

The image information output unit 465 is implemented by the network communication LSI 345 and the processor 315 executing a program. The image information output unit 465 has a function of outputting, to the management server 102, image information stored by the image information storage unit 430, via the network 103.

The image output unit 470 is implemented by the network communication LSI 345 and the processor 315 executing a program. The image output unit 470 has a function of outputting, to the management server 102, images and capture time information that are linked to each other and stored by the image storage unit 425, via the network 103.

FIG. 9 is a circuit diagram of the management server 102.

The management server 102 is a computer device. As shown in FIG. 9, the management server 102 is composed of an output device 900, an input device 910, a processor 920, a memory 930, a timer 940, a hard disk device 950, a network communication LSI 960, and a bus 970.

The following describes these components of the management server 102 in turn.

The bus 970 is connected to the output device 900, the input device 910, the processor 920, the memory 930, the timer 940, the hard disk device 950, and the network communication LSI 960. The bus 970 has a function of transmitting signals between circuits connected thereby.

The output device 900 is connected to the bus 970 and controlled by the processor 920. The output device 900 has a function of outputting images and sounds to be presented to a user of the management server 102. As one example, the output device 900 is composed of a display and a speaker.

The input device 910 is connected to the bus 970 and controlled by the processor 920. The input device 910 has a function of receiving an operation from the user of the management server 102, converting the operation into an electric signal, and transmitting the electric signal to the processor 920. As one example, the input device 910 is composed of a keyboard and a mouse.

The memory 930 is connected to the bus 970 and is composed of RAM, ROM, and removable flash memory. The memory 930 stores programs that regulate operation of the processor 920, and data used by the processor 920.

The timer 940 is connected to the bus 970 and controlled by the processor 925. The timer 940 has a function of measuring time.

The network communication LSI 960 is connected to the bus 970 and is also connected to the network 103, which is external to the management server 102. The network communication LSI 960 is controlled by the processor 920. The network communication LSI 960 has a function of communicating with the camera 101 via the network 103, by using a predefined protocol.

The hard disk device 950 is connected to the bus 970 and controlled by the processor 920. The hard disk device 950 incorporates a hard disk. The hard disk device 950 has a function of writing data to the incorporated hard disk, and reading data stored on the incorporated hard disk.

The processor 920 is connected to the bus 970. By executing programs stored in the memory 930, the processor 920 controls the output device 900, the input device 910, the memory 930, the timer 940, the hard disk device 950, and the network communication LSI 960, thereby implementing the following two functions.

Evaluation result accumulation function: A function of controlling the management server 102, causing the management server 102 to execute the evaluation result accumulation process, which is a characteristic operation of the management server 102, and thereby causing the management server 102 to accumulate at least one evaluation result from at least one camera 101 and to display the at least one evaluation result to the user.

Note that the evaluation result accumulation process performed by the management server 102 is described in detail using a flowchart, under the later heading <Evaluation result accumulation process>.

Server-side normal capture configuration function: A function of causing the management server 102 to execute a server-side normal capture configuration process, which is a characteristic operation of the management server 102, and thereby causing the management server 102 to generate a normal capture condition and a normal analysis condition and transmit the normal capture condition and the normal analysis condition to the camera 101.

Note that the server-side normal capture configuration process performed by the management server 102 is described in detail using a flowchart, under the later heading <Normal capture configuration process>.

A configuration of the management server 102 that has the above-described circuit configuration is described below from a function perspective.

Figure 10:
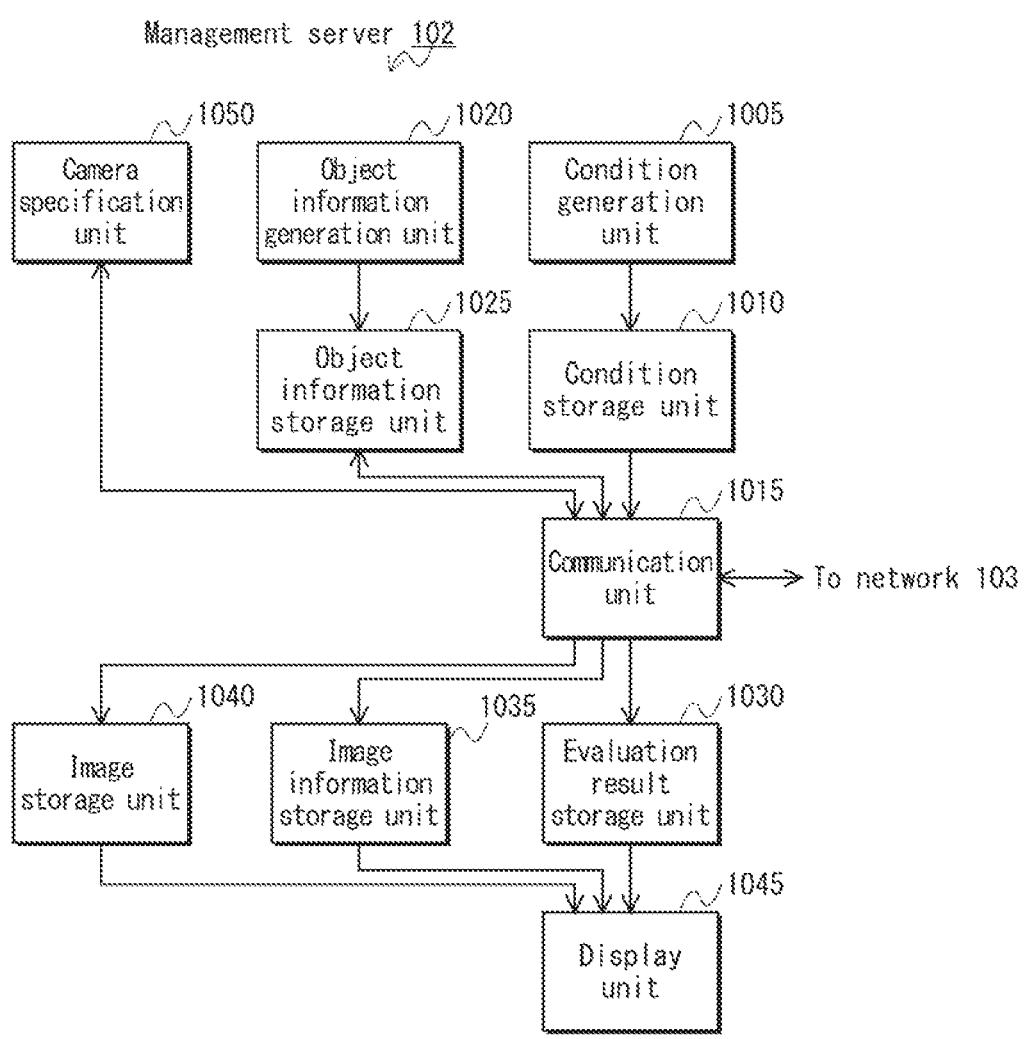
FIG. 10 is a block diagram showing a function configuration of the management server 102.

FIG. 10 is a block diagram showing a function configuration of the management server 102.

As shown in FIG. 10, the management server 102 includes a condition generation unit 1005, a condition storage unit 1010, a communication unit 1015, an object information generation unit 1020, an object information storage unit 1025, an evaluation result storage unit 1030, an image information storage unit 1035, an image storage unit 1040, a display unit 1045, and a camera specification unit 1050.

The following describes these function blocks of the management server 102 in turn.

The condition generation unit 1005 is implemented by the input device 910, the output device 900, and the processor 920 executing a program. The condition generation unit 1005 has a function of, based on an operation performed on the input device 910 by the user, (i) generating the evaluation capture condition, the normal capture condition, the evaluation analysis condition, and the normal analysis condition, for transmission to the camera 101, and (ii) causing the condition storage unit 1010 to store the evaluation capture condition, the normal capture condition, the evaluation analysis condition, and the normal analysis condition.

The condition storage unit 1010 is implemented by a portion of a storage area of the hard disk device 950. The condition storage unit 1010 has a function of storing the evaluation capture condition, the normal capture condition, the evaluation analysis condition, and the normal analysis condition, which are generated by the condition generation unit 1005.

The object information generation unit 1020 is implemented by the input device 910, the output device 900, and the processor 920 executing a program. The object information generation unit 1020 has a function of, based on an operation performed on the input device 910 by the user, (i) generating object information for transmission to the camera 101, and (ii) causing the object information storage unit 1025 to store the object information so generated.

The object information storage unit 1025 is implemented by a portion of a storage area of the hard disk device 950. The object information storage unit 1025 has a function of storing the object information generated by the object information generation unit 1020.

The communication unit 1015 is implemented by the network communication LSI 960, the timer 940, and the processor 920 executing a program. The communication unit 1015 has a function of outputting to the camera 101, via the network 103, the evaluation capture condition, the normal capture condition, the evaluation analysis condition, and the normal analysis condition, which are stored by the condition storage unit 1010. The communication unit 1015 also has a function of outputting to the camera 101, via the network 103, the object information stored by the object information storage unit 1025. The communication unit 1015 also has a function of acquiring, via the network 103, an evaluation result outputted from the camera 101, and causing the evaluation result storage unit 1030 to store the evaluation result. The communication unit 1015 also has a function of acquiring, via the network 103, image information outputted from the camera 101, and causing the image information storage unit 1035 to store the image information. The communication unit 1015 also has a function of acquiring, via the network 103, an image outputted from the camera 101, and causing the image storage unit 1040 to store the image. The communication unit 1015 also has a function of measuring the passage of time.

The evaluation result storage unit 1030 is implemented by a portion of a storage area of the hard disk device 950. The evaluation result storage unit 1030 has a function of storing the evaluation result acquired by the communication unit 1015.

The image information storage unit 1035 is implemented by a portion of a storage area of the hard disk device 950. The image information storage unit 1035 has a function of storing the image information acquired by the communication unit 1015.

The image storage unit 1040 is implemented by a portion of a storage area of the hard disk device 950. The image storage unit 1040 has a function of storing the image acquired by the communication unit 1015.

The display unit 1045 is implemented by the output device 900, the input device 910, and the processor 920 executing a program. The display unit 1045 has (i) a function of displaying, on a display and in a predefined format, the evaluation result stored by the evaluation result storage unit 1030, (ii) a function of displaying, on the display and in a predefined format, the image information stored by the image information storage unit 1035, and (iii) a function of displaying, on the display and in a predefined format, the images stored by the image storage unit 1040.

The camera specification unit 1050 is implemented by the input device 910, the output device 900 and the processor 920 executing a program. The camera specification unit 1050 has a function of, based on an operation performed by the user on the input device 910, specifying a camera 101 that is to perform the self-evaluation process.

Returning to FIG. 1, description of the configuration of the camera system 100 continues below.

The network 103 has a function of relaying signals between devices connected thereto, by using wireless or wired connectivity.

Operations performed by the camera system 100, which has the configuration described above, are described below with reference to the drawings.

<Operations>

The camera system 100 performs, as characteristic operations thereof, the evaluation result accumulation process, the self-evaluation process, the normal capture configuration process, and the normal capture process.

The processes are described below, in turn.

<Evaluation Result Accumulation Process>

The evaluation result accumulation process is a process performed by the management server 102. The management server 102, by performing the evaluation result accumulation process, accumulates one or more evaluation results from at least one camera, and displays the accumulated evaluation results to the user.

Figure 11:
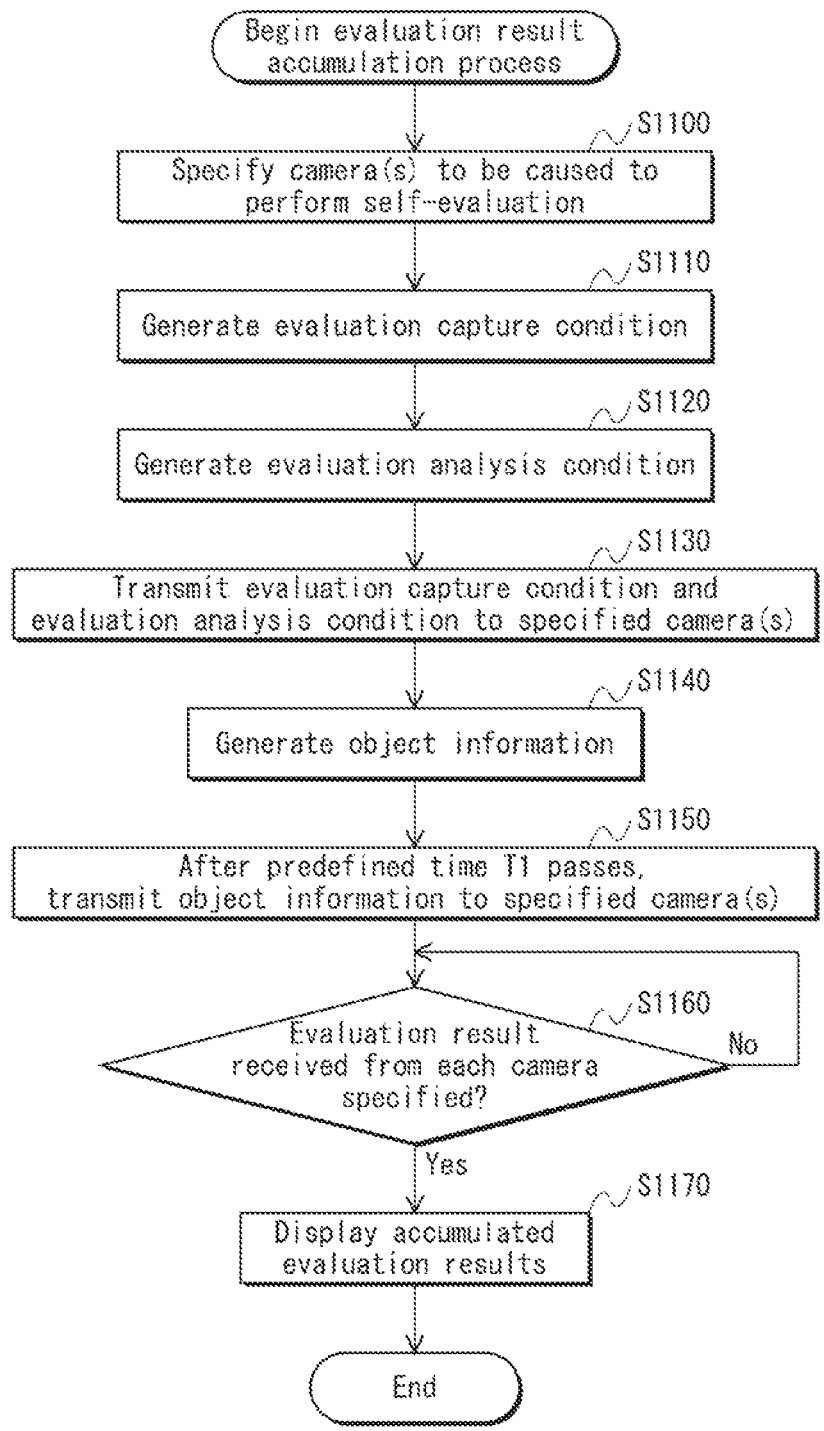
FIG. 11 is a flowchart of an evaluation result accumulation process.

FIG. 11 is a flowchart of the evaluation result accumulation process.

The evaluation result accumulation process is begun when the user of the camera system 100 performs an operation with respect to the input device 910 of the management server 102 that indicates that the evaluation result accumulation process is to begin.

When the evaluation result accumulation process is begun, the camera specification unit 1050, upon reception of an operation from the user, specifies at least one camera 101 (i.e., the camera 101 that is to be caused to perform a self-evaluation) from which an evaluation result is to be accumulated (step S1100).

Next, the condition generation unit 1005, upon reception of an operation from the user and based on the operation so received, generates the evaluation capture condition for transmission to the at least one camera 101 that is specified (step S1110). Next, the condition generation unit 1005, upon reception of an operation from the user and based on the operation so received, generates the evaluation analysis condition for transmission to the at least one camera 101 that is specified (step S1120).

When the evaluation capture condition and the evaluation analysis condition are generated, the communication unit 1015 transmits the evaluation capture condition and the evaluation analysis condition to each camera 101 specified (step S1130), and begins to measure the predefined time T1 (for example, 24 hours).

Afterward, and before the predefined time T1 passes, the object information generation unit 1020, upon reception of an operation from the user and based on the operation received, generates the object information for transmission to the at least one camera 101 that is specified (step S1140).

When the predefined time T1 passes, the communication unit 1015 transmits the object information so generated to each camera 101 that is specified (step S1150).

Upon transmitting the object information that is generated to each camera 101 that is specified, the communication unit 1015 waits to receive an evaluation result from every camera 101 that is specified (repeating "No" at step S1160). Each camera that receives the object information transmits in response an evaluation result to the communication unit 1015.

When, in step S1160, an evaluation result is transmitted from every camera that is specified ("Yes" at step S1160), the display unit 1045 displays the evaluation results on a display in a predefined format (step S1170).

When step S1170 ends, the management server 102 ends the evaluation result accumulation process.

<Self-Evaluation Process>

The self-evaluation process is a process performed by the camera 101. The camera 101, by performing the self-evaluation process, performs a self-evaluation and transmits the evaluation result to the management server 102.

Figure 12:
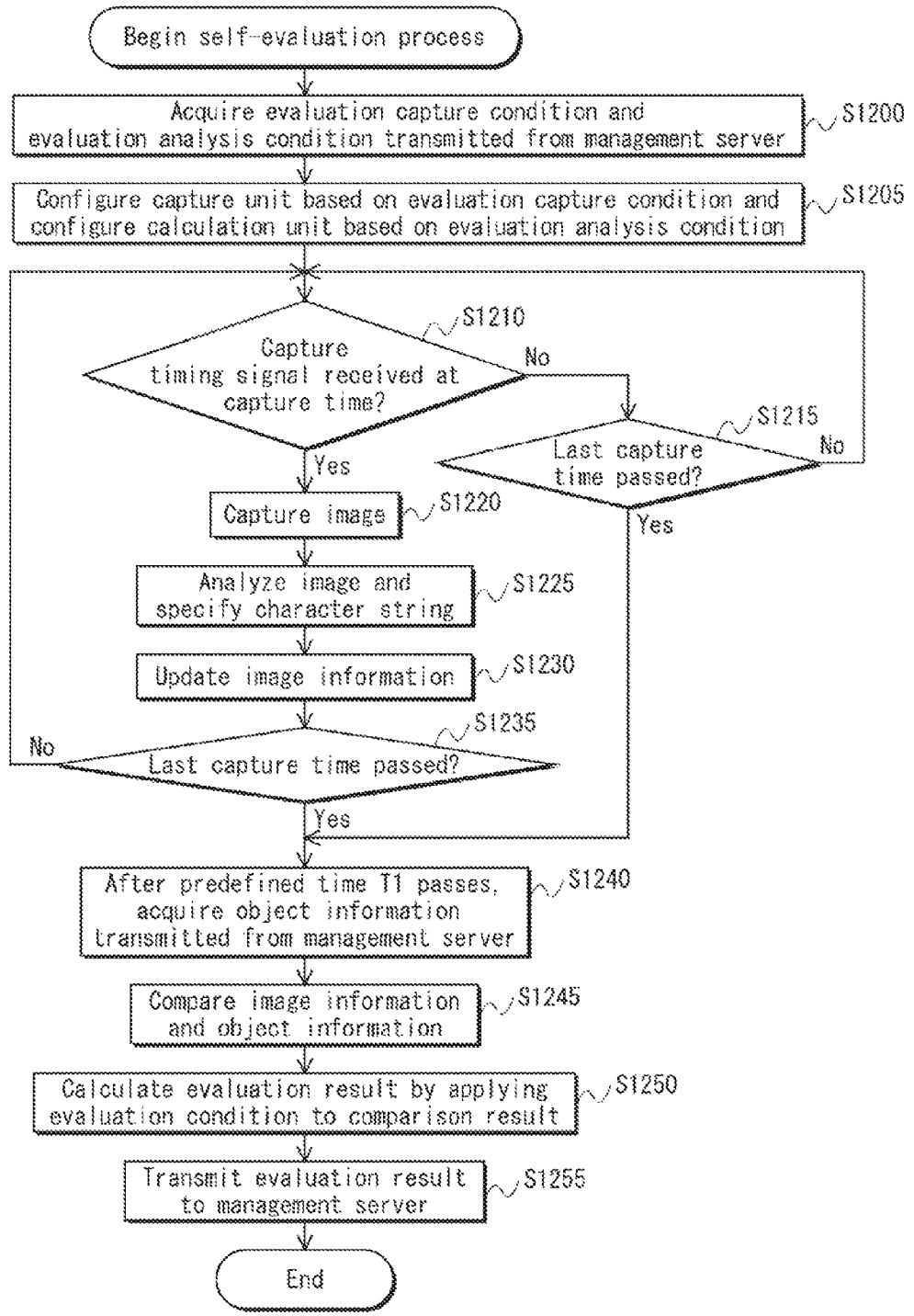
FIG. 12 is a flowchart of a self-evaluation process.

FIG. 12 is a flowchart of the self-evaluation process.

The self-evaluation process is begun when the evaluation capture condition and the evaluation analysis condition are transmitted from the management server 102 to the camera 101.

When the self-evaluation process is begun, the condition acquisition unit 400 acquires the evaluation capture condition and the evaluation analysis condition, which are transmitted from the management server 102 to the camera 101 (step S1200).

When the evaluation capture condition and the evaluation analysis condition are acquired, the capture instruction unit 405 sets the capture unit 415 based on the evaluation capture condition so acquired, and the calculation unit 420 sets the calculation unit 420 based on the evaluation analysis condition so acquired (step S1205).

Afterward, the capture instruction unit 405, during times that satisfy a condition of capture time (here, 8:00, 9:00, 10:00, 11:00, 12:00, 13:00, 14:00, 15:00, 16:00, 17:00, 18:00, 19:00, 20:00, 21:00, and 22:00), waits until the capture timing signal is transmitted from the capture timing reception unit 410 (in other words, during the above time periods, until a vehicle is detected travelling through the capture point 220 by the vehicle sensor 210 (refer to FIG. 2)) ("No" at step S1210 and "No" at step S1215 are repeated).

In step S1210, during times that satisfy the condition of capture time, when the capture timing signal is transmitted from the capture timing reception unit 410 ("Yes" at step S1210), the capture unit 415 captures an image of the vehicle travelling through the capture point 220 (step S1220). Next, the calculation unit 420 analyzes the image so captured in order to specify a character string displayed on a number plate of the vehicle in the image (step S1225), and updates the image information stored by the image information storage unit 430 (step S1230: however, in a case in which image information to be updated is not being stored by the image information storage unit 430, the calculation unit 420 generates new image information and causes the image information storage unit 430 to store the image information).

When the image information is updated, the capture unit 415 checks whether or not the last time period that satisfies the condition of capture time has already been passed (step S1235).

In step S1235, when the last time period has not been passed ("No" at step S1235), the camera 101 returns processing to step S1210 and repeats step S1210.

In a case in which the last time period has already been passed at step S1235 ("Yes" at step S1235) and in a case in which the last time period has already been passed at step S1215 ("Yes" at step S1215), when the predefined time T1 passes from transmission of the evaluation capture condition and the evaluation analysis condition from the management server 102, the management server 102 transmits the object information (refer to step S1150 in FIG. 11), and therefore the object information acquisition unit 435 acquires the object information transmitted from the management server 102 (step S1240).

When the predefined time T1 passes from transmission of the evaluation capture condition from the condition acquisition unit 400 to the capture instruction unit 405, the capture instruction unit 405 transmits a comparison signal to the comparison unit 440. Thus, when the comparison signal is transmitted from the capture instruction unit 405 to the comparison unit 440, the comparison unit 440 compares the image information stored by the image information storage unit 430 and the object information acquired by the object information acquisition unit 435, in order to generate comparison result information (step S1245).

When the comparison result information is generated, the evaluation unit 450 calculates an evaluation result by applying an evaluation condition stored by the evaluation condition storage unit 455 with respect to the comparison result information (step S1250).

When the evaluation result is calculated, the evaluation result output unit 460 transmits the evaluation result to the management server 102 (step S1255).

When step S1255 ends, the camera 101 ends the self-evaluation process.

<Normal Capture Configuration Process>

The normal capture configuration process is a process performed cooperatively by the management server 102 and the camera 101. The normal capture configuration process is a process that switches capture conditions, etc., which are configured for capturing images for the self-evaluation to a configuration for capturing normal images.

For example, in a case in which the evaluation result accumulation process is executed and the user, who has referred to the evaluation results accumulated from one or more cameras 101, selects one camera 101, the normal capture configuration process is executed with respect to the camera 101 that is selected.

Figure 13:
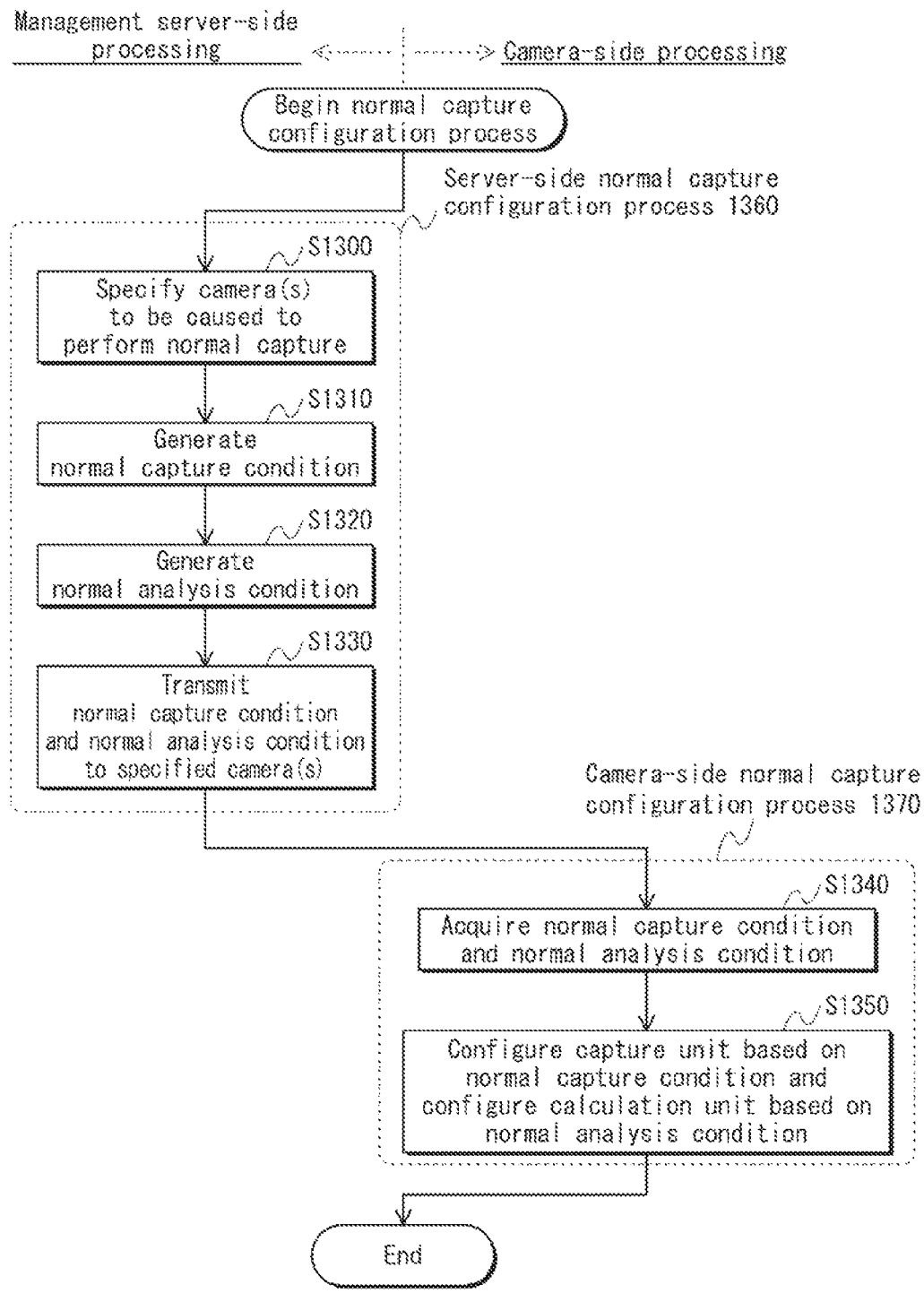
FIG. 13 is a flowchart of a normal capture configuration process.

FIG. 13 is a flowchart of the normal capture configuration process.

As shown in FIG. 13, the normal capture configuration process includes and can be roughly split into a server-side normal capture configuration process 1360 which the management server 102 performs (step S1300 to step S1330) and a camera-side normal capture configuration process 1370 which the camera 101 performs (step S1340 to step S1350).

The normal capture configuration process is begun when the user of the camera system 100 performs an operation with respect to the input device 910 of the management server 102, which indicates that the normal capture configuration process is to be begun.

When the normal capture configuration process is begun, the camera specification unit 1050, upon receiving an operation from the user, specifies at least one camera 101 to be a target of the camera-side normal capture configuration process 1370 (in other words, at least one camera 101 to be made to perform normal image capturing by having capture conditions, etc., that are configured for capturing images for the self-evaluation switched to a configuration for capturing normal images) (step S1300).

Next, the condition generation unit 1005, upon receiving an operation from the user and based on the operation so received, generates the normal capture condition for transmission to the at least one camera 101 that is specified (step S1310). Next, the condition generation unit 1005, upon receiving an operation from the user and based on the operation so received, generates the normal analysis condition for transmission to the at least one camera 101 that is specified (step S1320).

When the normal capture condition and the normal analysis condition are generated, the communication unit 1015 transmits the normal capture condition and the normal analysis condition to each camera 101 that is specified (step S1330).

The condition acquisition unit 400 of each camera 101 that is specified acquires the normal capture condition and the normal analysis condition that are transmitted (step S1340).

When the normal capture condition and the normal analysis condition are acquired, the capture instruction unit 405, based on the normal capture condition so acquired, sets the capture unit 415, and the calculation unit 420, based on the normal analysis condition so acquired, sets the calculation unit 420 (step S1350).

When step S1350 ends, the camera system 100 ends the normal capture configuration process.

<Normal Capture Process>

The normal capture process is a process performed by the camera 101, in which capturing of normal images is performed.

Figure 14:
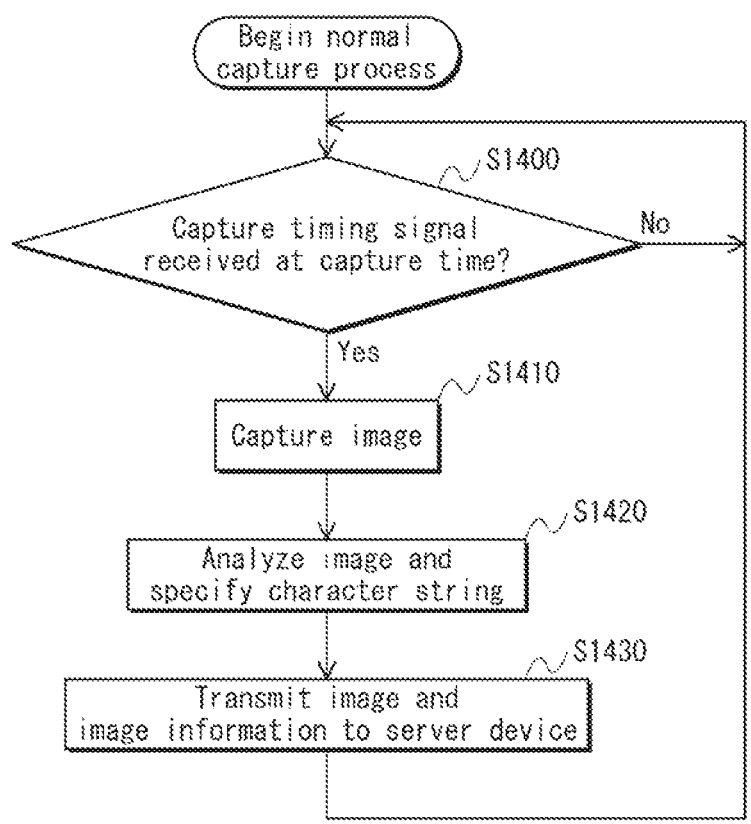
FIG. 14 is a flowchart of a normal capture process.

FIG. 14 is a flowchart of the normal capture process.

The normal capture process is begun by a camera that executes the camera-side normal capture configuration process 1370 when the camera-side normal capture configuration process 1370 ends (i.e. step S1350 ending).

When the normal capture process is begun, the capture instruction unit 405, during times that satisfy a condition of capture time (for example, throughout 24 hours), waits until the capture timing signal is transmitted from the capture timing reception unit 410 (in other words, until a vehicle is detected travelling through the capture point 220 by the vehicle sensor 210 (refer to FIG. 2)) ("No" at step S1400 is repeated).

At step S1400, during times that satisfy a condition of capture time (for example, throughout 24 hours), when the capture timing signal is transmitted from the capture timing reception unit 410 ("Yes" at step S1400), the capture unit 415 captures an image of a vehicle travelling through the capture point 220 (step S1410). Next, the calculation unit 420 analyzes the image so captured in order to specify a character string displayed on a number plate of a vehicle in the image (step S1420), and updates the image information stored by the image information storage unit 430 (however, in a case in which image information to be updated is not being stored by the image information storage unit 430, the calculation unit 420 generates new image information and causes the image information storage unit 430 to store the image information).

When the image information is updated, the image output unit 470 transmits the image that is captured in step S1410 to the management server 102, and the image information output unit 465 transmits the image information that is updated to the management server 102 (step 1430).

When step S1430 ends, processing returns to step S1400 and step S1400 is repeated.

<Consideration>

The user of the above-described camera system 100, when intending to select and use one camera 101 that is appropriate for the user's purpose from among the plurality of the cameras 101 in the camera system 100, can obtain evaluation results for the plurality of the cameras 101 by causing the self-evaluation process to be performed with respect to the cameras 101. Then, by considering the evaluation results so obtained, the user can select and use the camera 101 that is most appropriate for the user's purpose.

More specifically, in order to acquire a character string displayed on a number plate of a vehicle travelling through the capture point 220 (refer to FIG. 2), the user intending to use one of the camera 101a, the camera 101b, and the camera 101c causes the cameras to execute the self-evaluation process. Then the user, for example, obtains from the cameras the evaluation result 800a, the evaluation result 800b, and the evaluation result 800c, which are illustrated in FIG. 8A, FIG. 8B, and FIG. 8C, respectively. Then the user, for example, selects the camera 101a as the camera that is most appropriate for the user's purpose, since the evaluation result 800a calculated from the camera 101a is the most favorable evaluation result. Afterward, the user acquires information of a character string specified as displayed on a number plate of a vehicle travelling through the capture point 220, by causing the camera 101a to execute the normal capture process after executing the camera-side normal capture configuration process 1370.

Embodiment 2

<Summary>

The following describes a first modified camera system, which is a partial modification of the camera system 100 in embodiment 1, as an embodiment of the camera, the camera system, and the self-evaluation method performed by a camera, pertaining to aspects of the present invention.

The camera system 100 in embodiment 1 is an example in which the camera 101 performs a self-evaluation based on a signal transmitted from the management server 102, and transmits a self-evaluation result to the management server 102.

In contrast, the first modified camera system in embodiment 2 is an example in which a camera in the first modified camera system performs a self-evaluation based on a signal transmitted from a management server and, (i) when a self-evaluation result is within a predefined threshold, begins normal capturing without transmitting the self-evaluation result to the management server and, (ii) when the self-evaluation result is not within the predefined threshold, provides the management server with a notification indicating that the self-evaluation result is not within the predefined threshold.

The following is a description in detail of the first modified camera system, focusing on points of difference between the first modified camera system and the camera system 100, and described with reference to the drawings.

<Configuration>

The first modified camera system is a modification in which, from the camera system 100 in embodiment 1 (refer to FIG. 1), the camera 101 (the cameras 101a to 101f) is changed to a camera 1601 (cameras 1601a to 1601f) and the management server 102 is changed to a first modified management server.

The hardware structure of the camera 1601 is the same as that of the camera 101 in embodiment 1 (refer to FIG. 3). However, a portion of software executed by the camera 1601 is changed from that of the camera 101.

The hardware structure of the first modified management server is the same as that of the management server 102 in embodiment 1 (refer to FIG. 9). However, a portion of software executed by the first modified management server is changed from that of the management server 102.

Figure 15:
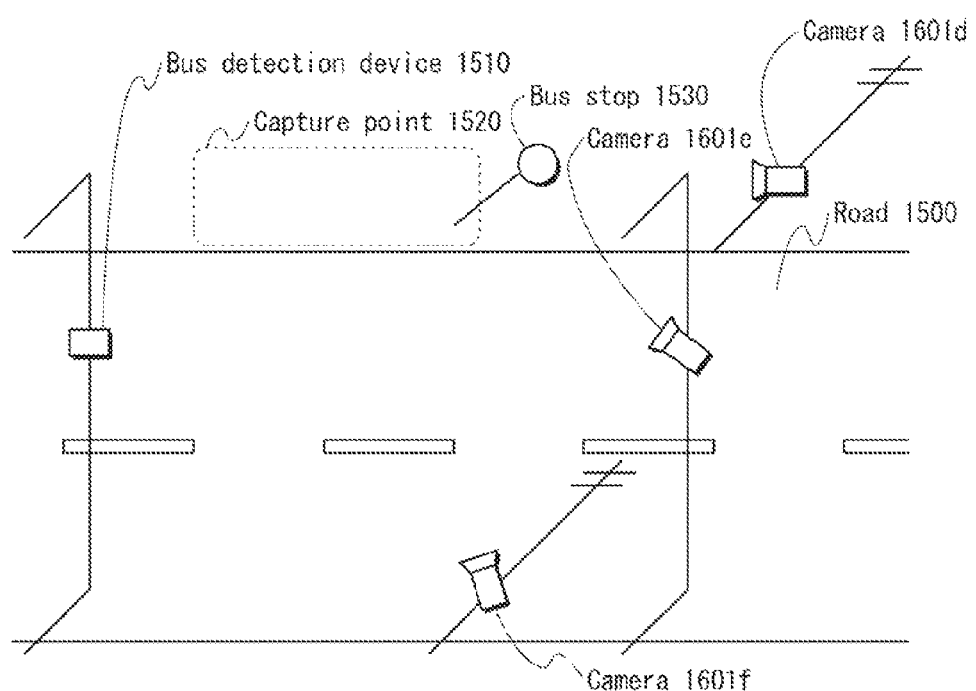
FIG. 15 is a schematic diagram showing a situation in which cameras 1601d to 1601f are set up on a street.

FIG. 15 is a schematic diagram showing a situation in which the cameras 1601d to 1601f are set up on a street.

As shown in FIG. 15, a capture point 1520 is set around a bus stop 1530 that is next to the road 1500. The cameras 1601d to 1601f are set up around the road 1500 such that capturing people waiting for a bus to arrive is possible at the capture point 1520.

Figure 16:
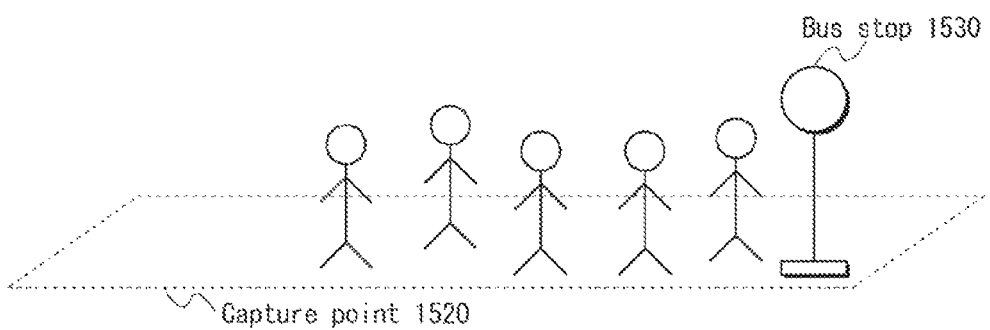
FIG. 16 is a schematic diagram showing a relationship between a bus stop 1530 and a capture point 1520.

FIG. 16 is a schematic diagram showing a relationship between the bus stop 1530 and the capture point 1520.

As shown in FIG. 16, the capture point 1520 includes an area in which people wait when waiting for a bus to arrive at the bus stop 1530.

Returning to FIG. 15, description of the situation in which the cameras 1601d to 1601f are set up continues below.

Above the road 1500, a bus detection device 1510 is set up a predefined distance (for example 5m) before the bus stop 1530. The bus detection device 1510 detects a bus that stops at the bus stop 1530.

The bus detection device 1510 and each of the cameras 1601d to 1601f are connected to each other by wiring that is not illustrated.

The bus detection device 1510 has a function of using short-range wireless communication to communicate with a bus. The bus detection device 1510 also has a function of detecting a bus travelling in the vicinity of the setup position of the bus detection device 1510. When detecting a bus, the bus detection device 1510 has a function of transmitting, via the wiring, the capture timing signal to each of the cameras 1601d to 1601f. The capture timing signal indicates that a bus is travelling just before the bus stop 1530.

The following does not describe each of the cameras 1601d to 1601f separately, and instead the cameras 1601d to 1601f are described using a camera 1601 representing the cameras 1601d to 1601f.

Figure 17:
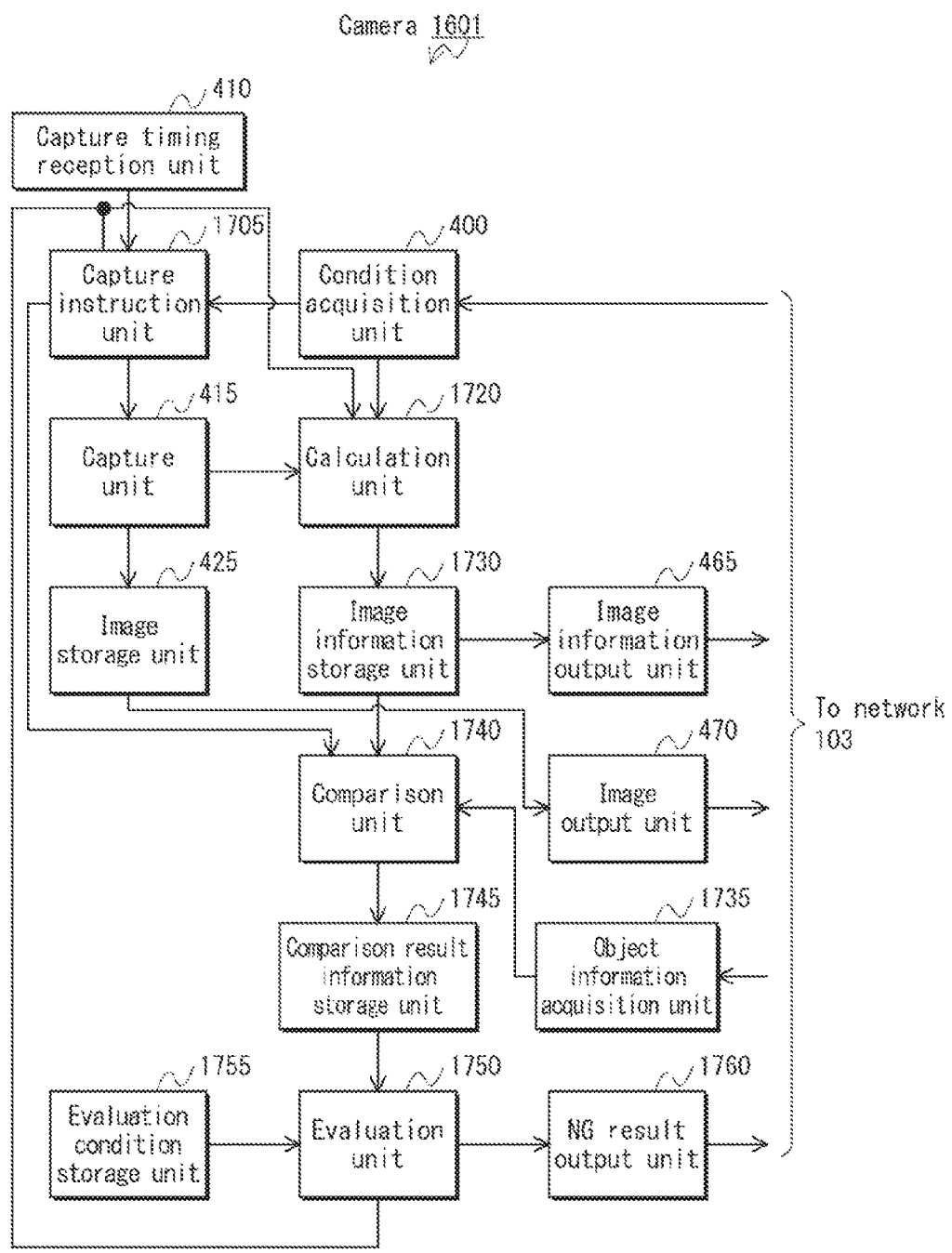
FIG. 17 is a block diagram showing a function configuration of a camera 1601.

FIG. 17 is a block diagram showing a function configuration of the camera 1601.

As shown in FIG. 17, the camera 1601 is modified from the camera 101 in embodiment 1. The capture instruction unit 405 is changed to a capture instruction unit 1705, the calculation unit 420 is changed to a calculation unit 1720, the image information storage unit 430 is changed to an image information storage unit 1730, and the object information acquisition unit 435 is changed to an object information acquisition unit 1735. Further, the comparison unit 440 is changed to a comparison unit 1740, the comparison result information storage unit 445 is changed to a comparison result information storage unit 1745, the evaluation unit 450 is changed to an evaluation unit 1750, the evaluation condition storage unit 455 is changed to an evaluation condition storage unit 1755, and the evaluation result output unit 460 is changed to an NG result output unit 1760.

The blocks that are changed from the blocks in embodiment 1 are focused on in the following description.

Note that here, the "capture time condition" included in the evaluation capture condition is described as time periods of: between 6:00:00 a.m. and 6:00:59 a.m. (hereafter, also referred to as "6:00"), between 6:30:00 a.m. and 6:30:59 a.m. (hereafter, also referred to as "6:30"), between 7:00:00 a.m. and 7:00:59 a.m. (hereafter, also referred to as "7:00"), between 7:15:00 a.m. and 7:15:59 a.m. (hereafter, also referred to as "7:15"), between 7:30:00 a.m. and 7:30:59 a.m. (hereafter, also referred to as "7:30"), between 7:45:00 a.m. and 7:45:59 a.m. (hereafter, also referred to as "7:45"), between 8:00:00 a.m. and 8:00:59 a.m. (hereafter, also referred to as "8:00"), between 8:30:00 a.m. and 8:30:59 a.m. (hereafter, also referred to as "8:00"), between 9:00:00 a.m. and 9:00:59 a.m. (hereafter, also referred to as "9:00"), . . . , between 10:00:00 p.m. and 10:00:59 p.m. (hereafter, also referred to as "22:00"), between 10:30:00 p.m. and 10:30:59 p.m. (hereafter, also referred to as "22:30"), between 11:00:00 p.m. and 11:00:59 p.m. (hereafter, also referred to as "23:00"), and between 11:30:00 p.m. and 11:30:59 p.m. (hereafter, also referred to as "23:30"). The time periods are a portion of times in a bus schedule.

Also, here, the analysis performed by the calculation unit 1720 is described as specifying, in an image transmitted from the capture unit 415, the number of people waiting for a bus to arrive at the bus stop 1530.

The capture instruction unit 1705 is implemented by the timer 340 and the processor 315 executing a program. In addition to the capture instruction unit configuration function, the capture trigger function, and the comparison trigger function that the capture instruction unit 405 in embodiment 1 has, the capture instruction unit 1705 has a capture instruction unit configuration switching function, which is described below.

Capture instruction unit configuration switching function: A function of switching a configuration of a condition of capturing performed by the capture unit 415 to a configuration based on the normal capture condition acquired by the condition acquisition unit 400. This switching is performed when a condition switching signal (described later) is transmitted from the evaluation unit 1750 in a case in which (i) the configuration of a condition of capturing performed by the capture unit 415 is based on the evaluation capture condition acquired by the condition acquisition unit 400, and (ii) the normal capture condition has already been acquired by the condition acquisition unit 400.

The calculation unit 1720 is implemented by the analysis LSI 330 and the processor 315 executing a program. In addition to the calculation unit configuration function that the calculation unit 420 in embodiment 1 has, the calculation unit 1720 has a calculation unit configuration switching function, a first modified analysis function, and a first modified image information update function, which is described below.

Calculation unit configuration switching function: A function of switching a configuration of the calculation unit 1720 to a configuration based on the normal analysis condition acquired by the condition acquisition unit 400. This switching is performed when (i) the condition switching signal is transmitted from the evaluation unit 1750 in a case in which the configuration of the calculation unit 1720 is based on the evaluation analysis condition acquired by the condition acquisition unit 400, and (ii) the normal analysis condition has already been acquired by the condition acquisition unit 400.

First modified analysis function: A function of, when an image is transmitted from the capture unit 415, analyzing the image by using an algorithm specified by the calculation unit, and thereby specifying the number of people in the image who are waiting for a bus to arrive at the bus stop 1530.

First modified image information update function: A function of, when an image is analyzed and the number of people in the image who are waiting for a bus to arrive at a bus stop is specified, linking the number of people and a time at which the image transmitted from the capture unit 415 was captured, and (i) when image information is not being stored in the image information storage unit 1730, creating image information and thereby causing the image information storage unit 1730 to store the number of people and the time, and (ii) when image information is being stored by the image information storage unit 1730, updating the image information stored by the image information storage unit 1730 with the number of people and the time.

FIG. 18A, FIG. 18B, and FIG. 18C are examples of image information stored by the image information storage unit 1730. FIG. 18A, FIG. 18B, and FIG. 18C are data configuration diagrams of image information 1800d, image information 1800e, and image information 1800f.

Here, the image information 1800d is described as an example of image information stored by the image information storage unit 1730 in the camera 1601d, the image information 1800e is described as an example of image information stored by the image information storage unit 1730 in the camera 1601e, and the image information 1800f is described as an example of image information stored by the image information storage unit 1730 in the camera 1601f.

Further, the following describes a case in which the number of people waiting for a bus at the bus stop 1530 is caused to be measured by an administrator of the first modified camera system at 6:00, 6:30, 7:00, 7:15, 7:30, 7:45, 8:00, 8:30, 9:00, . . . , 22:00, 22:30, 23:00, and 23:30.

As shown in FIG. 18A, the image information 1800d is composed of times 1801 and analysis results 1802, and each time 1801 is linked with an analysis result 1802. As shown in FIG. 18B, the image information 1800e is composed of times 1811 and analysis results 1812, and each time 1811 is linked with an analysis result 1812. As shown in FIG. 18C, the image information 1800f is composed of times 1821 and analysis results 1822, and each time 1821 is linked with an analysis result 1822.

Each time 1801, time 1811, and time 1821 denotes a time at which an image that is subject to analysis is captured.

Each analysis result 1802, analysis result 1812, and analysis result 1822 denotes the number of people specified by analyzing an image that is subject to analysis.

Returning to FIG. 17, description of the function configuration of the camera 1601 continues below.

The image information storage unit 1730 is implemented by a portion of a storage area of the memory 335. The image information storage unit 1730 has the same functions as the image information storage unit 430 in embodiment 1. However, as described above, image information that is stored by the image information storage unit 1730 is modified from image information that is stored by the image information storage unit 430 in embodiment 1.

The object information acquisition unit 1735 is implemented by the network communication LSI 345 and the processor 315 executing a program. The object information acquisition unit 1735 has the same functions as the object information acquisition unit 435 in embodiment 1. However, object information that is acquired by the object information acquisition unit 1735 is modified from object information that is acquired by the object information acquisition unit 435 in embodiment 1.

FIG. 19 is a data configuration diagram of object information 1900, which is an example of object information acquired by the object information acquisition unit 1735.

The object information 1900 includes information denoting the number of people waiting for a bus to arrive at the bus stop 1530, as measured by an administrator of the first modified camera system, i.e. an expected value of an analysis result expected in a case in which analysis is correctly performed for (i) each analysis result 1802 of the image information 1800*d*, (ii) each analysis result 1812 of the image information 1800*e*, and (iii) each analysis result 1822 of the image information 1800*f*, as stored by the image information storage unit 430.

As shown in FIG. 19, the object information 1900 is composed of times 1901 and expected values 1902, and each time 1901 is linked with an expected value 1902.

Each time 1901 denotes a time.

Each expected value 1902 is measured by an administrator of the first modified camera system and denotes the number of people waiting for a bus to arrive at the bus stop 1530 in an image captured by the camera 1601 at a time 1901. In other words, each expected value 1902 denotes an expected value of an analysis result expected in a case in which analysis is correctly performed.

Returning to FIG. 17, description of the function configuration of the camera 1601 continues below.

The comparison unit 1740 is implemented by the processor 315 executing a program. The comparison unit 1740 has a function of generating comparison result information by comparing, when a comparison signal is transmitted from the capture instruction unit 1705, image information stored by the image information storage unit 1730 and object information acquired by the object information acquisition unit 1735. The comparison unit 1740 also has a function of causing the comparison result information storage unit 1745 to store the comparison result information so generated.

Here, comparing the image information and the object information refers to (i) calculating, with respect to each of the analysis results 1802 in the image information 1801*d*, a ratio of the analysis result 1802, linked with a corresponding time 1801, to an expected value 1902 in the object information 1900 that is linked with a time 1901 matching the corresponding time 1801 (calculating a percentage value by dividing the analysis result 1802 by the expected value 1902 and multiplying the quotient by 100), and calculating a ratio of a sum of the analysis results 1802 to a sum of the expected values 1902 (calculating a percentage value by dividing the sum of the analysis results 1802 by the sum of the expected values 1902 and multiplying the quotient by 100), (ii) calculating, with respect to each of the analysis results 1812 in the image information 1801*e*, a ratio of the analysis result 1812, linked with a corresponding time 1811, to an expected value 1902 in the object information 1900 that is linked with a time 1901 matching the corresponding time 1811 (calculating a percentage value by dividing the analysis result 1812 by the expected value 1902 and multiplying the quotient by 100), and calculating a ratio of a sum of the analysis results 1812 to the sum of the expected values 1902 (calculating a percentage value by dividing the sum of the analysis results 1812 by the sum of the expected values 1902 and multiplying the quotient by 100); and (iii) calculating, with respect to each of the analysis results 1822 in the image information 1801*f*, a ratio of the analysis result 1822, linked with a corresponding time 1821, to an expected value 1902 in the object information 1900 that is linked with a time 1901 matching the corresponding time 1821 (calculating a percentage value by dividing the analysis result 1822 by the expected value 1902 and multiplying the quotient by 100), and calculating a ratio of a sum of the analysis results 1822 to the sum of the expected values 1902 (calculating a percentage value by dividing the sum of the analysis results 1822 by the sum of the expected values 1902 and multiplying the quotient by 100).

FIG. 20A, FIG. 20B, and FIG. 20C are each an example of comparison result information stored by the comparison result information storage unit 1745. FIG. 20A, FIG. 20B, and FIG. 20C are data configuration diagrams of comparison result information 2000*d*, comparison result information 2000*e*, and comparison result information 2000*f*, respectively.

Here, the comparison result information 2000*d* is an example of comparison result information stored by the comparison result information storage unit 1745 in the camera 1601*d*. The comparison result information 2000*d* is generated by a comparison of the image information 1800*d* and the object information 1900. The comparison result information 2000*e* is an example of comparison result information stored by the comparison result information storage unit 1745 in the camera 1601*e*. The comparison result information 2000*e* is generated by a comparison of the image information 1800*e* and the object information 1900. The comparison result information 2000*f* is an example of comparison result information stored by the comparison result information storage unit 1745 in the camera 1601*f*. The comparison result information 2000*f* is generated by a comparison of the image information 1800*f* and the object information 1900.

As shown in FIG. 20A, the comparison result information 2000*d* is composed of times 2001, comparison results 2002, and an evaluation value 2003. Further, each time 2001 is linked with a comparison result 2002 and the evaluation value 2003. As shown in FIG. 20B, the comparison result information 2000*e* is composed of times 2011, comparison results 2012, and an evaluation value 2013. Further, each time 2011 is linked with a comparison result 2012 and the evaluation value 2013. As shown in FIG. 20C, the comparison result information 2000*f* is composed of times 2021, comparison results 2022, and an evaluation value 2023. Further, each time 2021 is linked with a comparison result 2022 and the evaluation value 2023.

Each time 2001, time 2011, and time 2021 denotes a time.

Each comparison result 2002 denotes a ratio of an analysis result 1802 to an expected value 1902 at a time 2001. Each comparison result 2012 denotes a ratio of an analysis result 1812 to an expected value 1902 at a time 2011. Each comparison result 2022 denotes a ratio of an analysis result 1822 to an expected value 1902 at a time 2021.

The evaluation value 2003 denotes a ratio of the sum of the analysis results 1802 to the sum of the expected values 1902. The evaluation value 2013 denotes a ratio of the sum of the analysis results 1812 to the sum of the expected values 1902. The evaluation value 2023 denotes a ratio of the sum of the analysis results 1822 to the sum of the expected values 1902.

Returning to FIG. 17, description of the function configuration of the camera 1601 continues below.

The comparison result information storage unit 1745 is implemented by a portion of a storage area of the memory 335. The comparison result information storage unit 1745 has the same functions as the comparison result information storage unit 445 in embodiment 1. However, as described above, the comparison result information stored by the comparison result information storage unit 1745 is modified from the comparison result information stored by the comparison result information storage unit 445.

The evaluation condition storage unit 1755 is implemented by a portion of a storage area of the memory 335. The evaluation condition storage unit 1755 has the same functions as the evaluation condition storage unit 455 in embodiment 1. However, the evaluation condition stored by the evaluation condition storage unit 1755 is different to the evaluation condition stored by the evaluation condition storage unit 455.

Here, the evaluation condition stored by the evaluation condition storage unit 1755 is a condition that the evaluation value 2003, the evaluation value 2013, or the evaluation value 2023 is equal to or greater than 90% and less than 110%.

The evaluation unit 1750 is implemented by the processor 315 executing a program. The evaluation unit 1750 has the following two functions.

OK result evaluation function: A function of (i) applying the evaluation condition stored by the evaluation condition storage unit 1755 to the evaluation value 2003, the evaluation value 2013, and the evaluation value 2023 of the comparison result information 2000d, the comparison result information 2000e, and the comparison result information 2000f, respectively, and, (ii) when the comparison result information satisfies the evaluation condition, transmitting the condition switching signal, which indicates that the evaluation result is positive, to the capture instruction unit 1705 and the calculation unit 1720.

For example, since the ratio denoted by the evaluation value 2003 of the comparison result information 2000d is 98%, this satisfies the evaluation condition stored by the evaluation condition storage unit 1755 (equal to or greater than 90% and less than 110%). Thus, the evaluation unit 1750 of the camera 1601d transmits the condition switching signal to the capture instruction unit 1705 and the calculation unit 1720 of the camera 1601d.

NG result evaluation function: A function of (i) applying the evaluation condition stored by the evaluation condition storage unit 1755 to the evaluation value 2003, the evaluation value 2013, and the evaluation value 2023 of the comparison result information 2000d, the comparison result information 2000e, and the comparison result information 2000f, respectively, and, (ii) when the comparison result information does not satisfy the evaluation condition, transmitting an NG signal, which indicates that the evaluation result is negative, to the NG result output unit 1760.

For example, since the ratio denoted by the evaluation value 2013 of the comparison result information 2000e is 88%, this does not satisfy the evaluation condition stored by the evaluation condition storage unit 1755 (equal to or greater than 90% and less than 110%). Thus, the evaluation unit 1750 of the camera 1601e transmits the NG signal to the NG result output unit 1760 of the camera 1601e.

The NG result output unit 1760 is implemented by the network communication LSI 345 and the processor 315 executing a program. The NG result output unit 1760 has a function of outputting to the first modified management server, via the network 103, the NG signal transmitted from the evaluation unit 1750.

The first modified management server is composed of the same function blocks as the management server 102 in embodiment 1 (refer to FIG. 10). However, instead of the self-evaluation process (refer to FIG. 12) performed by the management server 102 in embodiment 1, the first modified management server performs a self-evaluation camera specification process (described in detail using a flowchart under the heading "Self-evaluation camera specification process").

Operations performed by the first modified camera system having the above configuration are described below with reference to the drawings.

<Operations>

The first modified camera system performs the self-evaluation camera specification process and a modified self-evaluation process as characteristic operations thereof.

The processes are described below, in turn.

<Self-Evaluation Camera Specification Process>

The self-evaluation camera specification process is a process performed by the first modified management server and is a process for searching for a camera 1601 that has a favorable self-evaluation result.

FIG. 21 is a flowchart of the self-evaluation camera specification process.

The self-evaluation camera specification process is begun when a user of the first modified camera system performs an operation with respect to the input device 910 of the first modified management server indicating that the self-evaluation camera specification process is to begin.

When the self-evaluation camera specification process is begun, the camera specification unit 1050, upon reception of an operation from the user, specifies a camera 1601 that is to perform a self-evaluation (step S2100).

Next, the condition generation unit 1005, upon reception of an operation from the user and based on the operation received, generates the evaluation capture condition and the normal capture condition for transmission to the camera 1601 that is specified (step S2110). Next, the condition generation unit 1005, upon reception of an operation from the user and based on the operation received, generates the evaluation analysis condition and the normal analysis condition for transmission to the camera 1601 that is specified (step S2120).

When the evaluation capture condition, the normal capture condition, the evaluation analysis condition, and the normal analysis condition are generated, the communication unit 1015 transmits the evaluation capture condition, the normal capture condition, the evaluation analysis condition, and the normal analysis condition to the camera 1601 that is specified (step S2130), and begins to measure the predefined time T1 (for example, 24 hours).

Afterward, and before the predefined time T1 passes, the object information generation unit 1020, upon reception of an operation from the user and based on the operation received, generates the object information for transmission to the camera 1601 that is specified (step S2140).

When the predefined time T1 passes, the communication unit 1015 transmits the object information so generated to the camera 1601 that is specified (step S2150).

Upon transmitting the object information to the camera 1601 that is specified, the communication unit 1015 checks whether or not an NG signal is received within a predefined time T2 (for example, 10 minutes) from the transmission of the object information as a result of the camera 1601 responding to the transmission (step S2160).

In step S2160, when the NG signal is received within the predefined time T2 ("Yes" in step S2160), the camera specification unit 1050, upon receiving an operation performed by the user, specifies the camera 1601 that is next to perform the self-evaluation (step S2170).

When step S2170 ends, the first modified management server returns to step S2110 and repeats step S2110.

In step S2160, when the NG signal is not received within the predefined time T2 ("No", in step S2160), the first modified management server ends the self-evaluation camera specification process.

<Modified Self-Evaluation Process>

The modified self-evaluation process is a process performed by the camera 1601. The camera 1601 performs a self-evaluation, and (i) begins normal capturing when the self-evaluation result is within a predefined threshold and (ii) transmits the NG signal to the modified management server when the self-evaluation result is not within the predefined threshold.

Figure 22:
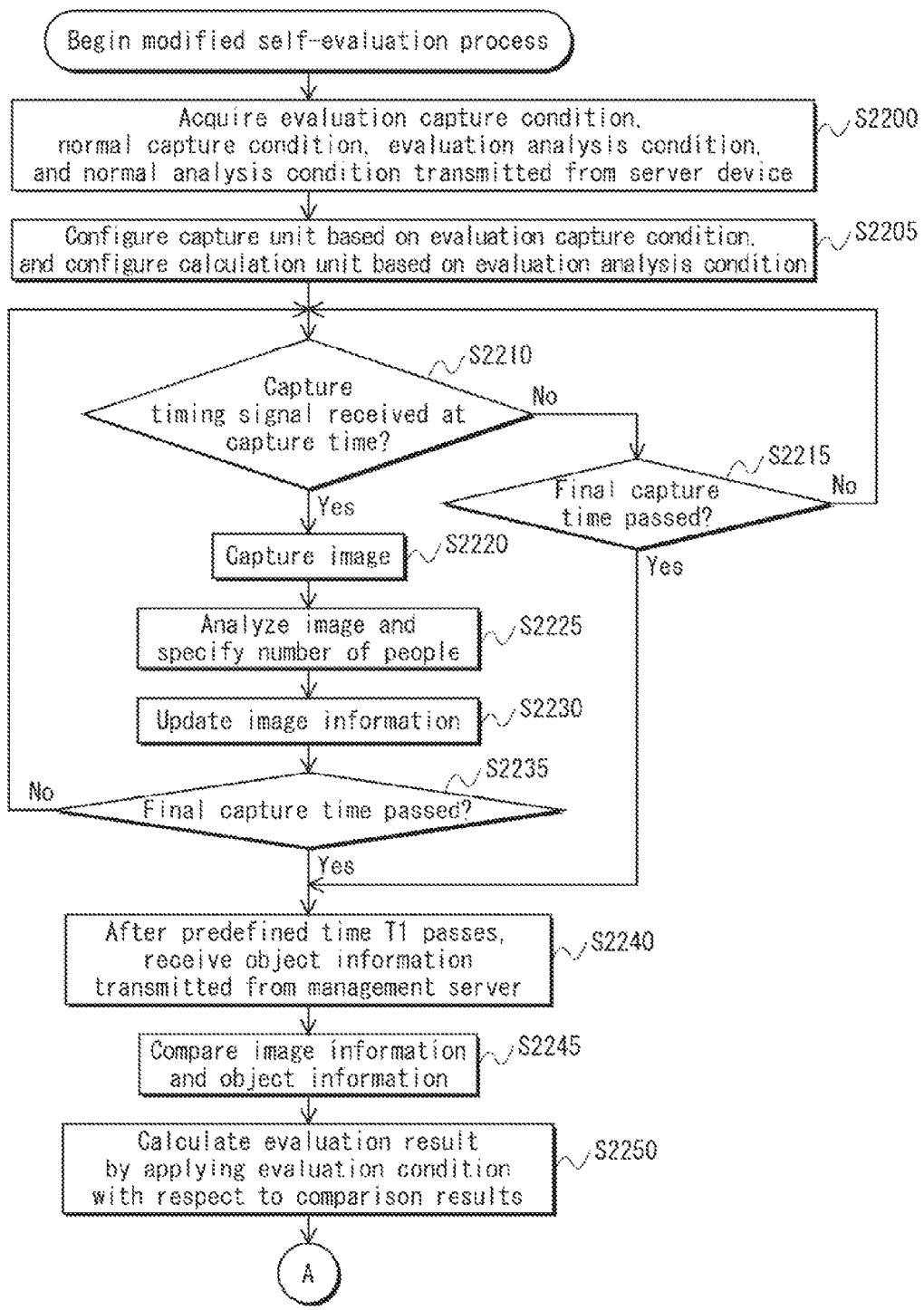
FIG. 22 is part 1 of a flowchart of a modified self-evaluation process.

FIG. 22 is a flowchart of the modified self-evaluation process.

The modified self-evaluation process is begun by the camera 1601 when the evaluation capture condition, the normal capture condition, the evaluation analysis condition, and the normal analysis condition are transmitted from the first modified management server to the camera 1601.

When the modified self-evaluation process is begun, the condition acquisition unit 400 acquires the evaluation capture condition, the normal capture condition, the evaluation analysis condition, and the normal analysis condition, which are transmitted from the first modified management server to the camera 1601 (step S2200).

Upon acquisition of the evaluation capture condition, the normal capture condition, the evaluation capture condition, and the normal analysis condition, the capture instruction unit 1705 configures the capture unit 415 based on the evaluation capture condition, and the calculation unit 1720 configures the calculation unit 1720 based on the evaluation analysis condition (step S2205).

Afterward, the capture instruction unit 405, during times that satisfy a condition of capture time (here, 6:00, 6:30, 7:00, 7:15, 7:30, 7:45, 8:00, 8:30, 9:00, . . . , 22:00, 22:30, 23:00, and 23:30) waits until the capture timing signal is transmitted from the capture timing reception unit 410 (in other words, during the above time periods, waits until a bus is detected travelling in the vicinity of the bus detection device 1510 (refer to FIG. 15)) ("No" at step S2210 and "No" at step S2215 are repeated).

In step S2210, during times that satisfy the condition of capture time, when the capture timing signal is transmitted from the capture timing reception unit 410 ("Yes" at step S2210), the capture unit 415 captures an image of people waiting for a bus to arrive at the bus stop 1530 (step S2220). Next, the calculation unit 1720 analyzes the image so captured in order to specify the number of people waiting for a bus to arrive at the bus stop 1530 in the image (step S2225), and updates the image information stored by the image information storage unit 1730 (step S2230: however, in a case in which image information to be updated is not being stored by the image information storage unit 1730, the calculation unit 1720 generates new image information and causes the image information storage unit 1730 to store the image information).

When the image information is updated, the capture unit 415 checks whether or not the last time period that satisfies the condition of capture time has already been passed (step S2235).

In step S2235, when the last time period has not been passed ("No" at step S2235), the camera 1601 returns processing to step S2210 and repeats step S2210.

In a case in which the last time period has already been passed at step S2235 ("Yes" at step S2235) and in a case in which the last time period has already been passed at step S2215 ("Yes" at step S2215), when the predefined time T1 passes from transmission of the evaluation capture condition, the normal capture condition, the evaluation analysis condition, and the evaluation capture condition from the first modified management server, the first modified management server transmits the object information (refer to step S2150 in FIG. 21), and therefore the object information acquisition unit 1735 acquires the object information transmitted from the first modified management server (step S2240).

When the capture instruction unit 1705 transmits the comparison signal to the comparison unit 1740 (the capture instruction unit transmits the comparison signal when the predefined time T1 passes from transmission of the evaluation capture condition from the condition acquisition unit 400), the comparison unit 1740 compares the image information stored by the image information storage unit 1730 and the object information acquired by the object information acquisition unit 1735 (step S2245), in order to generate comparison result information that includes the evaluation value (step S2250).

Figure 23:
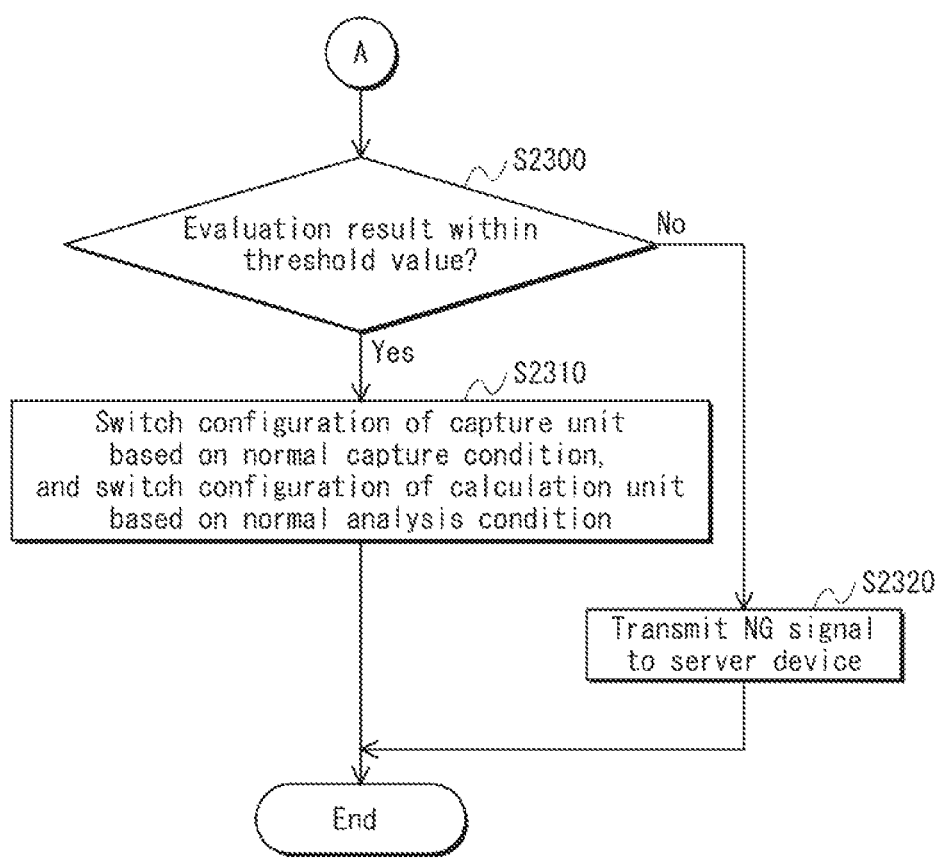
FIG. 23 is part 2 of the flowchart of the modified self-evaluation process.

When the comparison result information is generated, the evaluation unit 1750 applies the evaluation condition stored by the evaluation condition storage unit 1755 to the evaluation value included in the comparison result information, in order to check whether or not the evaluation value satisfies the evaluation condition (here, whether or not the evaluation value is equal to or greater than 90% and less than 110%) (step S2300 (refer to FIG. 23)).

In step S2300, when the evaluation value is within the threshold ("Yes" in step S2300), the evaluation unit 1750 transmits the condition switching signal to the capture instruction unit 1705 and the calculation unit 1720.

When the condition switching signal is transmitted to the capture instruction unit 1705 and the calculation unit 1720, (i) the capture instruction unit 1705 switches a configuration of a condition of capturing performed by the capture unit 415 to a configuration based on the normal capture condition acquired by the condition acquisition unit 400, and (ii) the calculation unit 1720 switches a configuration of the calculation unit 1720 to a configuration based on the normal analysis condition acquired by the condition acquisition unit 400 (step S2310).

In step S2300, when the evaluation value is not within the threshold ("No" in step S2300), the evaluation unit 1750 transmits the NG signal to the NG result output unit 1760, and the NG result output unit 1760 transmits the NG signal to the first modified management server via the network 103 (step S2320).

When step S2310 ends, and when step S2320 ends, the camera 1601 ends the modified self-evaluation process.

<Consideration>

The user of the above-described first modified camera system, when intending to select and use one camera that is appropriate for the user's purpose from among the plurality of cameras in the first modified camera system, can cause the modified self-evaluation process to be executed by a camera that may be appropriate for the user's purpose.

Then, when the self-evaluation result is within the predefined threshold, the camera 1601 is considered to be appropriate for the user's purpose and normal capture begins. On the other hand, when the self-evaluation result is not within the predefined threshold, the camera 1601 is considered to be inappropriate for the user's purpose, the camera 1601 transmits the NG signal to the first modified management server, and normal capture is not begun. In such a case, the user, for example, repeatedly selects other cameras, causing the other cameras to execute the modified self-evaluation process until a camera 1601 that is appropriate for the user's purpose is found. Thus, the user can find and use a camera that is appropriate for the user's purpose.

More specifically, the user who intends to use one of the camera 1601d, the camera 1601e, and the camera 1601f to investigate the number of people waiting for a bus to arrive at the bus stop 1530 causes one of the camera 1601d, the camera 1601e, and the camera 1601f to execute the modified self-evaluation process.

When the user selects the camera 1601d or the camera 1601f, the camera so selected (the camera 1601d or the camera 1601) executes the modified self-evaluation process, does not transmit the NG signal to the first modified management server, and begins normal capture. Thus, the user can use the camera so selected (the camera 1601d or the camera 1601() as a camera that is appropriate for the user's purpose.

When the user selects the camera 1601e, the camera 1601e executes the modified self-evaluation process, transmits the NG signal to the first modified management server, and does not begin normal capture. Thus, the user does not use the camera 1601e as a camera that is appropriate for the user's purpose. Next, for example, by selecting the camera 1601d or the camera 1601f and causing the camera 1601d or the camera 1601f to execute the modified self-evaluation process, the user can use the camera 1601d or the camera 1601f as a camera that is appropriate for the user's purpose.

<Modification 1>
<Summary>

The following describes a second modified camera system, which is a partial modification of the camera system 100 in embodiment 1, as an embodiment of the camera, the camera system, and the self-evaluation method performed by a camera, pertaining to aspects of the present invention.

The second modified camera system is modified from the camera system 100 in embodiment 1 such that the camera 101 is modified to a camera 2401 (described later).

The camera 101 in embodiment 1 is an example configuration that calculates, as the evaluation result, a fraction that has the total number of the comparison results as a denominator and the number of "match" comparison results as the numerator.

In contrast, the camera 2401 in modification 1 is an example configuration that calculates a first fraction and a second fraction as the evaluation result. The first fraction has the number of comparison results obtained within a time period from 8:00 until 16:00 as a denominator and the number of "match" comparison results from 8:00 until 16:00 as a numerator. The second fraction has the number of comparison results obtained within a time period from 17:00 until 22:00 as a denominator and the number of "match" comparison results from 17:00 until 22:00 as a numerator.

The following describes the configuration of the second modified camera system with reference to the drawings, focusing on differences between the second modified camera system and the camera system 100 in embodiment 1.

<Configuration>

The second modified camera system is modified from the camera system 100 (refer to FIG. 1) in embodiment 1 such that the camera 101 (the cameras 101a to 101f) is modified to the camera 2401 (cameras 2401a to 2401f).

The following does not describe each of the cameras 2401a to 2401f separately, and instead the cameras 2401a to 2401f are described using a camera 2401 representing the cameras 2401a to 2401f.

The hardware structure of the camera 2401 is the same as that of the camera 101 in embodiment 1 (refer to FIG. 3). However, a portion of software executed by the camera 2401 is changed from that of the camera 101.

FIG. 24 is a block diagram showing a function configuration of the camera 2401.

As shown in FIG. 24, the camera 2401 is modified from the camera 101 in embodiment 1 such that the evaluation unit 450 is changed to an evaluation unit 2450, and the evaluation condition storage unit 455 is changed to an evaluation condition storage unit 2455.

The blocks that are changed from the blocks in embodiment 1 are focused on in the following description.

The evaluation condition storage unit 2455 is implemented by a portion of a storage area of the memory 335. The evaluation condition storage unit 2455 has the same functions as the evaluation condition storage unit 455 in embodiment 1. However, an evaluation condition stored by the evaluation condition storage unit 2455 is different from the evaluation condition stored by the evaluation condition storage unit 455 in embodiment 1.

In modification 1, the evaluation condition stored by the evaluation condition storage unit 2455 is a calculation method of calculating, (i) as a first degree of matching, a fraction that has a total number of comparison results obtained within a time period from 8:00 to 16:00 (hereafter, "first time period") as a first denominator, and the number of "match" comparison results in the first time period as a first numerator, and, (ii) as a second degree of matching, a fraction that has a total number of comparison results obtained within a time period from 17:00 to 22:00 (hereafter, "second time period") as a second denominator, and the number of "match" comparison results in the second time period as a second numerator.

The evaluation unit 2450 is implemented by the processor 315 executing a program. The evaluation unit 2450 has a function of calculating an evaluation result indicating a result of a self-evaluation performed by the camera 2401 by applying the evaluation condition stored by the evaluation condition storage unit 2455 to the comparison result information stored by the comparison result information storage unit 445. The evaluation unit 2450 also has a function of transmitting the evaluation result so calculated to the evaluation result output unit 460.

FIG. 25A, FIG. 25B, and FIG. 25C are each an example of the evaluation result calculated by the evaluation unit 2450. FIG. 25A, FIG. 25B, and FIG. 25C are data configuration diagrams of an evaluation result 2500a, an evaluation result 2500b, and an evaluation result 2500c, respectively.

Here, the evaluation result 2500a is an example of an evaluation result calculated by the evaluation unit 2450 in the camera 2401a. The evaluation result 2500b is an example of an evaluation result calculated by the evaluation unit 2450 in the camera 2401b. The evaluation result 2500c is an example of an evaluation result calculated by the evaluation unit 2450 in the camera 2401c.

As shown in FIG. 25A, the evaluation result 2500a is composed of time periods 2501 and degrees of matching 2502, and each time period 2501 is linked with a degree of matching 2502. As shown in FIG. 25B, the evaluation result 2500b is composed of time periods 2511 and degrees of matching 2512, and each time period 2511 is linked with a degree of matching 2512. As shown in FIG. 25C, the evaluation result 2500c is composed of time periods 2521 and degrees of matching 2522, and each time period 2521 is linked with a degree of matching 2522.

Each time period 2501, time period 2511, and time period 2521 specifies either the first time period or the second time period.

Each degree of matching 2502, degree of matching 2512, and degree of matching 2522 denotes either the first degree of matching or the second degree of matching calculated by the evaluation unit 2450. A degree of matching (2502, 2512, 2522) denotes the first degree of matching when a time period linked therewith (2501, 2511, 2521) denotes 8:00-16:00, and a degree of matching (2502, 2512, 2522) denotes the second degree of matching when a time period linked therewith (2501, 2511, 2521) denotes 17:00-22:00.

<Consideration>

A user of the above-described second modified camera system obtains, by causing the camera 2401 to execute the self-evaluation process, a degree of matching during the first time period (8:00-16:00, i.e. a daylight time period) and a degree of matching during the second time period (17:00-22:00, i.e. an evening time period).

Thus, the user is able to select and use the camera 2401 that is most appropriate for the user's needs in each of the first time period and the second time period.

More specifically, in the first time period, which is a daylight time period, the user is able to use the camera 2401b, which has a degree of matching of 9/9 (the camera that has the highest probability of performing highly accurate capture and highly accurate analysis in the daylight time period), and in the second time period, which is an evening time period, the user is able to use the camera 2401c, which has a degree of matching of 6/6 (the camera that has the highest probability of performing highly accurate capture and highly accurate analysis in the evening time period).

<Modification 2>

<Summary>

The following describes a third modified camera system, which is a partial modification of the camera system 100 in embodiment 1, as an embodiment of the camera, the camera system, and the self-evaluation method performed by a camera, pertaining to aspects of the present invention.

The third modified camera system is modified from the camera system 100 in embodiment 1 such that the camera 101 is modified to a camera 2601 (described later).

The camera 101 in embodiment 1 is an example of a configuration that specifies a character string displayed on a number plate of a vehicle included in an image captured by the camera 101, and checks whether or not the character string so specified matches an expected value.

In contrast, the camera 2601 in modification 2 is an example of a configuration that specifies the sex, etc., of a person in a passenger seat of a vehicle included in an image captured by the camera 2601, and checks whether or not the sex, etc., so specified matches an expected value.

The following describes the configuration of the third modified camera system with reference to the drawings, focusing on differences between the third modified camera system and the camera system 100 in embodiment 1.

<Configuration>

The third modified camera system is modified from the camera system 100 (refer to FIG. 1) in embodiment 1 such that the camera 101 (the cameras 101a to 101f) is modified to the camera 2601 (cameras 2601a to 2601f).

The following does not describe each of the cameras 2601a to 2601f separately, and instead the cameras 2601a to 2601f are described using the camera 2601 representing the cameras 2601a to 2601f.

The hardware structure of the camera 2601 is the same as that of the camera 101 in embodiment 1 (refer to FIG. 3). However, a portion of software executed by the camera 2601 is changed from that of the camera 101.

Figure 26:
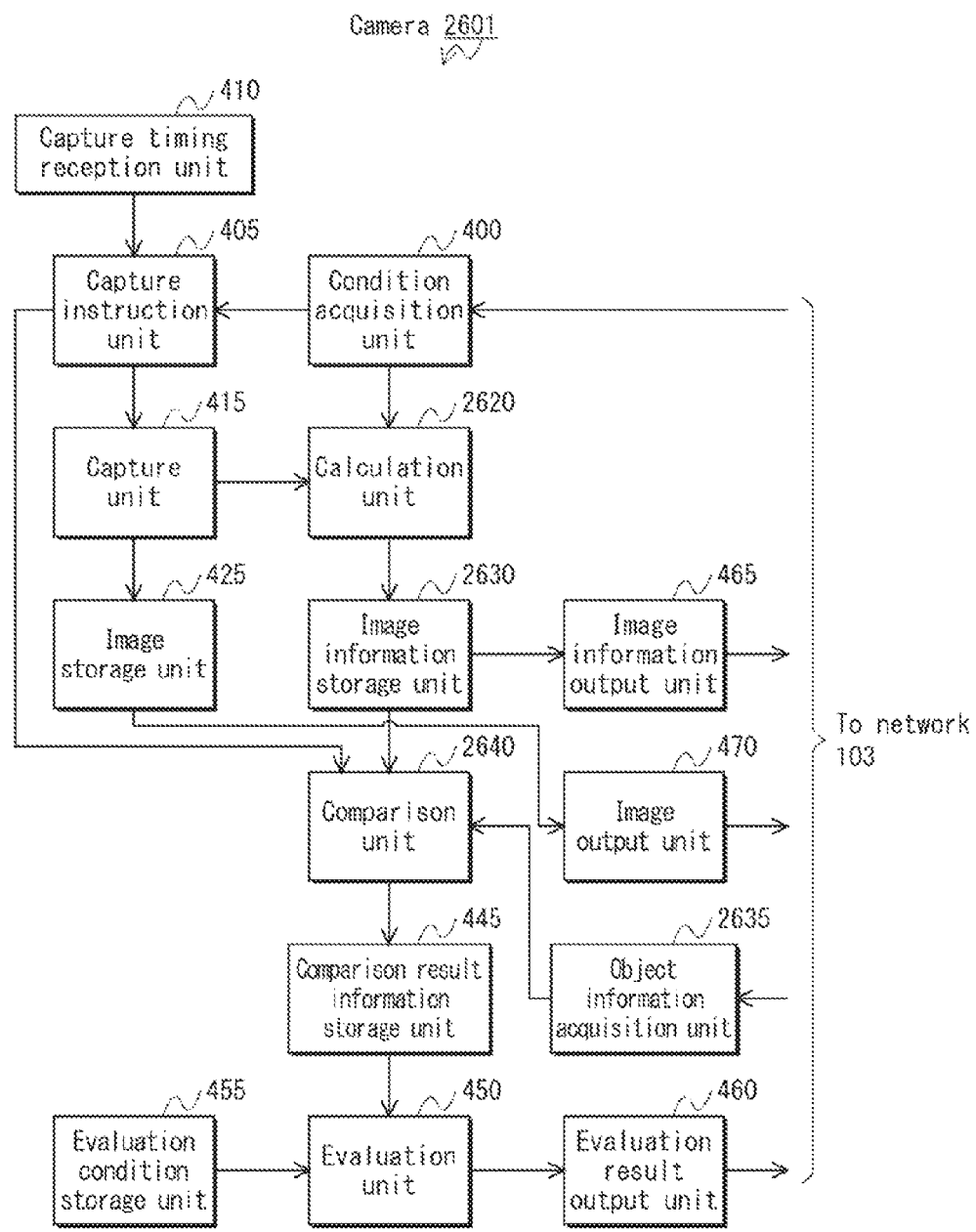
FIG. 26 is a block diagram showing a function configuration of a camera 2601.

FIG. 26 is a block diagram showing a function configuration of the camera 2601.

As shown in FIG. 26, the camera 2601 is modified from the camera 101 in embodiment 1 such that the calculation unit 420 is changed to a calculation unit 2620, the image information storage unit 430 is changed to an image information storage unit 2630, the object information acquisition unit 435 is changed to an object information acquisition unit 2635, and the comparison unit 440 is changed to a comparison unit 2640.

The blocks that are changed from the blocks in embodiment 1 are focused on in the following description.

The calculation unit 2620 is implemented by the analysis LSI 330 and the processor 315 executing a program. The calculation unit 2620 has the following two functions, in addition to the calculation unit configuration function of the calculation unit 420 in embodiment 1.

In modification 2, below, the evaluation analysis condition transmitted from the management server 102 is described as a condition for causing the calculation unit 2620 to analyze an image transmitted from the capture unit 415, and thereby specify whether (1) a male, (2) a female, or (3) nobody is in a passenger seat of a vehicle included in the image. Note that an estimation of the sex of a person in an image can be achieved within a certain degree of accuracy using existing image analysis technology.

Second modified analysis function: A function of, when an image is transmitted from the capture unit 415, analyzing the image using an algorithm specified by the calculation unit configuration function, and thereby specifying whether (1) a male, (2), a female, or (3) nobody is in a passenger seat of a vehicle included in the image.

Second modified image information update function: A function of, when an image is analyzed and a specification is thereby made regarding a person (or absence thereof) in a passenger seat of a vehicle, linking this specification result with a time at which the image transmitted from the capture unit 415 was captured, and (i) when image information is not being stored by the image information storage unit 2630, generating image information and causing the image information storage unit 2630 to store the specification result and the time, and (ii) when image information is being stored by the image information storage unit 2630, updating the image information stored by the image information storage unit 2630 with the specification result and the time.

FIG. 27A, FIG. 27B, and FIG. 27C are examples of image information stored by the image information storage unit 2630. FIG. 27A, FIG. 27B, and FIG. 27C are data configuration diagrams of image information 2700a, image information 2700b, and image information 2700c.

Here, the image information 2700a is an example of image information stored by the image information storage unit 2630 in the camera 2601a, the image information 2700b is an example of image information stored by the image information storage unit 2630 in the camera 2601b, and the image information 2700c is an example of image information stored by the information storage unit 2630 in the camera 2601c.

Further, the following describes image information obtained when a vehicle travelling through the capture point 220 is captured by the camera 2601a, the camera 2601b, and the camera 2601c at 8:00, 9:00, 10:00, 11:00, 12:00, 13:00, 14:00, 15:00, 16:00, 17:00, 18:00, 19:00, 20:00, 21:00, and 22:00. In other words, the following describes image information obtained when an administrator of the third modified camera system deliberately causes a vehicle to travel past the capture point 220 at the above-described times with a person specified by the administrator in the passenger seat of the vehicle or without anybody seated in the passenger seat of the vehicle.

As shown in FIG. 27A, the image information 2700a is composed of times 2701 and analysis results 2702, and each time 2701 is linked with an analysis result 2702. As shown in FIG. 27B, the image information 2700b is composed of times 2711 and analysis results 2712, and each time 2711 is linked with an analysis result 2712. As shown in FIG. 27C, the image information 2700c is composed of times 2721 and analysis results 2722, and each time 2721 is linked with an analysis result 2722.

Each time 2701, time 2712, and time 1721 denotes a time at which an image that is subject to analysis is captured.

Each analysis result 2702, analysis result 2712, and analysis result 2722 is sex information that denotes (1) male, (2) female, or (3) nobody, as specified by an analysis of an image that is subject to analysis.

In FIG. 27A, FIG. 27B, and FIG. 27C, sex information is denoted by "male" when a male is in the passenger seat, "female" when a female is in the passenger seat, and "none" when nobody is in the passenger seat.

The image information storage unit 2630 is implemented by a portion of a storage area of the memory 335. The image information storage unit 2630 has the same functions as the image information storage unit 430 in embodiment 1. However, as described above, image information that is stored by the image information storage unit 2630 is modified from image information that is stored by the image information storage unit 430 in embodiment 1.

The object information acquisition unit 2635 is implemented by the network communication LSI 345 and the processor 315 executing a program. The object information acquisition unit 2635 has the same functions as the object information acquisition unit 435 in embodiment 1. However, object information that is acquired by the object information acquisition unit 2635 is modified from object information that is acquired by the object information acquisition unit 435 in embodiment 1.

FIG. 28 is a data configuration diagram of object information 2800, which is an example of object information acquired by the object information acquisition unit 1735.

The object information 2800 includes specified sex information that denotes whether (1) a male, (2) a female, or (3) nobody is in the passenger seat of the vehicle, as specified by the administrator of the third modified camera system, for (i) each analysis result 2702 of the image information 2700a, (ii) each analysis result 2712 of the image information 2700b, and (iii) each analysis result 2722 of the image information 2700c, as stored by the image information storage unit 2630.

In FIG. 28, specified sex information is denoted by "male" when a male is in the passenger seat, "female" when a female is in the passenger seat, and "none" when nobody is in the passenger seat.

As shown in FIG. 28, the object information 2800 is composed of times 2801 and expected values 2802, and each time 2801 is linked with an expected value 2802.

Each time 2801 denotes a time.

Each expected value 2802 is specified sex information regarding a person (or absence thereof) in the passenger seat, as specified by the administrator of the third modified camera system regarding an image captured by the camera 2601 at a time 2801 linked therewith. In other words, each expected value 2802 is specified sex information denoting an expected value of a result of analysis in a case in which the analysis is correct.

Returning to FIG. 26, description of the function configuration of the camera 2601 continues below.

The comparison unit 2640 is implemented by the processor 315 executing a program. The comparison unit 2640 has a function of generating comparison result information by comparing, when a comparison signal is transmitted from the capture instruction unit 405, image information stored by the image information storage unit 2630 and object information acquired by the object information acquisition unit 2635. The comparison unit 2640 also has a function of causing the comparison result information storage unit 445 to store the comparison result information so generated.

Here, comparing the image information and the object information refers to (i) performing a check with respect to each of the analysis results 2702 in the image information 2700a of whether or not the analysis result 2702, linked with a corresponding time 2701, matches an expected value 2802 in the object information 2800 that is linked with a time 2801 matching the corresponding time 2701; (ii) performing a check with respect to each of the analysis results 2712 in the image information 2700b of whether or not the analysis result 2712, linked with a corresponding time 2711, matches an expected value 2802 in the object information 2800 that is linked with a time 2801 matching the corresponding time 2711; and (iii) performing a check with respect to each of the analysis results 2722 in the image information 2700c of whether or not the analysis result 2722, linked with a corresponding time 2721, matches an expected value 2802 in the object information 2800 that is linked with a time 2801 matching the corresponding time 2721.

<Consideration>

A user of the third modified camera system described above is able to select and use the camera 2601 that is most appropriate from among the camera 2601a, the camera 2601b, and the camera 2601c (for example, the camera 2601a) for the purpose of knowing the sex of the people in the passenger seat of vehicles travelling through the capture point 220 (refer to FIG. 2).

<Modification 3>

<Summary>

The following describes a fourth modified camera system, which is a partial modification of the camera system 100 in embodiment 1, as an embodiment of the camera, the camera system, and the self-evaluation method performed by a camera, pertaining to aspects of the present invention.

The camera system 100 in embodiment 1 is an example configuration in which the camera 101 performs the self-evaluation by using a character string displayed on a number plate of a vehicle travelling through the capture point 220 of the road 200.

In contrast, the fourth modified camera system in modification 3 is an example configuration in which a camera 3001 (described later) performs a self-evaluation by using people entering and leaving an entrance of a department store.

The following is a description in detail of the fourth modified camera system, focusing on points of difference between the fourth modified camera system and the camera system 100, and described with reference to the drawings.

<Configuration>

The fourth modified camera system is modified from the camera system 100 (refer to FIG. 1) in embodiment 1 such that the camera 101 (the cameras 101a to 101f) is modified to the camera 3001 (cameras 3001a to 3001f).

Further, positioning of the cameras 3001a to 3001c is modified from the positioning of the cameras 101a to 101c in embodiment 1.

Figure 29:
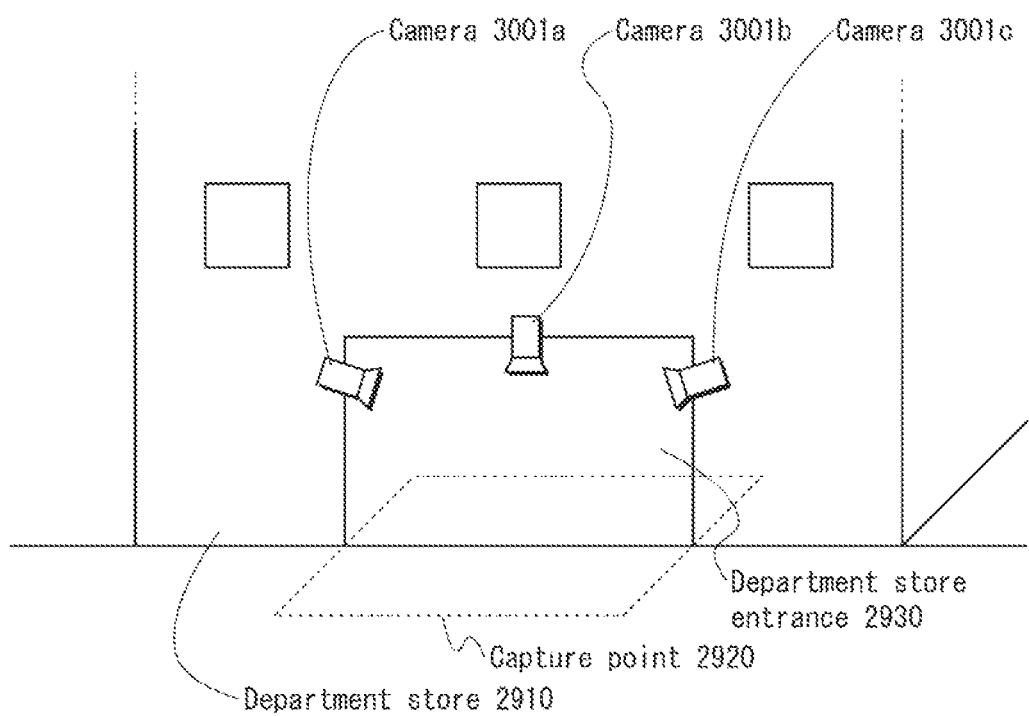
FIG. 29 is a schematic diagram showing a situation in which cameras 3001a to 3001c are set up on a street.

FIG. 29 is a schematic diagram showing a situation in which the cameras 3001a to 3001c are set up on a street.

As shown in FIG. 29, each of the cameras 3001a to 3001c is set up in the vicinity of a department store entrance 2930 such that capturing is possible of people passing through a capture point 2920 set in the vicinity of the department store entrance 2930.

The following does not describe each of the cameras 3001a to 3001c separately, and instead the cameras 3001a to 3001c are described using the camera 3001 representing the cameras 3001a to 3001c.

The hardware structure of the camera 3001 is the same as that of the camera 101 in embodiment 1 (refer to FIG. 3). However, a portion of software executed by the camera 3001 is changed from that of the camera 101.

FIG. 30 is a block diagram showing a function configuration of the camera 3001.

As shown in FIG. 30, the camera 3001 is modified from the camera 101 in embodiment 1 such that the capture timing reception unit 410 is removed, the capture instruction unit 405 is changed to a capture instruction unit 3005, the calculation unit 420 is changed to a calculation unit 3020, the image information storage unit 430 is changed to an image information storage unit 3030, and the object information acquisition unit 435 is changed to an object information acquisition unit 3035. Further, the comparison unit 440 is changed to a comparison unit 3040, the comparison result information storage unit 445 is changed to a comparison result information storage unit 3045, the evaluation unit 450 is changed to an evaluation unit 3050, and the evaluation condition storage unit 455 is changed to an evaluation condition storage unit 3055.

The blocks that are changed from the blocks in embodiment 1 are focused on in the following description.

The capture instruction unit 3005 is implemented by the timer 340 and the processor 315 executing a program. In addition to the capture instruction unit configuration function and the comparison trigger function that the capture instruction unit 405 in embodiment 1 has, the capture instruction unit 3005 has a modified capture trigger function, which is described below.

Modified capture trigger function: A function of transmitting the capture signal to the capture unit 415 in a time period that satisfies a "capture time condition". The "capture time condition" is included in the evaluation capture condition or the normal capture condition transmitted from the condition acquisition unit 400.

In the following, the "capture time condition" included in the evaluation capture condition is described as 10:00:00 a.m. (hereafter, also referred to as 10:00), 12:00:00 noon (hereafter, also referred to as 12:00), . . . , and 6:00:00 p.m. (hereafter, also referred to as 18:00).

The calculation unit 3020 is implemented by the analysis LSI 330 and the processor 315 executing a program. The calculation unit 3020 has, in addition to the calculation unit configuration function of the calculation unit 420 in embodiment 1, a third modified analysis function and a third modified image information update function, which is described below.

In modification 3, below, the evaluation analysis condition transmitted from the management server 102 is described as a condition for causing the calculation unit 3020 to analyze an image transmitted from the capture unit 415, and thereby specify, regarding the people included in the image, (1) the number of people estimated to be males who are at most 19 years of age, (2) the number of people estimated to be females who are at most 19 years of age, (3) the number of people estimated to be males who are 20 to 39 years of age, (4) the number of people estimated to be females who are 20 to 39 years of age, (5) the number of people estimated to be males who are 40 to 59 years of age, (6) the number of people estimated to be females who are 40 to 59 years of age, (7) the number of people estimated to be males who are at least 60 years of age, and (8) the number of people estimated to be females who are at least 60 years of age. Note that an estimation of the sex and age range of a person in an image can be achieved within a certain degree of accuracy using existing image analysis technology.

Third modified analysis function: A function of, when an image is transmitted from the capture unit 415, analyzing the image using an algorithm specified by the calculation unit configuration function, and thereby specifying, regarding the number of people included in the image, (1) the number of people estimated to be males who are at most 19 years of age, (2) the number of people estimated to be females who are at most 19 years of age, (3) the number of people estimated to be males who are 20 to 39 years of age, (4) the number of people estimated to be females who are 20 to 39 years of age, (5) the number of people estimated to be males who are 40 to 59 years of age, (6) the number of people estimated to be females who are 40 to 59 years of age, (7) the number of people estimated to be males who are at least 60 years of age, and (8) the number of people estimated to be females who are at least 60 years of age.

Third modified image information update function: A function of, when an image is analyzed and the specification is made regarding the people included in the image, linking this specification result and a time at which the image transmitted from the capture unit 415 was captured, and (i) when image information is not being stored by the image information storage unit 3030, generating image information and causing the image information storage unit 3030 to store the specification result and the time, and (ii) when image information is being stored by the image information storage unit 3030, updating the image information stored by the image information storage unit 3030 with the specification result and the time.

FIG. 31A, FIG. 31B, and FIG. 31C are examples of image information stored by the image information storage unit 3030. FIG. 31A, FIG. 31B, and FIG. 31C are data configuration diagrams of image information 3100a, image information 3100b, and image information 3100c.

Here, the image information 3100a is an example of image information stored by the image information storage unit 3030 in the camera 3001a, the image information 3100b is an example of image information stored by the image information storage unit 3030 in the camera 3001b, and the image information 3100c is an example of image information stored by the information storage unit 3030 in the camera 3001c.

Further, in the following, the sex and age range of people passing through the capture point 2920 at 10:00, 12:00, . . . , and 18:00 are described as being investigated by an administrator of the fourth modified camera system.

As shown in FIG. 31A, the image information 3100a is composed of times 3101 and analysis results 3102, and each time 3101 is linked with an analysis result 3102. As shown in FIG. 31B, the image information 3100b is composed of times 3121 and analysis results 3122, and each time 3121 is linked with an analysis result 3122. As shown in FIG. 31C, the image information 3100c is composed of times 3141 and analysis results 3142, and each time 3141 is linked with an analysis result 3142.

The analysis results 3102 are composed of males who are at most 19 years of age (denoted as "age ≤19 males") 3111, females who are at most 19 years of age (denoted as "age ≤19 females") 3112, males who are 20 to 39 years of age (denoted as "age 20-39 males") 3113, females who are 20 to 39 years of age (denoted as "age 20-39 females") 3114, males who are 40 to 59 years of age (denoted as "age 40-59 males") 3115, females who are 40 to 59 years of age (denoted as "age 40-59 females") 3116, males who are at least 60 years of age (denoted as "age ≥60 males") 3117, and females who are at least 60 years of age (denoted as "age ≥60 females") 3118. The analysis results 3122 are composed of age ≤19 males 3131, age ≤19 females 3132, age 20-39 males 3133, age 20-39 females 3134, age 40-59 males 3135, age 40-59 females 3136, age ≥60 males 3137, and age ≥60 females 3138. The analysis results 3142 are composed of age ≤19 males 3151, age ≤19 females 3152, age 20-39 males 3153, age 20-39 females 3154, age 40-59 males 3155, age 40-59 females 3156, age ≥60 males 3157, and age ≥60 females 3158.

Each time 3101, time 3121, and time 3141 denotes a time at which an image that is subject to analysis is captured.

Each of age ≤19 males 3111, age ≤19 males 3131, and age ≤19 males 3151 denotes the number of people estimated to be males who are at most 19 years of age in an image that is analyzed.

Each of age ≤19 females 3112, age ≤19 females 3132, and age ≤19 females 3152 denotes the number of people estimated to be females who are at most 19 years of age in an image that is analyzed.

Each of age 20-39 males 3113, age 20-39 males 3133, and age 20-39 males 3153 denotes the number of people estimated to be males who are 20 to 39 years of age in an image that is analyzed.

Each of age 20-39 females 3114, age 20-39 females 3134, and age 20-39 females 3154 denotes the number of people estimated to be females who are 20 to 39 years of age in an image that is analyzed.

Each of age 40-59 males 3115, age 40-59 males 3135, and age 40-59 males 3155 denotes the number of people estimated to be males who are 40 to 59 years of age in an image that is analyzed.

Each of age 40-59 females 3116, age 40-59 females 3136, and age 40-59 females 3156 denotes the number of people estimated to be females who are 40 to 59 years of age in an image that is analyzed.

Each of age ≥60 males 3117, age ≥60 males 3137, and age ≥60 males 3157 denotes the number of people estimated to be males who are at least 60 years of age in an image that is analyzed.

Each of age ≥60 females 3118, age ≥60 females 3138, and age ≥60 females 3158 denotes the number of people estimated to be females who are at least 60 years of age in an image that is analyzed.

Returning to FIG. 30, description of the function configuration of the camera 3001 continues below.

The image information storage unit 3030 is implemented by a portion of a storage area of the memory 335. The image information storage unit 3030 has the same functions as the image information storage unit 430 in embodiment 1. However, as described above, image information that is stored by the image information storage unit 3030 is modified from the image information that is stored by the image information storage unit 430 in embodiment 1.

The object information acquisition unit 3035 is implemented by the network communication LSI 345 and the processor 315 executing a program. The object information acquisition unit 3035 has the same functions as the object information acquisition unit 435 in embodiment 1. However, object information that is acquired by the object information acquisition unit 3035 is modified from the object information that is acquired by the object information acquisition unit 435 in embodiment 1.

FIG. 32 is a data configuration diagram of object information 3200, which is an example of object information acquired by the object information acquisition unit 3035.

This object information 3200 includes information denoting the number of people of a given sex and age range passing through the capture point 2920, as investigated by the administrator of the fourth modified camera system, i.e. an expected value of an expected analysis result in a case in which analysis is correctly performed, for (i) each analysis result 3102 of the image information 3100a, (ii) each analysis result 3122 of the image information 3100b, and (iii) each analysis result 3142 of the image information 3100c, as stored by the image information storage unit 3030.

As shown in FIG. 32, the object information 3200 is composed of times 3201 and expected values 3202, and each time 3201 is linked with the expected values 3202.

The expected values 3202 is composed of age ≤19 males 3211, age ≤19 females 3212, age 20-39 males 3213, age 20-39 females 3214, age 40-59 males 3215, age 40-59 females 3216, age ≥60 males 3217, and age ≥60 females 3218.

Each time 3201 denotes a time.

Each age ≤19 males 3211 denotes the number of males who are at most 19 years of age passing through the capture point 2920 in an image captured by the camera 3001 at a linked time 3201, as investigated by the administrator of the fourth modified camera system.

Each age ≤19 females 3212 denotes the number of females who are at most 19 years of age passing through the capture point 2920 in an image captured by the camera 3001 at a linked time 3201, as investigated by the administrator of the fourth modified camera system.

Each age 20-39 males 3213 denotes the number of males who are 20 to 39 years of age passing through the capture point 2920 in an image captured by the camera 3001 at a linked time 3201, as investigated by the administrator of the fourth modified camera system.

Each age 20-39 females 3214 denotes the number of females who are 20 to 39 years of age passing through the capture point 2920 in an image captured by the camera 3001 at a linked time 3201, as investigated by the administrator of the fourth modified camera system.

Each age 40-59 males 3215 denotes the number of males who are 40 to 59 years of age passing through the capture point 2920 in an image captured by the camera 3001 at a linked time 3201, as investigated by the administrator of the fourth modified camera system.

Each age 40-59 females 3116 denotes the number of females who are 40 to 59 years of age passing through the capture point 2920 in an image captured by the camera 3001 at a linked time 3201, as investigated by the administrator of the fourth modified camera system.

Each age ≥60 males 3117 denotes the number of males who are at least 60 years of age passing through the capture point 2920 in an image captured by the camera 3001 at a linked time 3201, as investigated by the administrator of the fourth modified camera system.

Each age ≥60 females 3118 denotes the number of females who are at least 60 years of age passing through the capture point 2920 in an image captured by the camera 3001 at a linked time 3201, as investigated by the administrator of the fourth modified camera system.

Returning to FIG. 30, description of the function configuration of the camera 3001 continues.

The comparison unit 3040 is implemented by the processor 315 executing a program. The comparison unit 3040 has a function of generating comparison result information by comparing, when a comparison signal is transmitted from the capture instruction unit 405, image information stored by the image information storage unit 3030 and object information acquired by the object information acquisition unit 3035. The comparison unit 3040 also has a function of causing the comparison result information storage unit 3045 to store the comparison result information so generated.

Here, comparing the image information and the object information refers to (i) performing a check with respect to each of the analysis results 3102 in the image information 3101a of whether or not the analysis result 3102, linked with a corresponding time 3101, matches an expected value 3202 in the object information 3200 that is linked with a time 3201 matching the corresponding time 3101; (ii) performing a check with respect to each of the analysis results 3122 in the image information 3101b of whether or not the analysis result 3122, linked with a corresponding time 3121, matches an expected value 3202 in the object information 3200 that is linked with a time 3201 matching the corresponding time 3121; and (iii) performing a check with respect to each of the analysis results 3142 in the image information 3101c of whether or not the analysis result 3142, linked with a corresponding time 3141, matches an expected value 3202 in the object information 3200 that is linked with a time 3201 matching the corresponding time 3141.

FIG. 33A, FIG. 33B, and FIG. 33C are each an example of comparison result information stored by the comparison result information storage unit 3045. FIG. 33A, FIG. 33B, and FIG. 33C are data configuration diagrams of comparison result information 3300a, comparison result information 3300b, and comparison result information 3300c, respectively.

Here, the comparison result information 3300a is an example of comparison result information stored by the comparison result information storage unit 3045 in the camera 3001a. The comparison result information 3300a is generated by a comparison of the image information 3100a and the object information 3200. The comparison result information 3300b is an example of comparison result information stored by the comparison result information storage unit 3045 in the camera 3001b. The comparison result information 3300b is generated by a comparison of the image information 3100b and the object information 3200. The comparison result information 3300c is an example of comparison result information stored by the comparison result information storage unit 3045 in the camera 3001b. The comparison result information 3300c is generated by a comparison of the image information 3100b and the object information 3200.

As shown in FIG. 33A the comparison result information 3300a is composed of times 3301 and comparison results 3302, and each time 3301 is linked with a comparison result 3302. As shown in FIG. 33B, the comparison result information 3300b is composed of times 3321 and comparison results 3322, and each time 3321 is linked with a comparison result 3322. As shown in FIG. 33C, the comparison result information 3300c is composed of times 3341 and comparison results 3342, and each time 3341 is linked to a comparison result 3342.

The comparison results 3302 are composed of age ≤19 males 3311, age ≤19 females 3312, age 20-39 males 3313, age 20-39 females 3314, age 40-59 males 3315, age 40-59 females 3316, age ≥60 males 3317, and age ≥60 females 3318. The analysis results 3322 are composed of age ≤19 males 3331, age ≤19 females 3332, age 20-39 males 3333, age 20-39 females 3334, age 40-59 males 3335, age 40-59 females 3336, age ≥60 males 3337, and age ≥60 females 3338. The analysis results 3342 are composed of age ≤19 males 3351, age ≤19 females 3352, age 20-39 males 3353, age 20-39 females 3354, age 40-59 males 3355, age 40-59 females 3356, age ≥60 males 3357, and age ≥60 females 3358.

Each time 3301, time 3321, and time 3341 denotes a time.

Each age ≤19 males 3311 denotes whether or not, at a linked time 3301, an age ≤19 males 3111 of the image information 3100a matches an age ≤19 males 3211 of the object information 3200. Each age ≤19 males 3331 denotes whether or not, at a linked time 3321, an age ≤19 males 3131 of the image information 3100b matches an age ≤19 males 3211 of the object information 3200. Each age ≤19 males 3351 denotes whether or not, at a linked time 3341, an age ≤19 males 3151 of the image information 3100c matches an age ≤19 males 3211 of the object information 3200.

Each females, ≤19 3312 denotes whether or not, at a linked time 3301, an age ≤19 females 3112 of the image information 3100a matches a females ≤19 3212 of the object information 3200. Each age ≤19 females 3332 denotes whether or not, at a linked time 3321, an age ≤19 females 3132 of the image information 3100b matches an age ≤19 females 3212 of the object information 3200. Each age ≤19 females 3352 denotes whether or not, at a linked time 3341, an age ≤19 females 3152 of the image information 3100c matches an age ≤19 females 3212 of the object information 3200.

Each age 20-39 males 3313 denotes whether or not, at a linked time 3301, an age 20-39 males 3113 of the image information 3100a matches an age 20-39 males 3213 of the object information 3200. Each age 20-39 males 3333 denotes whether or not, at a linked time 3321, an age 20-39 males 3133 of the image information 3100b matches an age 20-39 males 3213 of the object information 3200. Each age 20-39 males 3353 denotes whether or not, at a linked time 3341, an age 20-39 males 3153 of the image information 3100c matches an age 20-39 males 3213 of the object information 3200.

Each age 20-39 females 3314 denotes whether or not, at a linked time 3301, an age 20-39 females 3114 of the image information 3100a matches an age 20-39 females 3214 of the object information 3200. Each age 20-39 females 3334 denotes whether or not, at a linked time 3321, an age 20-39 females 3134 of the image information 3100b matches an age 20-39 females 3214 of the object information 3200. Each age 20-39 females 3354 denotes whether or not, at a linked time 3341, an age 20-39 females 3154 of the image information 3100c matches an age 20-39 females 3214 of the object information 3200.

Each age 40-59 males 3315 denotes whether or not, at a linked time 3301, an age 40-59 males 3115 of the image information 3100a matches an age 40-59 males 3215 of the object information 3200. Each age 40-59 males 3335 denotes whether or not, at a linked time 3321, an age 40-59 males 3135 of the image information 3100b matches an age 40-59 males 3215 of the object information 3200. Each age 40-59 males 3355 denotes whether or not, at a linked time 3341, an age 40-59 males 3155 of the image information 3100c matches an age 40-59 males 3215 of the object information 3200.

Each age 40-59 females 3316 denotes whether or not, at a linked time 3301, an age 40-59 females 3116 of the image information 3100a matches an age 40-59 females 3216 of the object information 3200. Each age 40-59 females 3336 denotes whether or not, at a linked time 3321, an age 40-59 females 3136 of the image information 3100b matches an age 40-59 females 3216 of the object information 3200. Each age 40-59 females 3356 denotes whether or not, at a linked time 3341, an age 40-59 females 3156 of the image information 3100c matches an age 40-59 females 3216 of the object information 3200.

Each age ≥60 males 3317 denotes whether or not, at a linked time 3301, an age ≥60 males 3117 of the image information 3100a matches an age ≥60 males 3217 of the object information 3200. Each age ≥60 males 3337 denotes whether or not, at a linked time 3321, an age ≥60 males 3137 of the image information 3100b matches an age ≥60 males 3217 of the object information 3200. Each age ≥60 males 3357 denotes whether or not, at a linked time 3341, an age ≥60 males 3157 of the image information 3100c matches an age ≥60 males 3217 of the object information 3200.

Each age ≥60 females 3318 denotes whether or not, at a linked time 3301, an age ≥60 females 3118 of the image information 3100a matches an age ≥60 females 3218 of the object information 3200. Each age ≥60 females 3338 denotes whether or not, at a linked time 3321, an age ≥60 females 3138 of the image information 3100b matches an age ≥60 females 3218 of the object information 3200. Each age ≥60 females 3358 denotes whether or not, at a linked time 3341, an age ≥60 females 3158 of the image information 3100c matches an age ≥60 females 3218 of the object information 3200.

Returning to FIG. 30, description of the function configuration of the camera 3001 continues.

The comparison result information storage unit 3045 is implemented by a portion of a storage area of the memory 335. The comparison result information storage unit 3045 has the same functions as the comparison result information storage unit 445 in embodiment 1. However, as described above, the comparison result information stored by the comparison result information storage unit 3045 is modified from the comparison result information stored by the comparison result information storage unit 445.

The evaluation condition storage unit 3055 is implemented by a portion of a storage area of the memory 335. The evaluation condition storage unit 3055 has the same functions as the evaluation condition storage unit 455 in embodiment 1. However, an evaluation condition stored by the evaluation condition storage unit 3055 is different from the evaluation condition stored by the evaluation condition storage unit 455 in embodiment 1.

Here, the evaluation condition stored by the evaluation condition storage unit 3055 is a calculation method of calculating a fraction that has the total number of comparison results as a denominator and the number of "match" comparison results as the numerator, by using the comparison result information stored by the comparison result information storage unit 3045.

The evaluation unit 3050 is implemented by the processor 315 executing a program. The evaluation unit 3050 has a function of calculating an evaluation result indicating a result of a self-evaluation performed by the camera 3001 by applying the evaluation condition stored by the evaluation condition storage unit 3055 to the comparison result information stored by the comparison result information storage unit 3045. The evaluation unit 3050 also has a function of transmitting the evaluation result so calculated to the evaluation result output unit 460.

Figures 34A, 34B, 34C, 35:
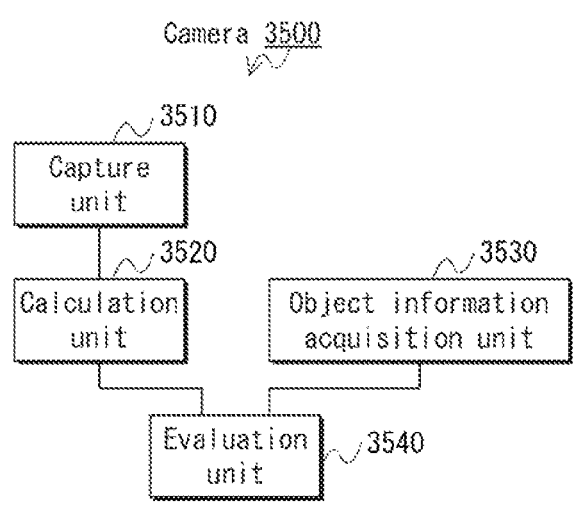
FIG. 34A is a data configuration diagram of an evaluation result 3400a, FIG. 34B is a data configuration diagram of an evaluation result 3400b.
FIG. 34C is a data configuration diagram of an evaluation result 3400c.
FIG. 35 is a configuration diagram of a camera 3500.

FIG. 34A, FIG. 34B, and FIG. 34C are each an example of the evaluation result calculated by the evaluation unit 3050. FIG. 34A, FIG. 34B, and FIG. 34C are data configuration diagrams of an evaluation result 3400a, an evaluation result 3400b, and an evaluation result 3400c, respectively.

Here, the evaluation result 3400a is an example of an evaluation result calculated by the evaluation unit 3050 in the camera 3001a. The evaluation result 3400b is an example of an evaluation result calculated by the evaluation unit 3050 in the camera 3001b. The evaluation result 3400c is an example of an evaluation result calculated by the evaluation unit 3050 in the camera 3001c.

As shown in FIG. 34A, the evaluation result 3400a is "35/40". As shown in FIG. 34B, the evaluation result 3400b is "24/40". As shown in FIG. 34C, the evaluation result 3400c is "29/40".

<Consideration>

A user of the fourth modified camera system described above is able to select and use a camera (for example, the camera 3001a) from among the camera 3001a, the camera 3001b, and the camera 3001c that is most appropriate for the purpose of knowing the sex and age range of people entering and leaving the department store entrance 2930, or in other words the customer base of the department store.

<Supplement>

As embodiments of the camera, the camera system, and the self-evaluation method performed by a camera, pertaining to aspects of the present invention, five examples of the camera system are described, in embodiment 1, embodiment 2, modification 1, modification 2, and modification 3. However, the following modifications may be made, and the present invention is of course not limited to the camera, the camera system, and the self-evaluation method exemplified in embodiment 1, embodiment 2, modification 1, modification 2, and modification 3.

(1) In embodiment 1, an example is described in which the cameras of the camera system 100 are set up on a street. However, each of these cameras 101 need not be set up on a street. Alternatively, some of the cameras 101 of the camera system 100 may be mounted on a vehicle, some of the cameras 101 of the camera system 100 may be attached to a mobile communication terminal, for example a tablet terminal, and some of the cameras 101 of the camera system 100 may be set up in a room.

(2) In embodiment 2, an example is described in which three cameras, namely the cameras 101a to 101c, capture vehicles travelling through the capture point 220. Further, the management server 102 is described as accumulating and displaying evaluation results obtained by the three cameras. However, as long as at least one camera is able to capture vehicles travelling through the capture point 220, the number of cameras capturing vehicles travelling through the capture point 220 is not restricted to three.

As one example, the number of cameras that capture vehicles travelling through the capture point 220 may be one.

In such an example, the management server 102 displays the evaluation result obtained by a single camera.

(3) In embodiment 1, an example is described in which the camera 101 includes the capture LSI 310. However, as long as functions equivalent to those implemented by operations of the capture LSI 310 can be implemented by other methods, the capture LSI 310 need not be included.

As one example, functions implemented by operations of the capture LSI 310 may be implemented by the processor 315 executing a program.

Further, in embodiment 1, an example is described in which the camera 101 includes the analysis LSI 330. However, as long as functions equivalent to those implemented by operations of the analysis LSI 330 can be implemented by other methods, the analysis LSI 330 need not be included.

As one example, functions implemented by operations of the analysis LSI 330 may be implemented by the processor 315 executing a program.

(4) In embodiment 1, an example is described in which the memory 335 is composed of RAM, ROM, and removable flash memory. However, the memory 335 may include a device other than a semiconductor memory that is able to read and write data. For example, the memory 335 may include a hard disk device.

(5) In embodiment 1, an example is described in which the condition acquisition unit 400 acquires the evaluation capture condition from the management server 102 via the network 103. However, as long as the condition acquisition unit 400 is able to acquire the evaluation capture condition, the acquisition source is not restricted to being the management server 102. Even when the acquisition source is the management server 102, the condition acquisition unit 400 is not restricted to acquiring the evaluation capture condition via the network 103.

As one example, the evaluation capture condition may be stored in advance in a predefined memory area of the memory 335 in the camera 101, and the condition acquisition unit 400 may acquire the evaluation capture condition from the predefined memory area of the memory 335. As a different example, the condition acquisition unit 400 may acquire the evaluation capture condition from the management server 102 via removable flash memory.

Further, in embodiment 1, an example is described in which the condition acquisition unit 400 acquires the normal capture condition from the management server 102 via the network 103. However, as long as the condition acquisition unit 400 is able to acquire the normal capture condition, the acquisition source is not restricted to being the management server 102. Even when the acquisition source is the management server 102, the condition acquisition unit 400 is not restricted to acquiring the normal capture condition via the network 103.

As one example, the normal capture condition may be stored in advance in a predefined memory area of the memory 335, and the condition acquisition unit 400 may acquire the normal capture condition from the predefined memory area of the memory 335. As a different example, the condition acquisition unit 400 may acquire the normal capture condition from the management server 102 via removable flash memory.

Further, in embodiment 1, an example is described in which the condition acquisition unit 400 acquires the evaluation analysis condition from the management server 102 via the network 103. However, as long as the condition acquisition unit 400 is able to acquire the evaluation analysis condition, the acquisition source is not restricted to being the management server 102. Even when the acquisition source is the management server 102, the condition acquisition unit 400 is not restricted to acquiring the evaluation analysis condition via the network 103.

As one example, the evaluation analysis condition may be stored in advance in a predefined memory area of the memory 335, and the condition acquisition unit 400 may acquire the evaluation analysis condition from the predefined memory area of the memory 335. As a different example, the condition acquisition unit 400 may acquire the evaluation analysis condition from the management server 102 via removable flash memory.

Further, in embodiment 1, an example is described in which the condition acquisition unit 400 acquires the normal analysis condition from the management server 102 via the network 103. However, as long as the condition acquisition unit 400 is able to acquire the normal analysis condition, the acquisition source is not restricted to being the management server 102. Even when the acquisition source is the management server 102, the condition acquisition unit 400 is not restricted to acquiring the normal analysis condition via the network 103.

As one example, the normal analysis condition may be stored in advance in a predefined memory area of the memory 335, and the condition acquisition unit 400 may acquire the normal analysis condition from the predefined memory area of the memory 335. As a different example, the condition acquisition unit 400 may acquire the normal analysis condition from the management server 102 via removable flash memory.

(6) In embodiment 1, an example is described in which, as images to be used for the self-evaluation, the camera 101 captures 15 images. However, as long as at least one image is usable for the self-evaluation, the number of images captured to be used for the self-evaluation is not restricted to 15.

As one example, one image may be captured to be used for the self-evaluation.

In such a case, a self-evaluation result output by the camera 101 would be one of "1/1" and "0/1".

(7) In embodiment 1, an example is described in which the camera 101 is caused to capture and analyze one image in an hour. However, as a different example, the camera 101 may be caused to capture and analyze ten images in a second. In such a case, if the camera 101 does not have the ability to capture ten images in a second, or the ability to analyze ten images in a second, for example, the analysis results and the expected values will not match up. Thus, a user can know that the camera 101 is not appropriate for a purpose that requires continuously capturing ten images in a second.

(8) In embodiment 2, an example is described in which the camera 1601, in step S2200 of the modified self-evaluation process, acquires the normal capture condition and the normal analysis condition from the first modified management server. However, as long as (i) a configuration of a condition of capture by the capture unit 415 is switched to a configuration based on the normal capture condition acquired by the condition acquisition unit 400, and (ii) configuration of the calculation unit 1720 is switched to a configuration based on the normal analysis condition acquired by the condition acquisition 400 when the evaluation value is within the threshold in step S2300 ("Yes" in step S2300), the normal capture condition and the normal analysis condition need not be acquired in step S2200.

As one example, when the evaluation value is within the threshold in step S2300 ("Yes" in step S2300), the camera 1601 may query the first modified management server and thereby acquire the normal capture condition and the normal analysis condition.

(9) In embodiment 2, an example is described in which the camera 1601 specifies the number of people waiting for a bus to arrive at the bus stop 1530 at predefined times when a bus is near the bus stop 1530. However, the timing of specifying the number of people waiting for a bus to arrive at the bus stop 1530 is not restricted to predefined times when a bus is near the bus stop 1530.

As one example, the camera 1601 may specify the number of people waiting for a bus to arrive at the bus stop 1530 at any set timing, regardless of whether or not a bus is near the bus stop 1530.

Further, timing of capture determined by the evaluation capture condition and timing of capture determined by the normal capture condition need not match up.

(10) The above embodiments and modifications may each be combined with any other of the above embodiments and modifications.

(11) The following is a description of the configuration and effects of the camera, the camera system, and the self-evaluation method pertaining to aspects of the present invention, and modifications thereof.

The camera pertaining to one aspect of the present invention comprises: a capture unit that generates an image by capturing an area in which an evaluation-use object is present; a calculation unit that analyzes the image, and thereby detects the evaluation-use object in the image and calculates meaningful information from the evaluation-use object in the image; an object information acquisition unit that acquires and stores object information that is meaningful to a user and derived from the evaluation-use object; and an evaluation unit that performs an evaluation that includes comparing the meaningful information and the object information, and thereby calculating a degree of matching between the meaningful information and the object information, the evaluation determining whether or not a desired result is obtained from the image.

According to the configuration of the camera pertaining to one aspect of the present invention, the user of the camera can use a result of the evaluation that is performed, by using an actual image captured by the camera. Thus, the user can infer, with greater accuracy than conventional technology allows, whether or not image capturing performed by the camera is beneficial to the user.

FIG. 35 is a configuration diagram of a camera 3500 that has the configuration of the camera pertaining to the above aspect of the present invention.

As shown in FIG. 35, the camera 3500 includes a capture unit 3510, a calculation unit 3520, an object information acquisition unit 3530, and an evaluation unit 3540.

The capture unit 3510 generates an image by performing an image capture of an area in which an evaluation-use object is present. As one example, the capture unit 3510 may be implemented by the capture unit 415 of embodiment 1.

The calculation unit 3520 has a function of analyzing an image generated by the capture unit 3510, and thereby detecting the evaluation-use object in the image and calculating particular information that is perceptible from the evaluation-use object in the image. As one example, the calculation unit 3520 may be implemented by the calculation unit 420 of embodiment 1.

The object information acquisition unit 3530 has a function of acquiring and storing object information indicated by the evaluation-use object. As one example, the object information acquisition unit 3530 may be implemented by the object information acquisition unit 435 of embodiment 1.

The evaluation unit 3540 has a function of performing an evaluation that includes comparing the meaningful information calculated by the calculation unit 3520 and the object information stored by the object information acquisition unit 3530, and thereby calculating a degree of matching between the meaningful information and the object information. The evaluation determines whether or not a desired result is obtained from the image captured by the capture unit 3510. As one example, the evaluation unit 3540 may be implemented by the evaluation unit 450 of embodiment 1.

(b) In the camera pertaining to one aspect of the present invention, the capture unit may generate a plurality of images by performing the capturing a plurality of times, the calculation unit may perform the analysis, the detection, and the calculation with respect to each of the images generated by the capture unit, and the evaluation unit may perform the comparison of the meaningful information and the object information with respect to each instance of the meaningful information calculated by the calculation unit, and, as the degree of matching, may calculate information regarding the number of matches between the meaningful information and the object information.

According to this configuration, the camera performs the evaluation by using a plurality of images and is therefore able to perform the evaluation with greater accuracy than when performing the evaluation by using a single image.

(c) In the camera pertaining to one aspect of the present invention, the meaningful information may be a character string that is a result of character recognition performed by the calculation unit on the evaluation-use object in the images, and the object information may be a character string perceptible from the evaluation-use object.

According to this configuration, the camera performs the evaluation by using a character string that can be perceived from the image, and is therefore more likely to perform a beneficial evaluation for a user who wishes to acquire information about a character string included in the image.

(d) In the camera pertaining to one aspect of the present invention, the meaningful information may be a result of person recognition performed by the calculation unit on the evaluation-use object in the image, the meaningful information denoting the number of persons recognized as being included in the evaluation-use object in the image, the object information may denote the number of persons perceptible from the evaluation-use object, and the evaluation unit, as the degree of matching, may calculate information regarding a ratio of the number of persons denoted by the meaningful information to the number of persons denoted by the object information.

According to this configuration, the camera performs the evaluation by using the number of people that can be perceived from the image, and is therefore more likely to perform a beneficial evaluation for a user who wishes to acquire information about the number of people included in the image.

The camera pertaining to one aspect of the present invention may further comprise a condition acquisition unit, wherein the condition acquisition unit acquires an evaluation capture condition specifying a method of capturing the image, and the capture unit performs the capturing of the image based on the evaluation capture condition.

According to this configuration, the camera captures the image based on the evaluation capture condition, which reflects the user's wishes. Thus, the user of the camera can cause the camera to perform the evaluation by using an image captured under a condition that the user favors.

(f) In the camera pertaining to one aspect of the present invention, the condition acquisition unit may also acquire an evaluation analysis condition specifying a method of analyzing the image, and the calculation unit may perform the analysis of the image based on the evaluation analysis condition.

By using this configuration, the camera captures the image based on the evaluation analysis condition, which reflects the user's wishes. Thus, the user of the camera can cause the camera to perform the evaluation by using an image captured under a condition that the user favors.

(g) The camera pertaining to one aspect of the present invention may further comprise: an output unit; and a meaningful information output unit, wherein the output unit outputs a result of the evaluation to an external apparatus, the condition acquisition unit further acquires a normal capture condition from the external apparatus, the normal capture condition being generated based on the result of the evaluation outputted to the external apparatus and specifying a method for capturing an object, the capture unit, when the normal capture condition is acquired by the condition acquisition unit, switches from capturing based on the evaluation capture condition to generating, based on the normal capture condition, a normal-use image by capturing an area in which the object is present, the condition acquisition unit also acquires a normal analysis condition from the external apparatus, the normal analysis condition being generated based on the result of the evaluation outputted to the external apparatus and specifying a method for analyzing the normal-use image, the calculation unit, when the normal analysis condition is acquired by the condition acquisition unit, switches from analyzing based on the evaluation analysis condition to analyzing based on the normal analysis condition, and thereby detecting the object in the normal-use image and calculating normal-use meaningful information that is perceptible from the object in the normal-use image, and the meaningful information output unit outputs the normal-use meaningful information to the external apparatus.

According to this configuration, the user of the camera can cause the camera to capture the image based on the capture condition, which reflects the result of the evaluation, and analyze the image based on the analysis condition, which reflects the result of the evaluation.

(h) The camera pertaining to one aspect of the present invention may further comprise: a notification unit; and a meaningful information output unit, wherein the notification unit, when a result of the evaluation is not the selected result, notifies an external apparatus that the result of the evaluation is negative, the condition acquisition unit also acquires a normal capture condition specifying a method of capturing a non-evaluation image that is not to be used for the evaluation, the capture unit, when the result of the evaluation is the desired result, switches from capturing based on the evaluation capture condition to generating, based on the normal capture condition, the non-evaluation image by capturing an area in which an object is present, the condition acquisition unit also acquires a normal analysis condition specifying a method of analyzing the non-evaluation image, the calculation unit, when the result of the evaluation is the desired result, switches from analyzing based on the evaluation analysis condition to analyzing based on the normal analysis condition, and thereby detecting the object in the non-evaluation image and calculating normal-use meaningful information that is perceptible from the object in the non-evaluation image, and the meaningful information output unit outputs the normal-use meaningful information to the external apparatus.

According to this configuration, when the result of the evaluation is the desired result, the user of the camera can obtain the normal capture information from the camera, and when the result of the evaluation is not the desired result, the user can cause a different camera to perform the evaluation.

(i) The camera system pertaining to another aspect of the present invention comprises: a camera and a server device that communicates with the camera, wherein the camera includes: a capture unit that generates an image by capturing an area in which an evaluation-use object is present; a calculation unit that analyzes the image, and thereby detects the evaluation-use object in the image and calculates meaningful information from the evaluation-use object in the image; an object information acquisition unit that acquires and stores object information that is meaningful to a user and derived from the evaluation-use object; an evaluation unit that performs an evaluation that includes comparing the meaningful information and the object information, and thereby calculating a degree of matching between the meaningful information and the object information, the evaluation determining whether or not a desired result is obtained from the image; and an output unit that outputs a result of the evaluation to the server device, and the server device includes: an object information storage unit that stores the object information used by the camera; and an acquisition output unit that acquires the result of the evaluation outputted by the camera and outputs the result of the evaluation so acquired.

According to the configuration of the camera system pertaining to one aspect of the present invention, a user of the camera system can use a result of the evaluation that is performed by using actual images captured by the camera system. Thus, the user can infer, with greater accuracy than conventional technology allows, whether or not image capturing performed by the camera in the camera system is beneficial to the user.

(j) A self-evaluation method pertaining to another aspect of the present invention is a self-evaluation method performed by a camera, comprising: generating an image by performing capturing of an area in which an evaluation-use object is present, analyzing the image, and thereby detecting the evaluation-use object in the image and calculating meaningful information from the evaluation-use object in the image; acquiring object information that is meaningful to a user and derived from the evaluation-use object; and performing a self-evaluation that includes comparing the meaningful information and the object information, and thereby calculating a degree of matching between the meaningful information and the object information, the self-evaluation determining whether or not a desired result is obtained from the image.

According to the self-evaluation method pertaining to one embodiment of the present invention, a user of the camera that performs the self-evaluation by using the self-evaluation method can use the result of the self-evaluation performed by using actual images captured by the camera. Thus, the user can infer, with greater accuracy than conventional technology allows, whether or not image capturing performed by the camera, which performs the self-evaluation by using the self-evaluation method, is beneficial to the user.

The camera, the camera system, and the self-evaluation method performed by the camera, which pertain to aspects of the present invention, may be widely used in systems that use a camera.

REFERENCE SIGNS LIST 100 camera system
102 management server
103 network
400 condition acquisition unit
405 capture instruction unit
410 capture timing reception unit
415 capture unit 420 calculation unit
425 image storage unit
430 image information storage unit
435 object information acquisition unit
440 comparison unit
445 comparison result information storage unit
450 evaluation unit
455 evaluation condition storage unit
460 evaluation result output unit
465 image information output unit
470 image output unit

The invention claimed is:

1. A camera comprising:
a non-transitory memory that stores a program; and
a hardware processor that executes the program and causes the camera to operates as:
a capture unit that generates an image by capturing an area in which an evaluation-use object is present;
a calculation unit that analyzes the image, and thereby detects the evaluation-use object in the image and calculates meaningful information from the evaluation-use object in the image;
an object information acquisition unit that acquires and stores object information that is meaningful to a user and derived from the evaluation-use object; and
an evaluation unit that performs an evaluation that includes comparing the meaningful information and the object information, and thereby calculating a degree of matching between the meaningful information and the object information, the evaluation determining whether or not a desired result is obtained from the image,
wherein the meaningful information is a result of person recognition performed by the calculation unit on the evaluation-use object in the image, the meaningful information denoting a sex of persons recognized as being included in the evaluation-use object in the image,
the capture unit generates a plurality of images by performing the capturing a plurality of times,
the calculation unit performs the analysis, the detection, and the calculation with respect to each of the images generated by the capture unit,
the evaluation unit performs the comparison of the meaningful information and the object information with respect to each instance of the meaningful information calculated by the calculation unit, and, as the degree of matching, calculates information regarding the number of matches between the meaningful information and the object information, and
when the degree of matching is in a predefined range, the evaluation unit determines that a desired result is obtained from the image.

2. A camera comprising:
a non-transitory memory that stores a program; and
a hardware processor that executes the program and causes the camera to operates as:
a capture unit that generates an image by capturing an area in which an evaluation-use object is present;
a calculation unit that analyzes the image, and thereby detects the evaluation-use object in the image and calculates meaningful information from the evaluation-use object in the image;
an object information acquisition unit that acquires and stores object information that is meaningful to a user and derived from the evaluation-use object; and
an evaluation unit that performs an evaluation that includes comparing the meaningful information and the object information, and thereby calculating a degree of matching between the meaningful information and the object information, the evaluation determining whether or not a desired result is obtained from the image,
wherein the capture unit generates a plurality of images by performing the capturing a plurality of times,
the calculation unit performs the analysis, the detection, and the calculation with respect to each of the images generated by the capture unit, and
the evaluation unit performs the comparison of the meaningful information and the object information with respect to each instance of the meaningful information calculated by the calculation unit, and, as the degree of matching, calculates information regarding the number of matches between the meaningful information and the object information,
the meaningful information is a character string that is a result of character recognition performed by the calculation unit on the evaluation-use object in the images,
the object information is a character string perceptible from the evaluation-use object, and
when the degree of matching is in a predefined range, the evaluation unit determines that a desired result is obtained from the image.

3. A camera comprising:
a non-transitory memory that stores a program; and
a hardware processor that executes the program and causes the camera to operates as:
a capture unit that generates an image by capturing an area in which an evaluation-use object is present;
a calculation unit that analyzes the image, and thereby detects the evaluation-use object in the image and calculates meaningful information from the evaluation-use object in the image;
an object information acquisition unit that acquires and stores object information that is meaningful to a user and derived from the evaluation-use object; and
an evaluation unit that performs an evaluation that includes comparing the meaningful information and the object information, and thereby calculating a degree of matching between the meaningful information and the object information, the evaluation determining whether or not a desired result is obtained from the image,
wherein the meaningful information is a result of person recognition performed by the calculation unit on the evaluation-use object in the image, the meaningful information denoting the number of persons recognized as being included in the evaluation-use object in the image,
the object information denotes the number of persons perceptible from the evaluation-use object,
the evaluation unit, as the degree of matching, calculates information regarding a ratio of the number of persons denoted by the meaningful information to the number of persons denoted by the object information, and
when the degree of matching is in a predefined range, the evaluation unit determines that a desired result is obtained from the image.

4. A camera comprising:
a non-transitory memory that stores a program; and
a hardware processor that executes the program and causes the camera to operates as:
a capture unit that generates an image by capturing an area in which an evaluation-use object is present;

a calculation unit that analyzes the image, and thereby detects the evaluation-use object in the image and calculates meaningful information from the evaluation-use object in the image;

an object information acquisition unit that acquires and stores object information that is meaningful to a user and derived from the evaluation-use object;

an evaluation unit that performs an evaluation that includes comparing the meaningful information and the object information, and thereby calculating a degree of matching between the meaningful information and the object information, the evaluation determining whether or not a desired result is obtained from the image; and a condition acquisition unit, wherein the condition acquisition unit acquires an evaluation capture condition specifying a method of capturing the image, and the capture unit performs the capturing of the image based on the evaluation capture condition, the condition acquisition unit also acquires an evaluation analysis condition specifying a method of analyzing the image, the calculation unit performs the analysis of the image based on the evaluation analysis condition, the calculation unit performs the analysis of the image based on the evaluation analysis condition after a predefined time elapses from acquisition of the evaluation capture condition, and when the degree of matching is in a predefined range, the evaluation unit determines that a desired result is obtained from the image.

5. The camera of claim 4, further comprising:

an output unit and a meaningful information output unit, wherein the output unit outputs a result of the evaluation to an external apparatus, the condition acquisition unit further acquires a normal capture condition from the external apparatus, the normal capture condition being generated based on the result of the evaluation outputted to the external apparatus and specifying a method for capturing an object, the capture unit, when the normal capture condition is acquired by the condition acquisition unit, switches from capturing based on the evaluation capture condition to generating, based on the normal capturing condition, a normal-use image by capturing an area in which the object is present, the condition acquisition unit also acquires a normal analysis condition from the external apparatus, the normal analysis condition being generated based on the result of the evaluation outputted to the external apparatus and specifying a method for analyzing the normal-use image, the calculation unit, when the normal analysis condition is acquired by the condition acquisition unit, switches from analyzing based on the evaluation analysis condition to analyzing based on the normal analysis condition, and thereby detecting the object in the normal-use image and calculating normal-use meaningful information from the object in the normal-use image, and the meaningful information output unit outputs the normal-use meaningful information to the external apparatus.

6. The camera of claim 4, further comprising:

a notification unit and a meaningful information output unit, wherein the notification unit, when a result of the evaluation is not the desired result, notifies an external apparatus that the result of the evaluation is negative, the condition acquisition unit also acquires a normal capture condition specifying a method of capturing a non-evaluation image that is not to be used for the evaluation, the capture unit, when the result of the evaluation is the desired result, switches from capturing based on the evaluation capture condition to generating, based on the normal capture condition, the non-evaluation image by capturing area in which an object is present, the condition acquisition unit also acquires a normal analysis condition specifying a method of analyzing the non-evaluation image, the calculation unit, when the result of the evaluation is the selected result, switches from analyzing based on the evaluation analysis condition to analyzing based on the normal analysis condition, and thereby detecting the object in the non-evaluation image and calculating normal-use meaningful information that is perceptible from the object in the non-evaluation image, and the meaningful information output unit outputs the normal-use meaningful information to the external apparatus.

7. A camera system comprising: a camera and a server device that communicates with the camera, wherein the camera includes a non-transitory memory that stores a program, and a hardware processor that executes the program and causes the camera to operates as:

a capture unit that generates an image by capturing an area in which an evaluation-use object is present;

a calculation unit that analyzes the image, and thereby detects the evaluation-use object in the image and calculates meaningful information from the evaluation-use object in the image;

an object information acquisition unit that acquires and stores object information that is meaningful to a user and derived from the evaluation-use object;

an evaluation unit that performs an evaluation that includes comparing the meaningful information and the object information, and thereby calculating a degree of matching between the meaningful information and the object information, the evaluation determining whether or not a desired result is obtained from the image; and an output unit that outputs a result of the evaluation to the server device, and the server device includes:

an object information storage unit that stores the object information used by the camera; and an acquisition output unit that acquires the result of the evaluation outputted by the camera and outputs the result of the evaluation so acquired, wherein the capture unit generates a plurality of images by performing the capturing a plurality of times, the calculation unit performs the analysis, the detection, and the calculation with respect to each of the images generated by the capture unit, and the evaluation unit performs the comparison of the meaningful information and the object information with respect to each instance of the meaningful information calculated by the calculation unit, and, as the degree of matching, calculates information regarding the number of matches between the meaningful information and the object information, the meaningful information is a character string that is a result of character recognition performed by the calculation unit on the evaluation-use object in the images, the object information is a character string perceptible from the evaluation-use object, and when the degree of matching is in a predefined range, the evaluation unit determines that a desired result is obtained from the image.

8. A self-evaluation method performed by a camera, the camera including a non-transitory memory that stores a program and a hardware processor that executes the program and causes the camera to perform the self-evaluation method comprising:

generating an image by capturing an area in which an evaluation-use object is present;

analyzing the image, and thereby detecting the evaluation-use object in the image and calculating meaningful information from the evaluation-use object in the image;

acquiring object information that is meaningful to a user and derived from the evaluation-use object; and performing a self-evaluation that includes comparing the meaningful information and the object information, and thereby calculating a degree of matching between the meaningful information and the object information, the self-evaluation determining whether or not a desired result is obtained from the image, wherein a plurality of images are captured by performing the capturing a plurality of times, the analyzing, the detecting and the calculating are performed with respect to each of the images generated, and the comparison of the meaningful information and the object information is performed with respect to each instance of the meaningful information calculated, and, as the degree of matching, information regarding the number of matches between the meaningful information and the object information is calculated, the meaningful information is a character string that is a result of character recognition performed on the evaluation-use object in the images, the object information is a character string perceptible from the evaluation-use object, and when the degree of matching is in a predefined range, the performing of self-evaluation includes determining that a desired result is obtained from the image.

* * * * *